Nov. 5, 1968  R. D. HEFFELFINGER ET AL  3,408,906
METHOD OF AND MACHINE FOR FORMING CONTAINERS
Original Filed Aug. 10, 1962  30 Sheets-Sheet 1
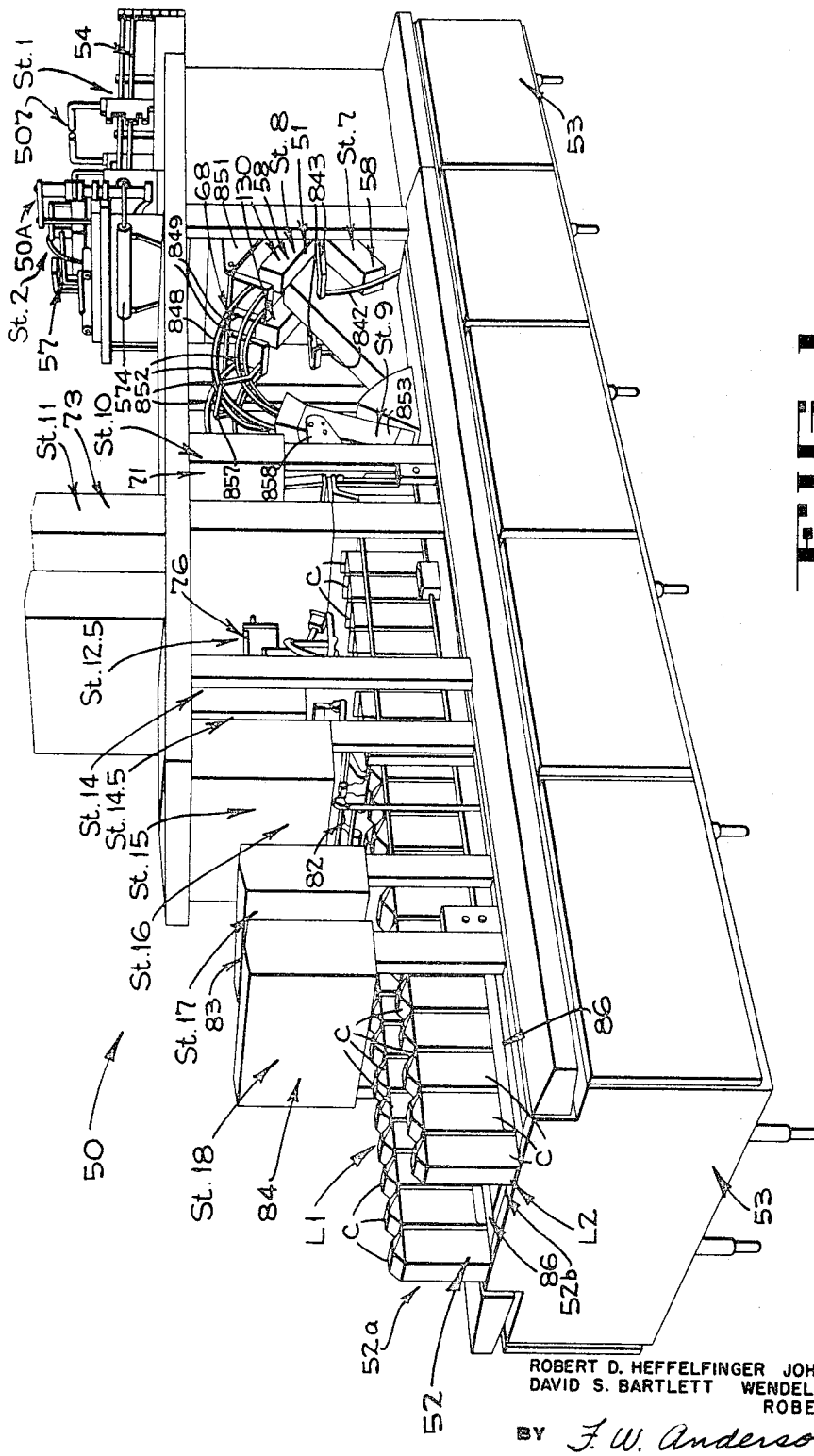
FIG_1
INVENTORS
ROBERT D. HEFFELFINGER  JOHN G. HAGERBORG
DAVID S. BARTLETT  WENDELL S. THOMPSON
ROBERT F. SMALL
BY F. W. Anderson
ATTORNEY

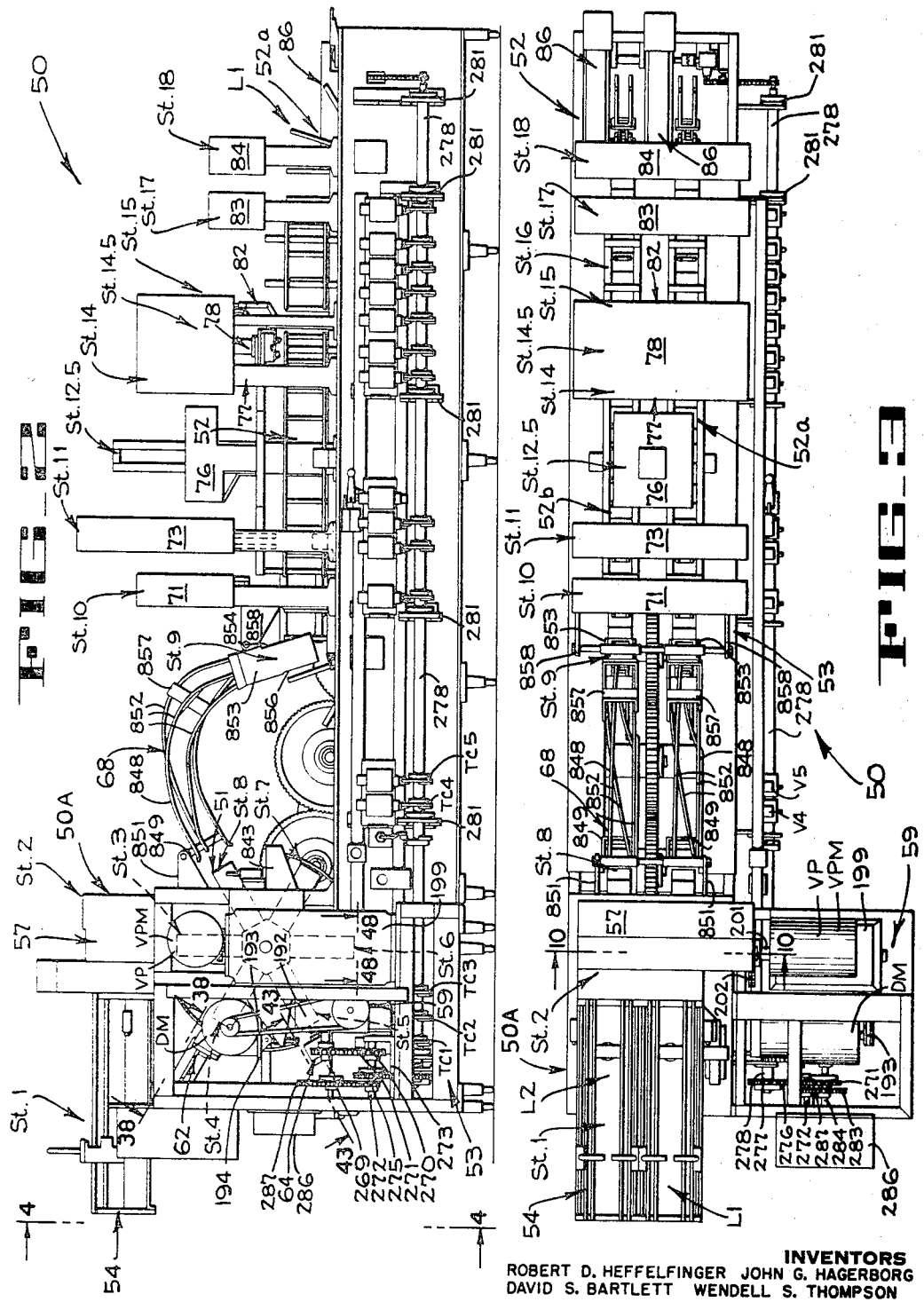

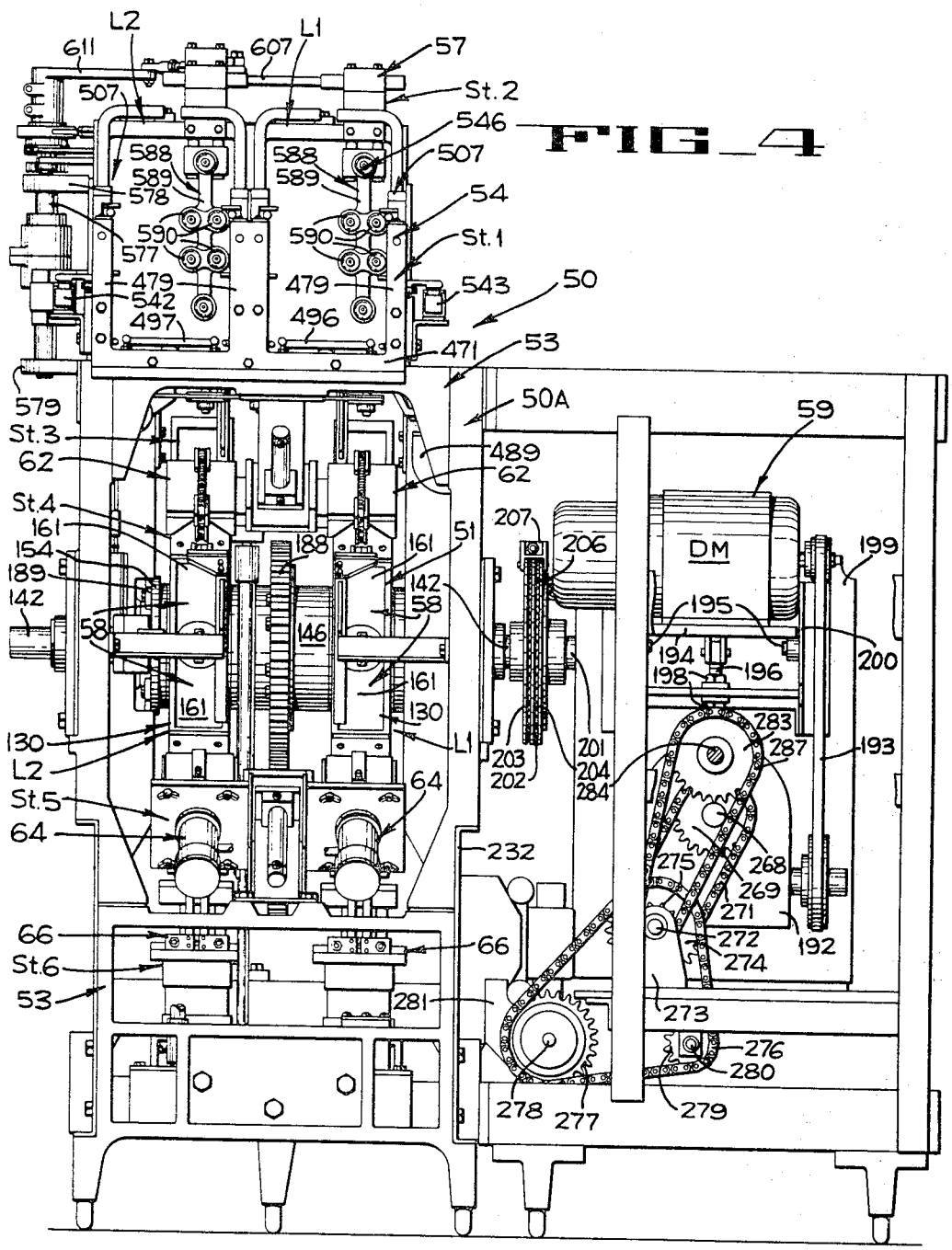

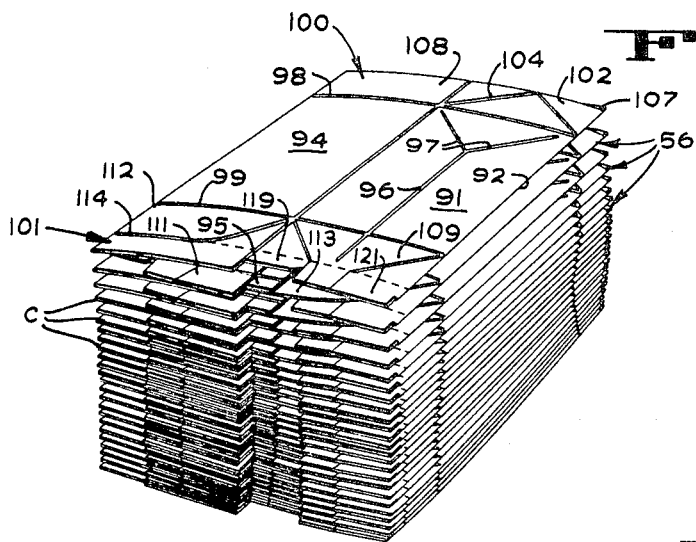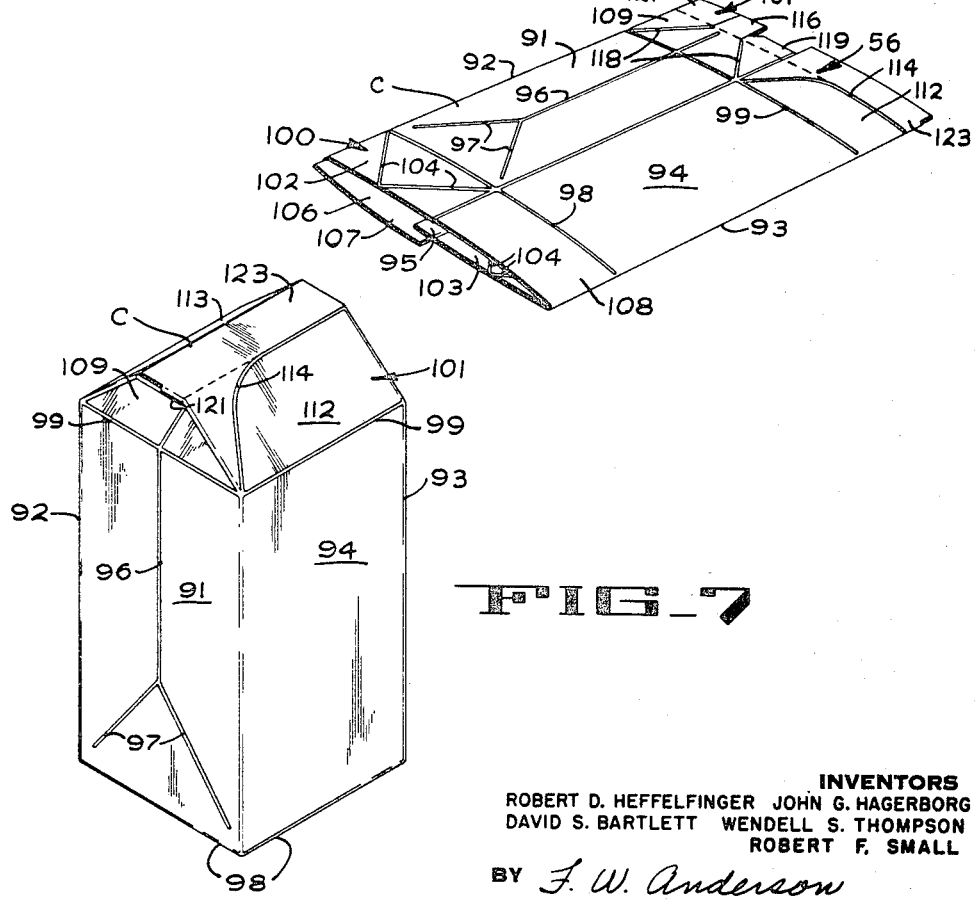

Nov. 5, 1968  R. D. HEFFELFINGER ET AL  3,408,906
METHOD OF AND MACHINE FOR FORMING CONTAINERS
Original Filed Aug. 10, 1962  30 Sheets-Sheet 5
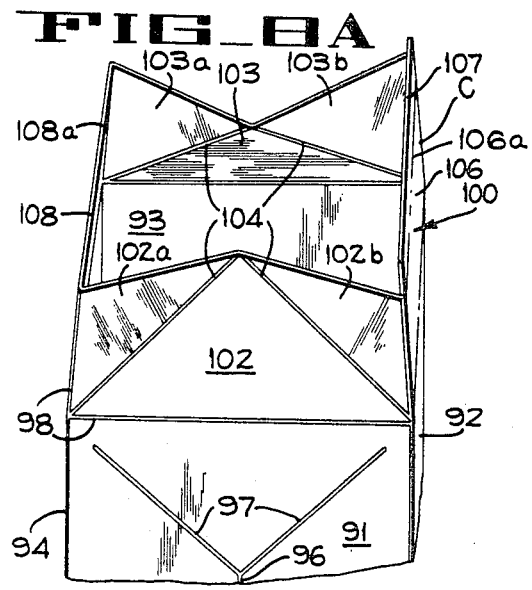
FIG_8A
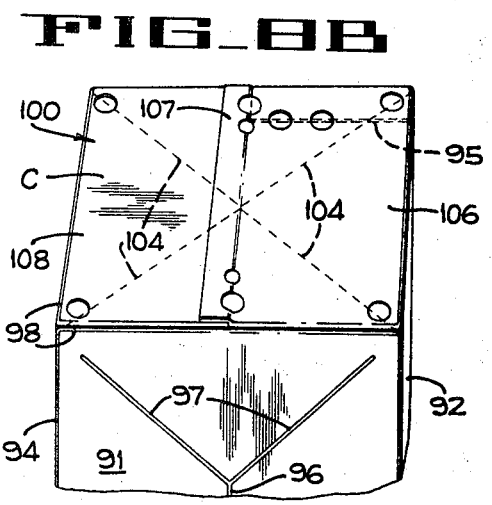
FIG_8B
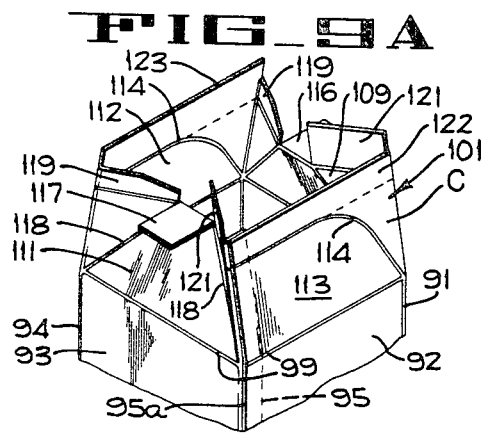
FIG_9A
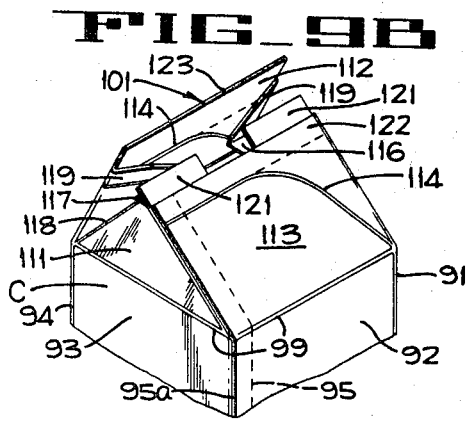
FIG_9B
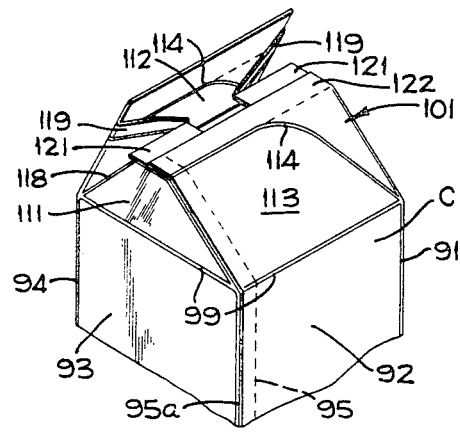
FIG_9C
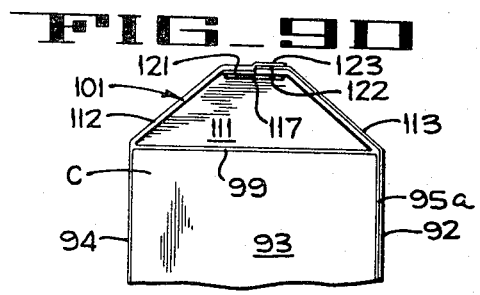
FIG_9D
INVENTORS
ROBERT D. HEFFELFINGER  JOHN G. HAGERBORG
DAVID S. BARTLETT  WENDELL S. THOMPSON
ROBERT F. SMALL
BY F. W. Anderson
ATTORNEY

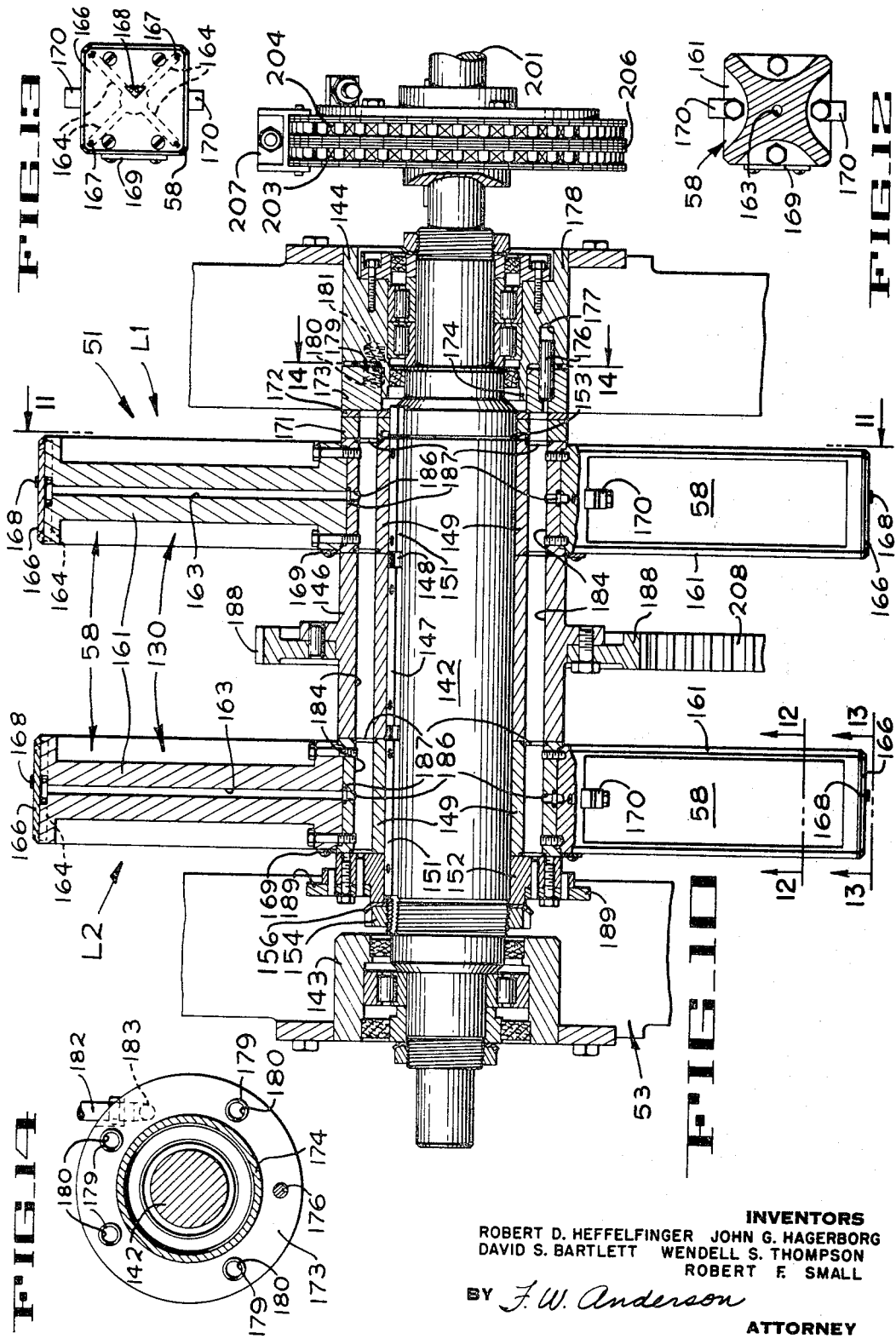

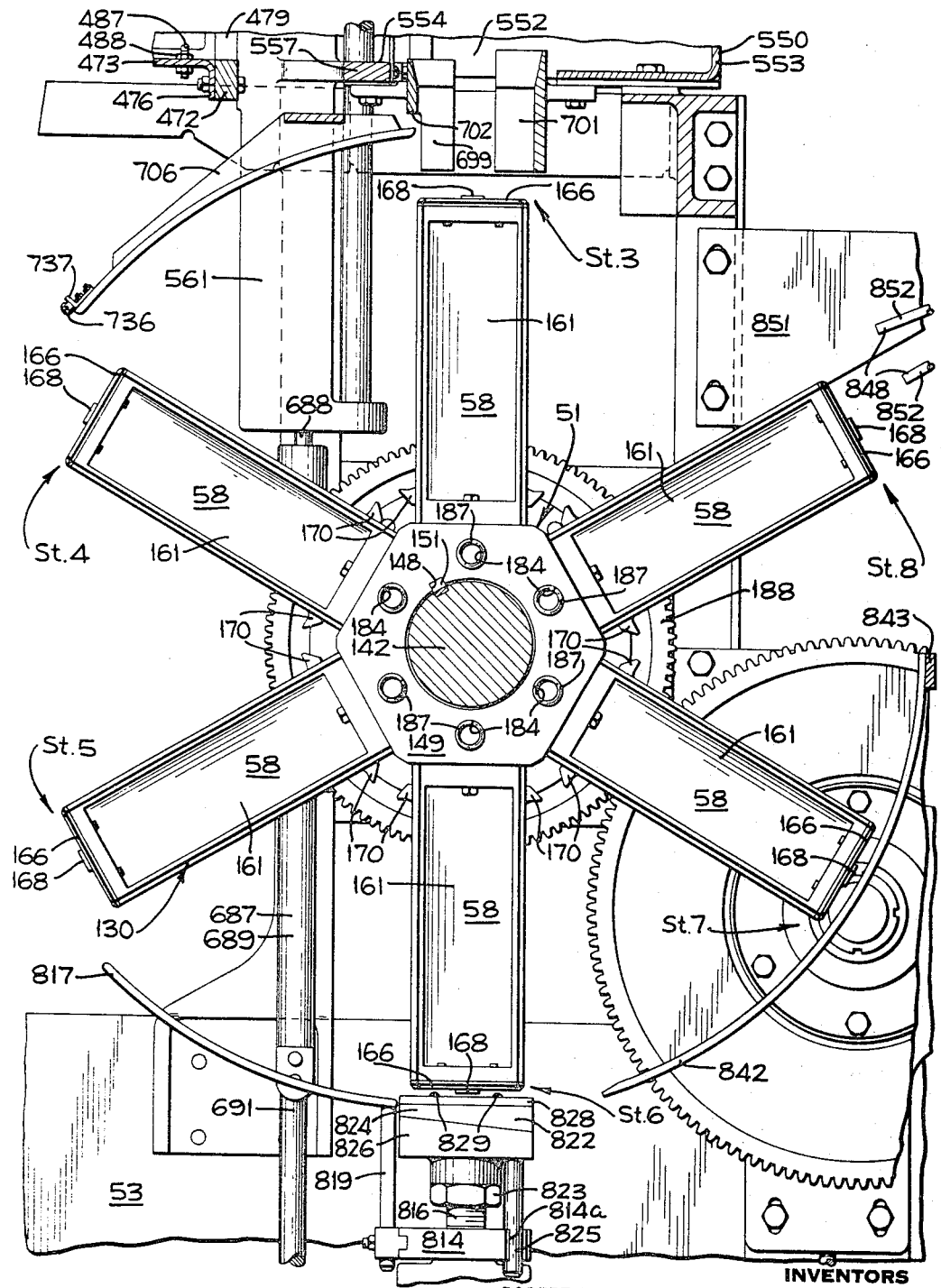

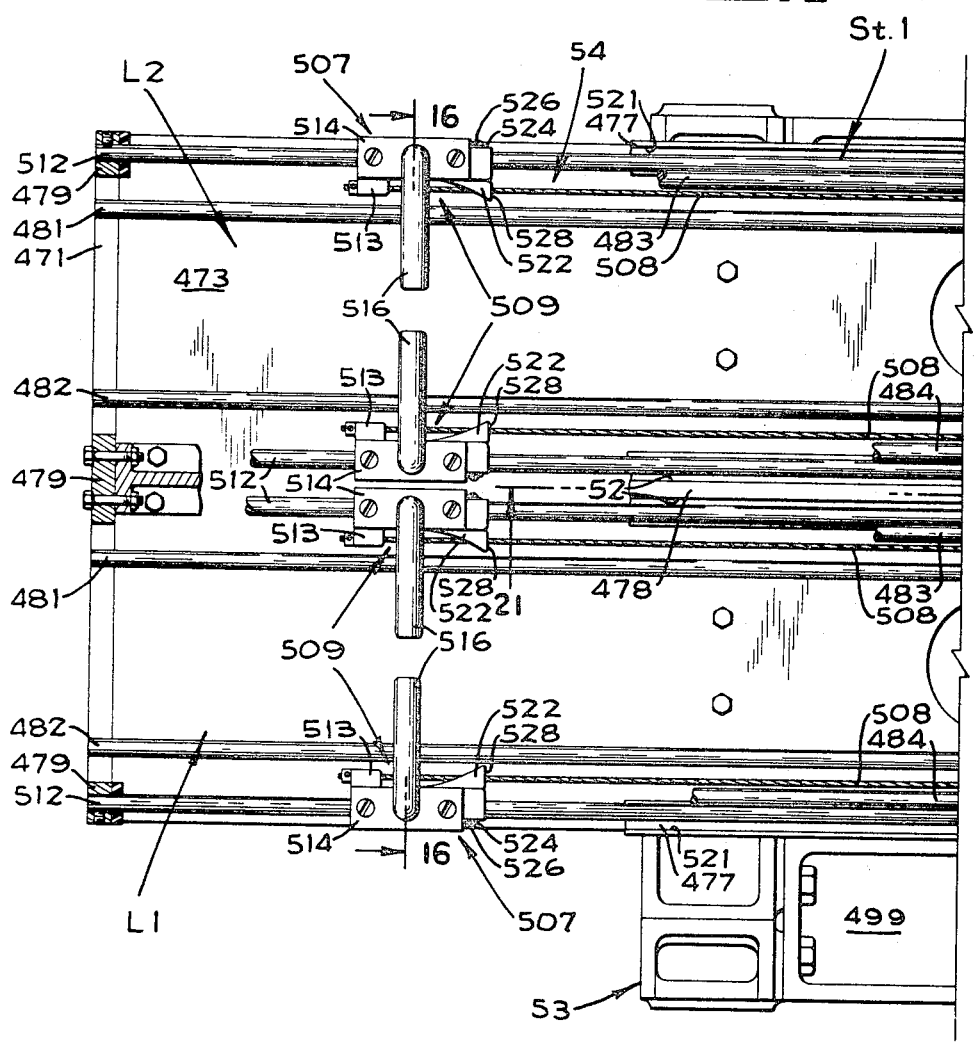

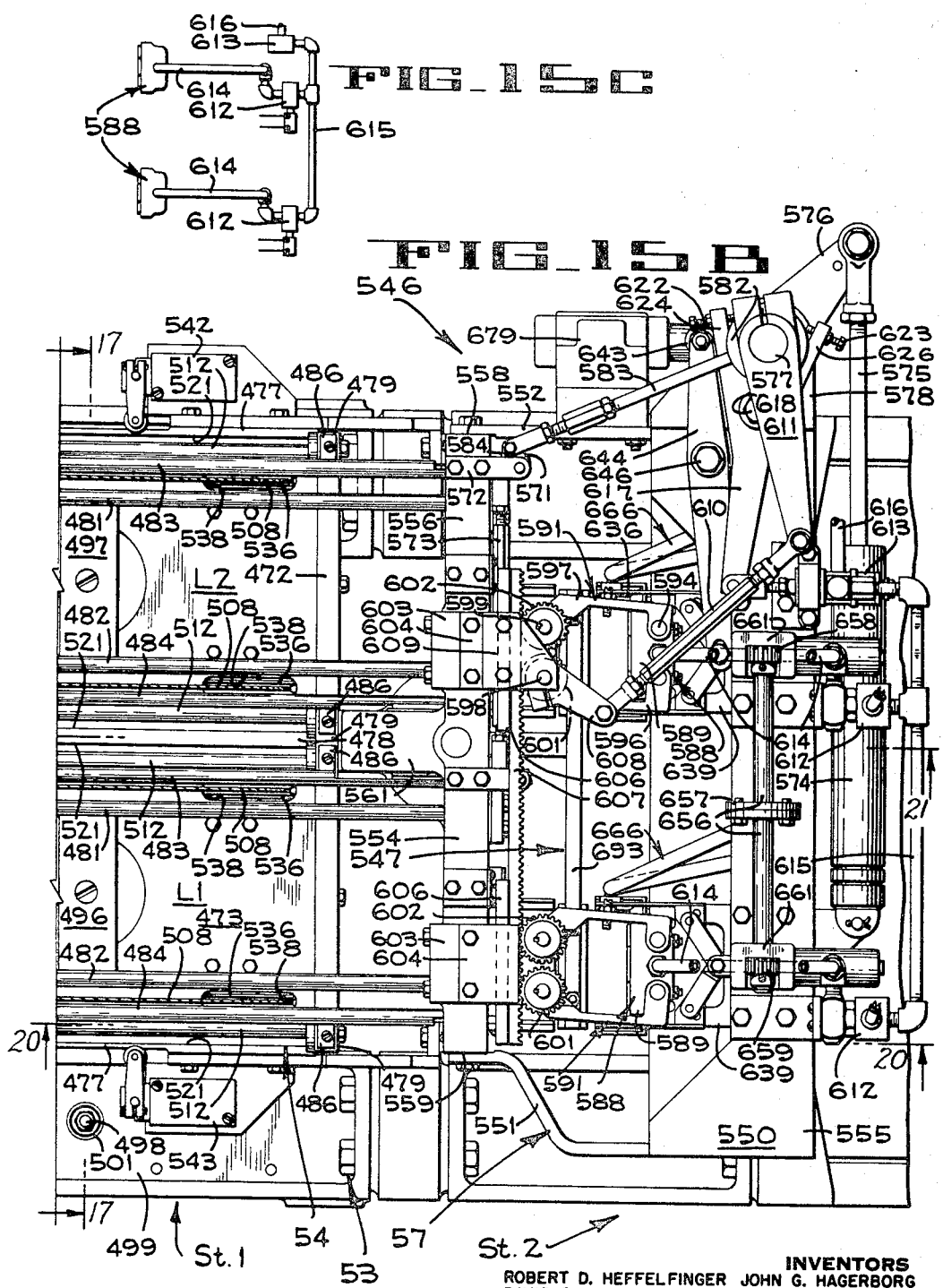

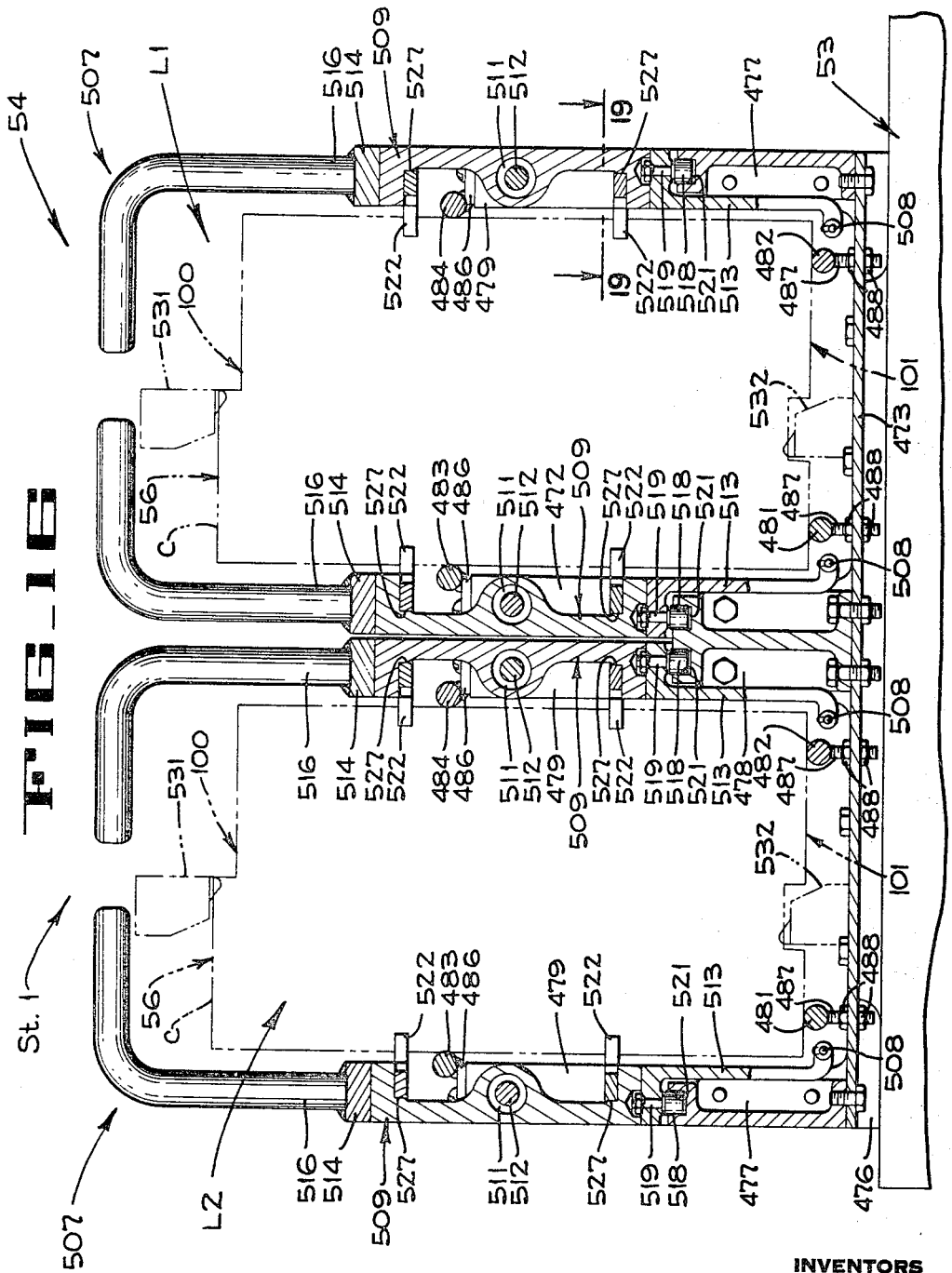

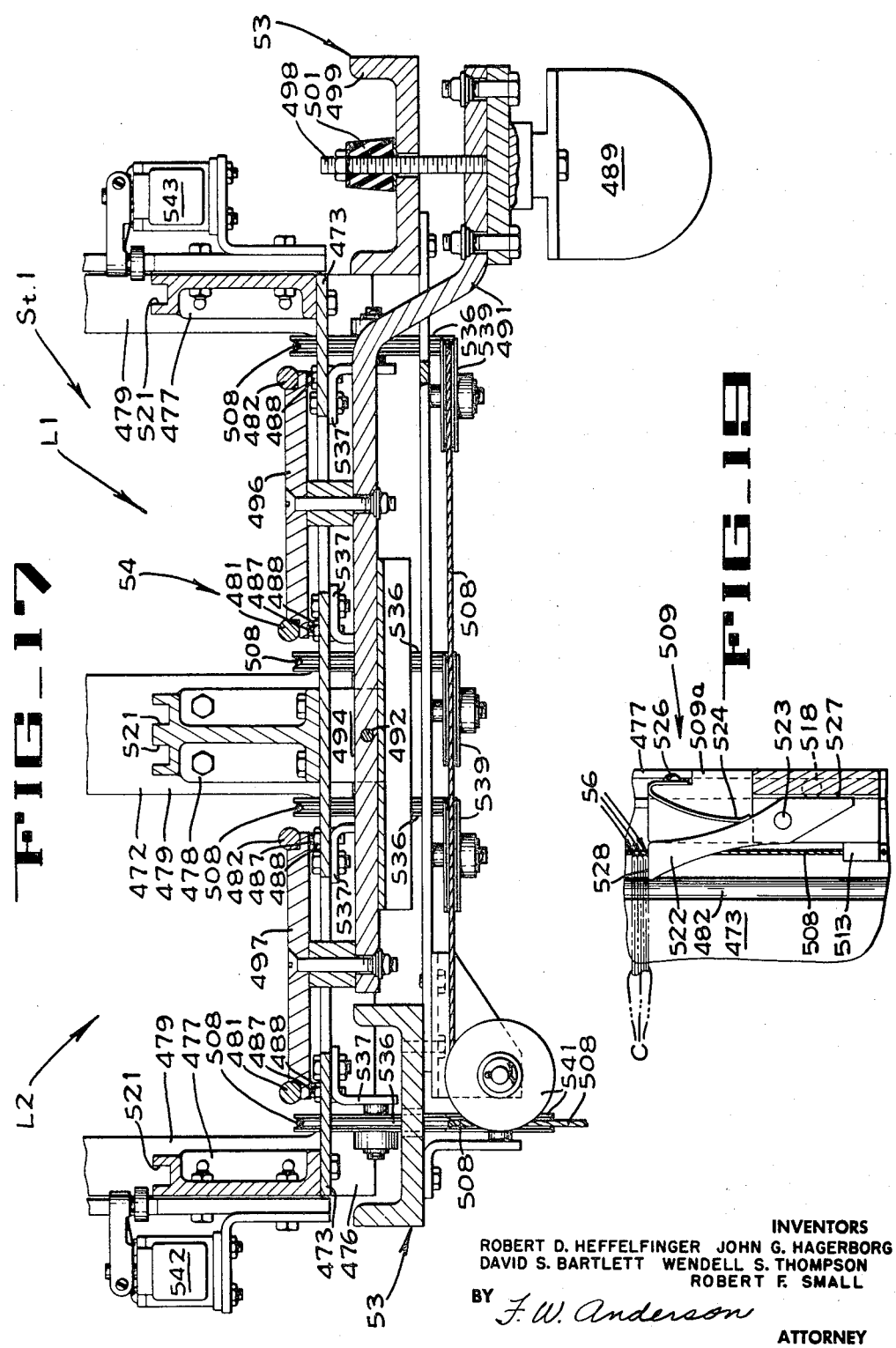

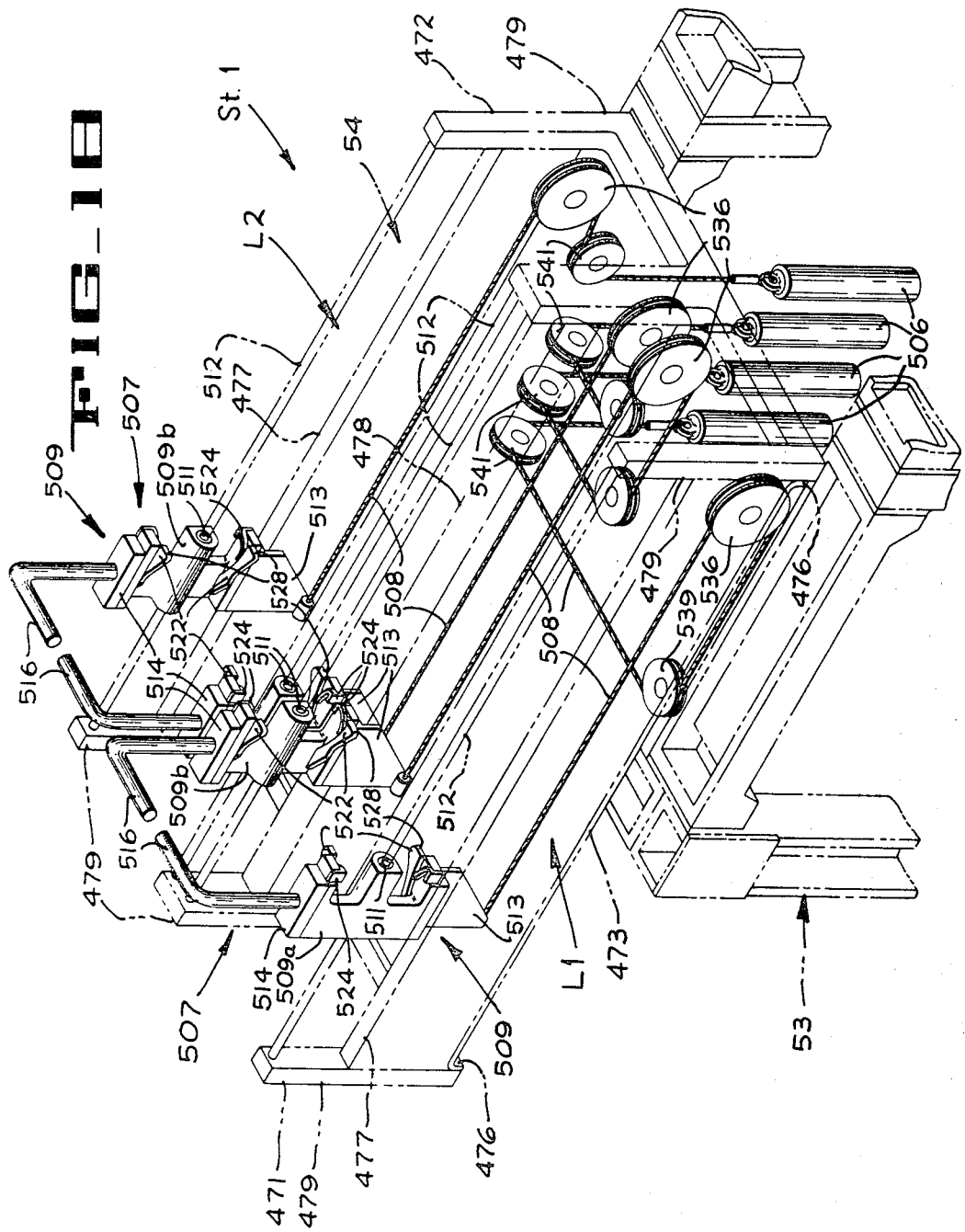

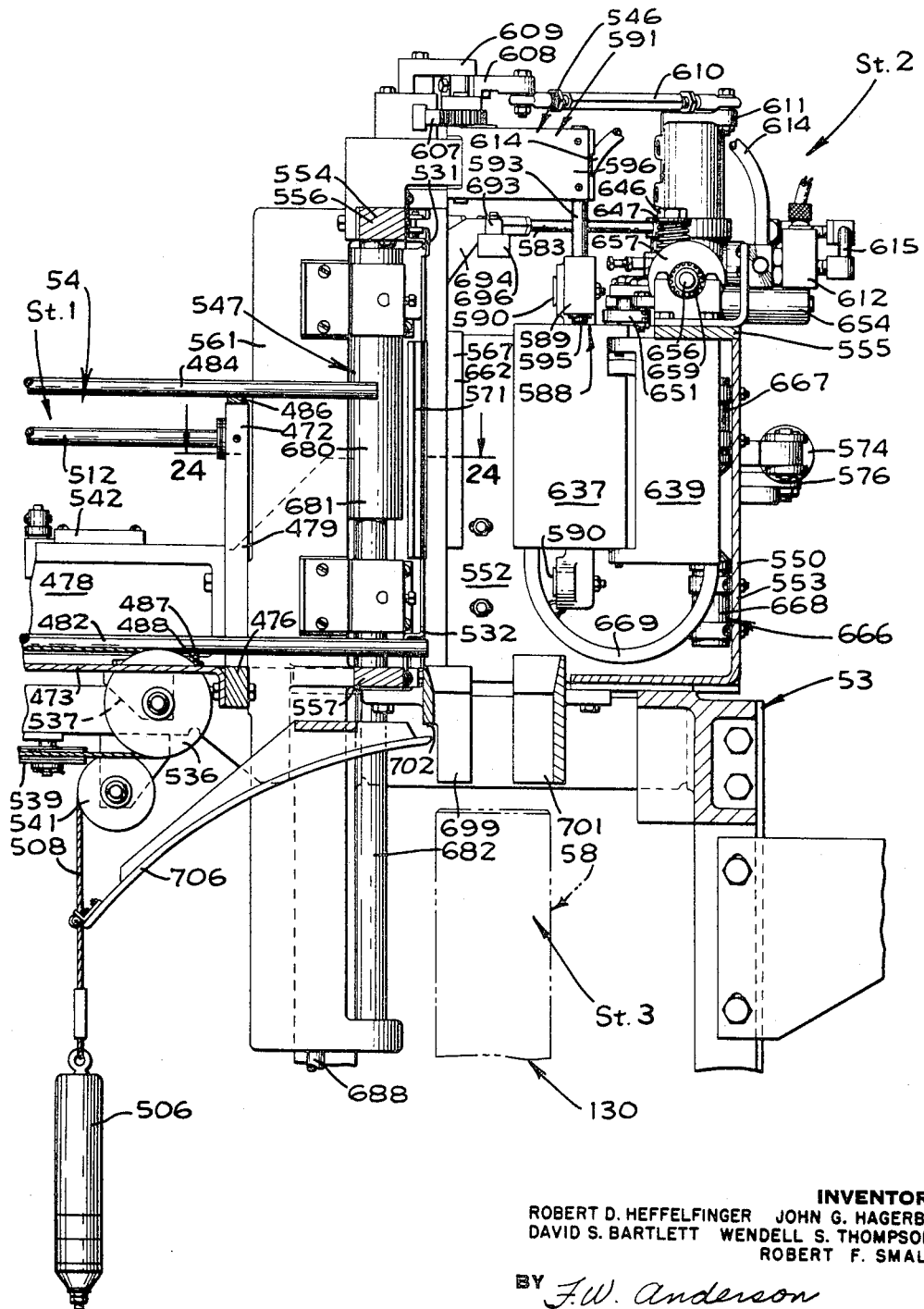

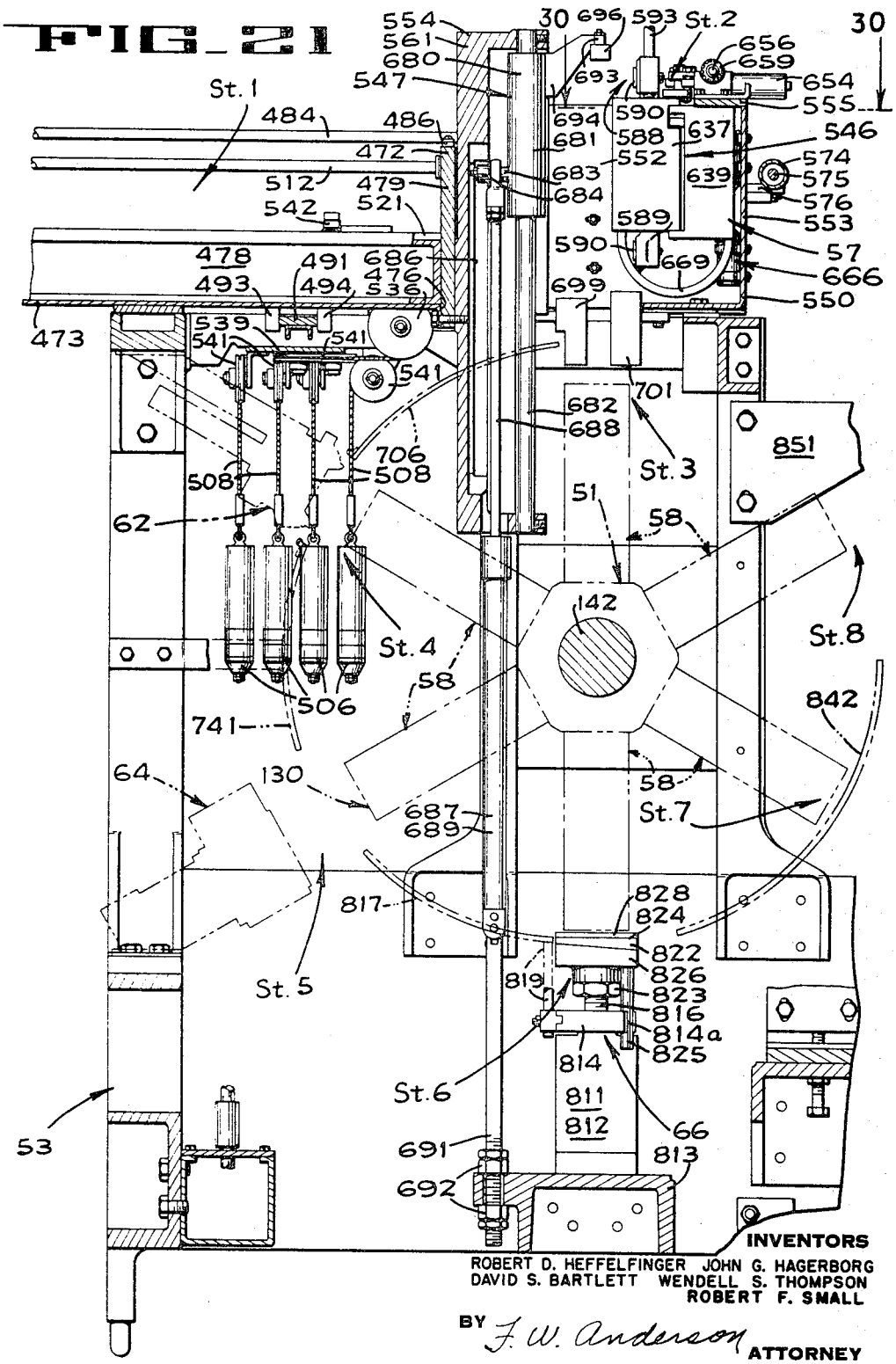

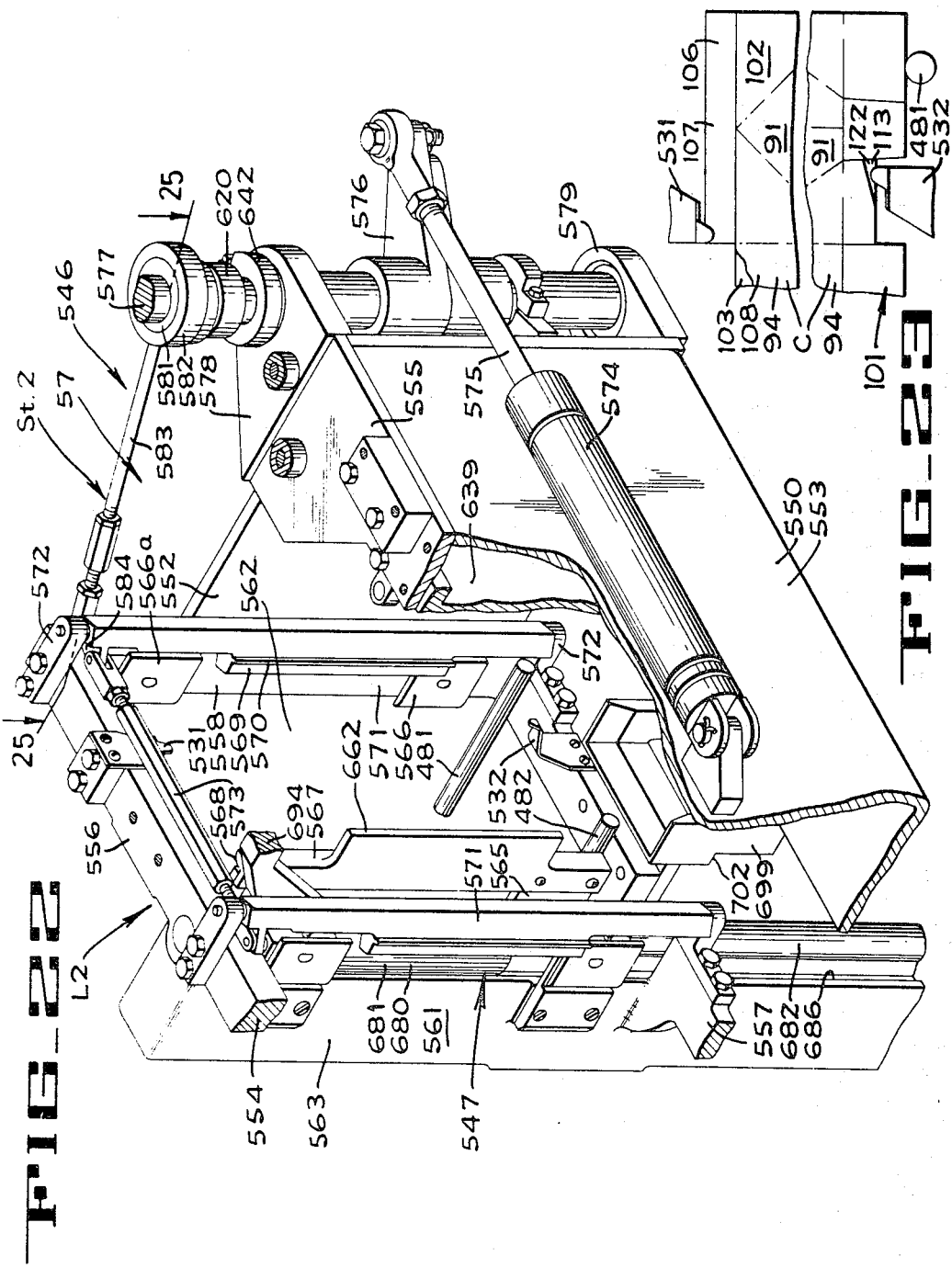

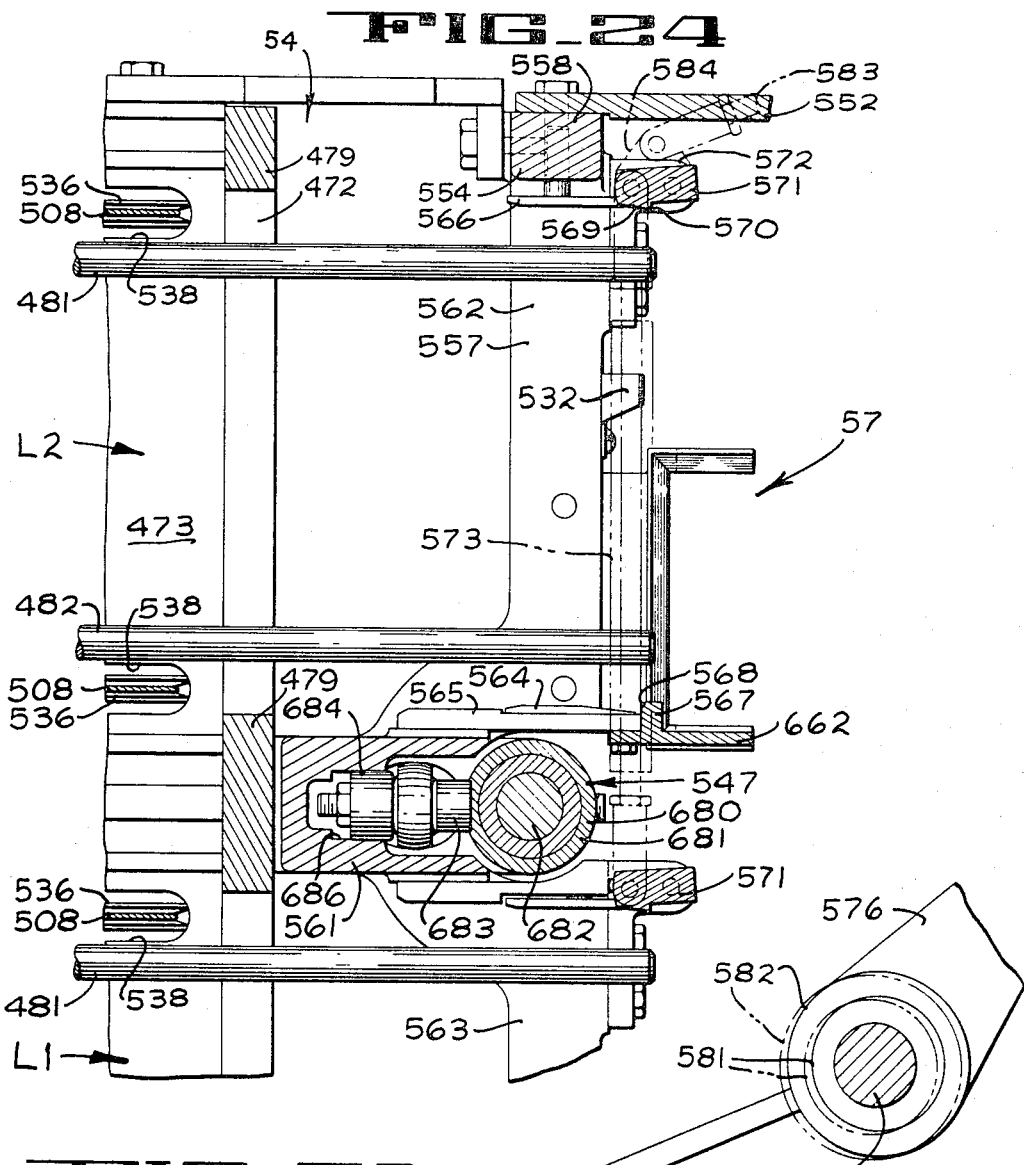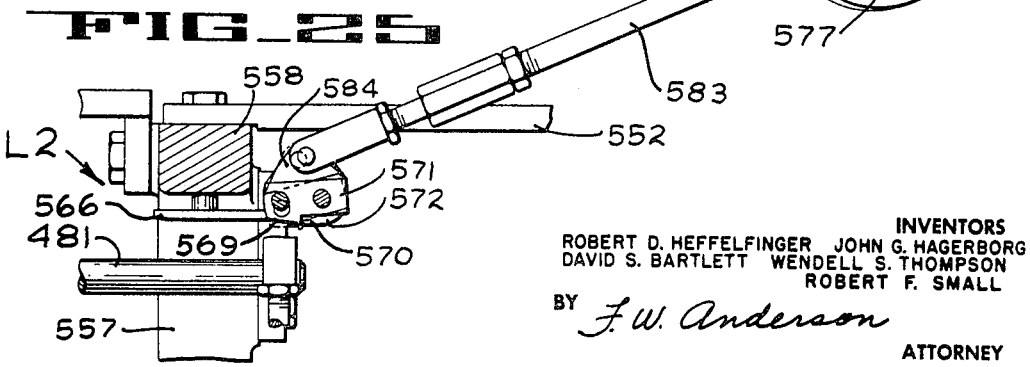

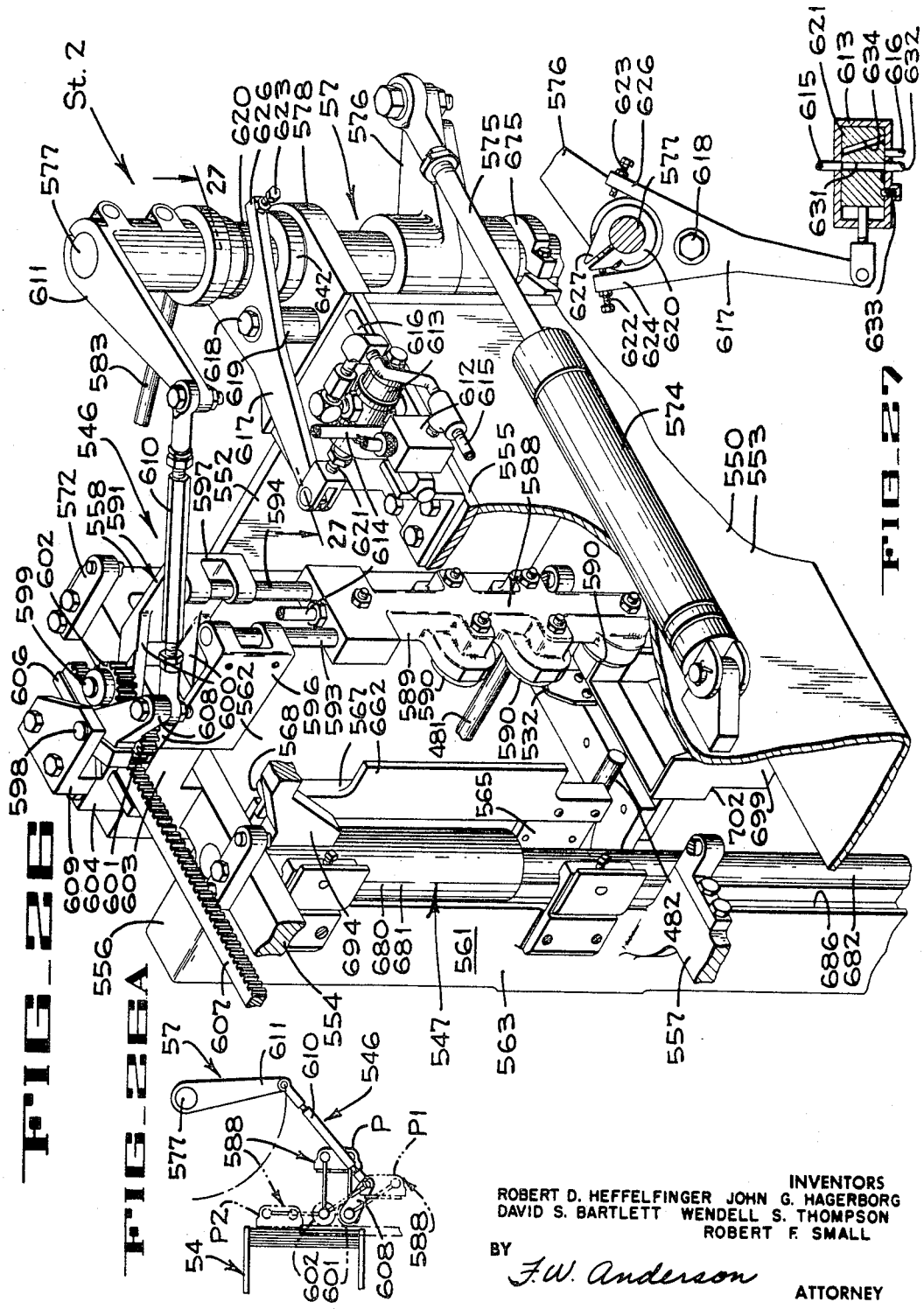

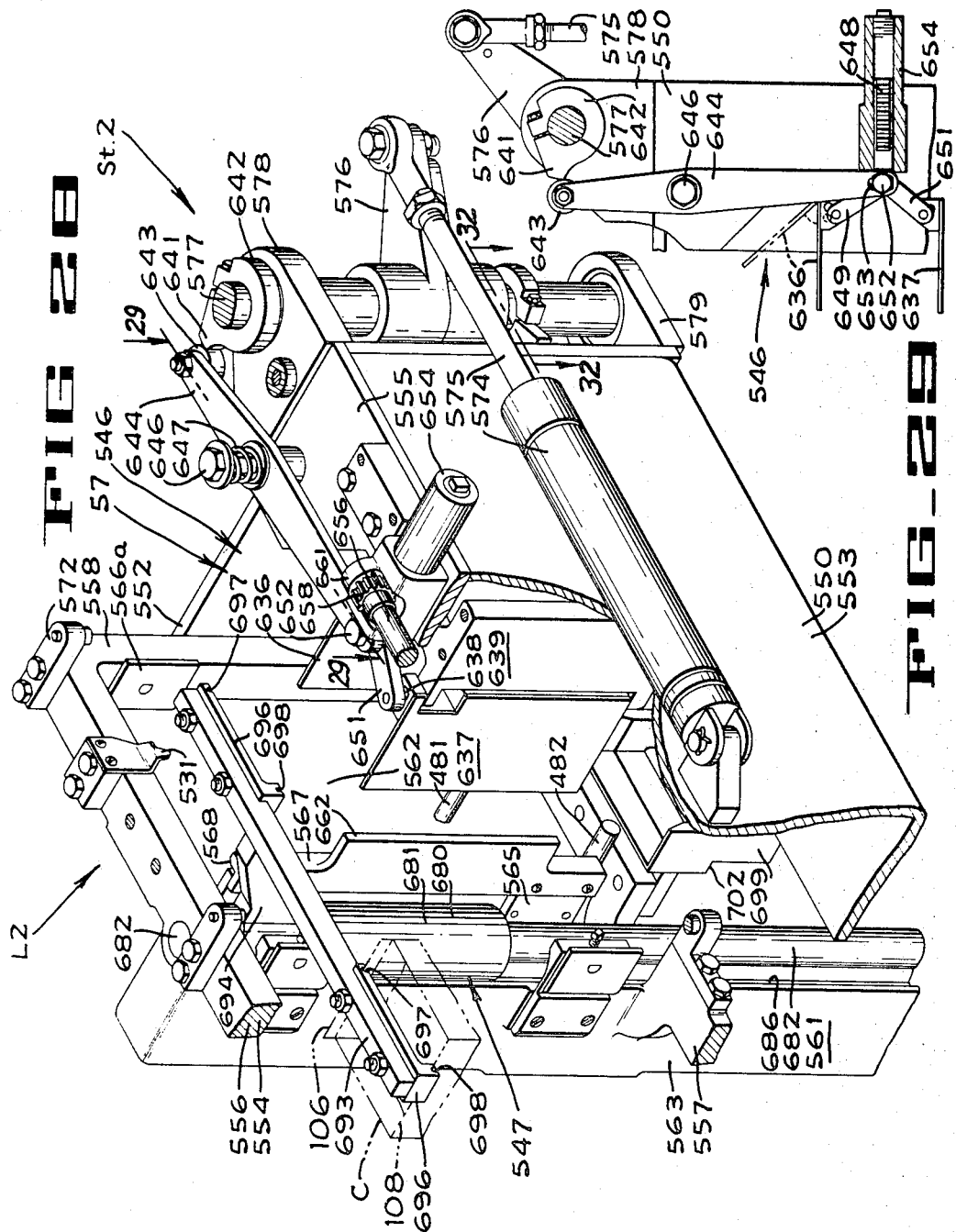

Nov. 5, 1968   R. D. HEFFELFINGER ET AL   3,408,906
METHOD OF AND MACHINE FOR FORMING CONTAINERS
Original Filed Aug. 10, 1962   30 Sheets-Sheet 19
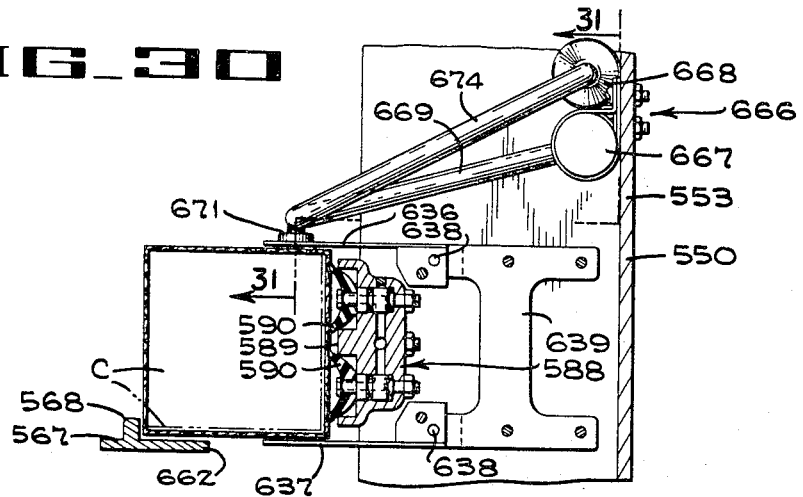
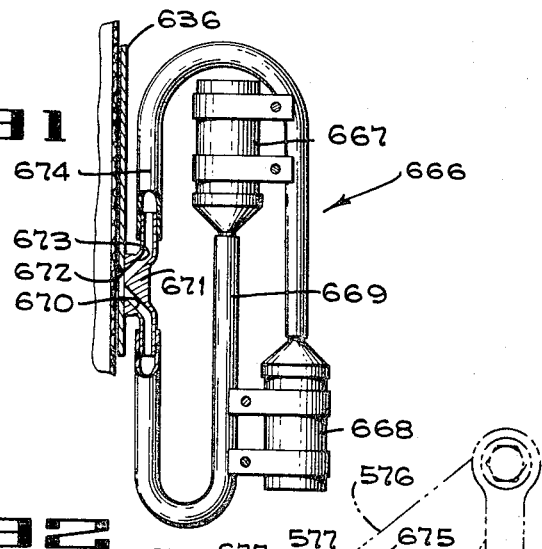
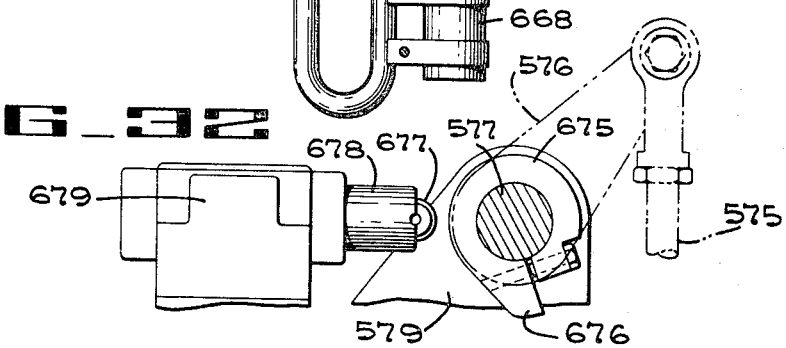
INVENTORS
ROBERT D. HEFFELFINGER  JOHN G. HAGERBORG
DAVID S. BARTLETT  WENDELL S. THOMPSON
ROBERT F. SMALL
BY
*F. W. Anderson*
ATTORNEY

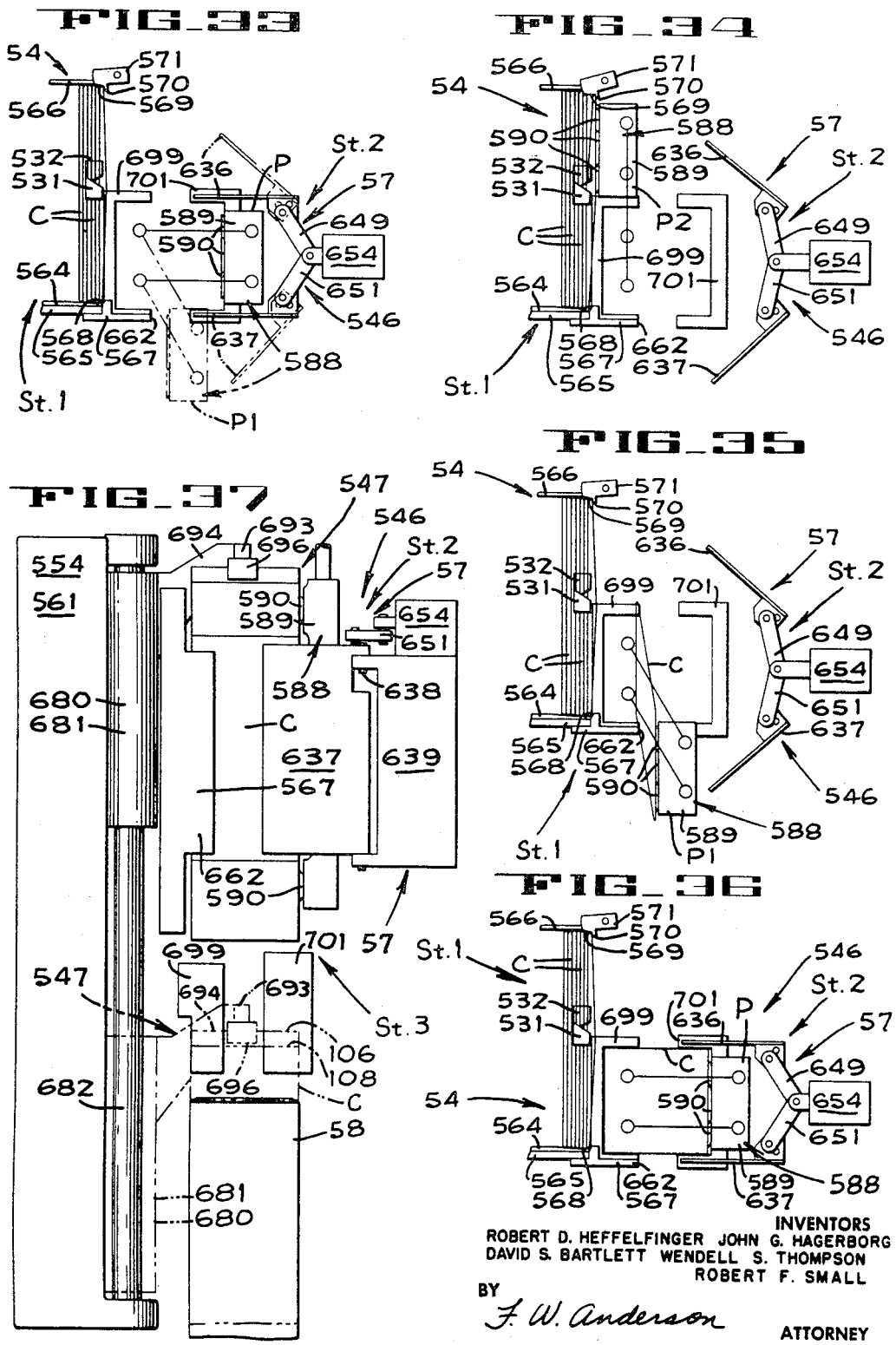

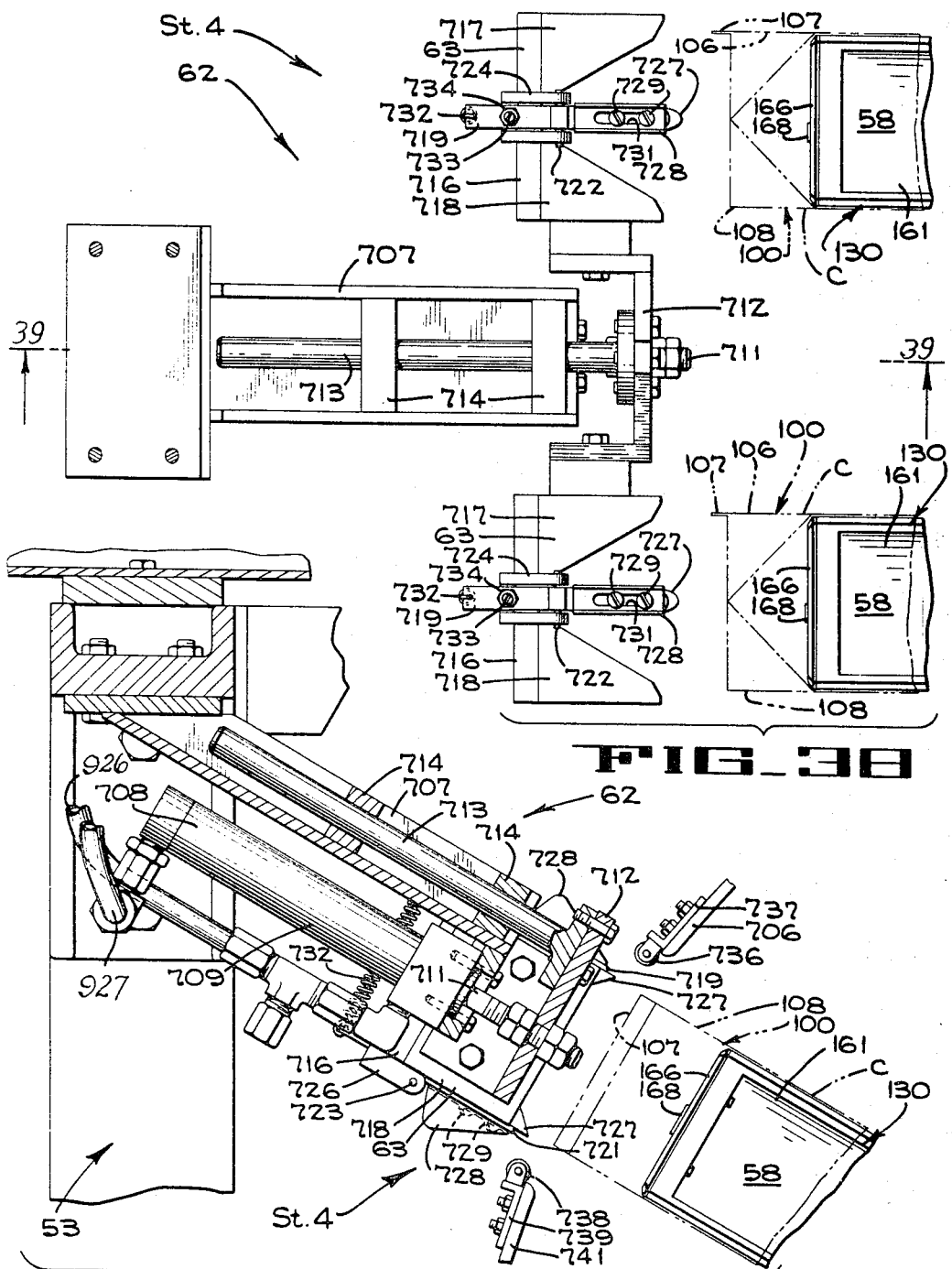

Nov. 5, 1968 R. D. HEFFELFINGER ET AL 3,408,906
METHOD OF AND MACHINE FOR FORMING CONTAINERS
Original Filed Aug. 10, 1962 30 Sheets-Sheet 22
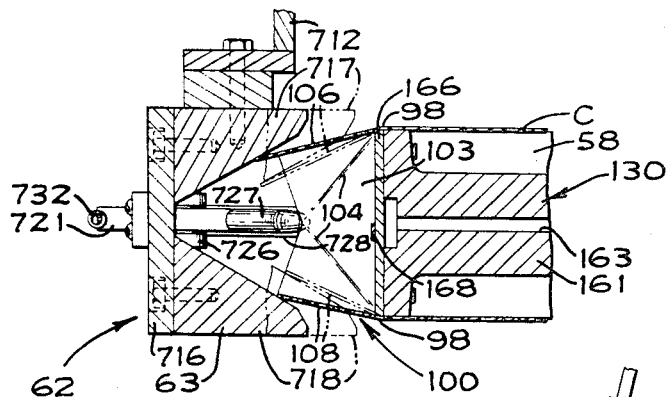
FIG_41
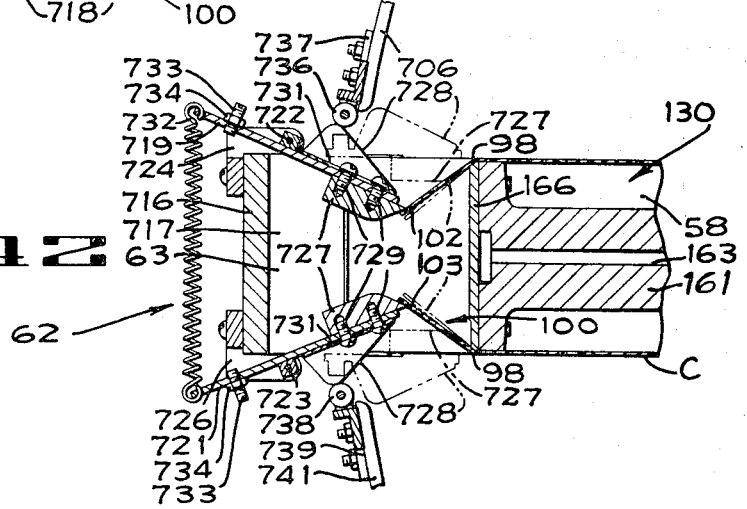
FIG_42
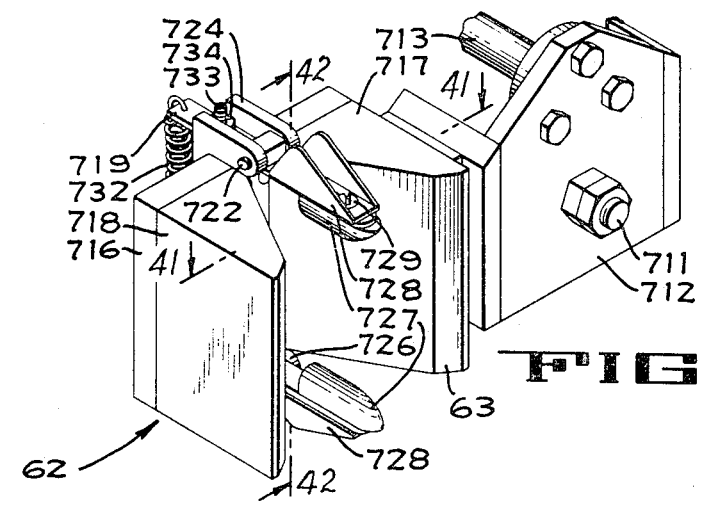
FIG_40
INVENTORS
ROBERT D. HEFFELFINGER   JOHN G. HAGERBORG
DAVID S. BARTLETT   WENDELL S. THOMPSON
ROBERT F. SMALL
BY *F. W. Anderson*
ATTORNEY Nov. 5, 1968   R. D. HEFFELFINGER ET AL   3,408,906
METHOD OF AND MACHINE FOR FORMING CONTAINERS
Original Filed Aug. 10, 1962   30 Sheets-Sheet 23
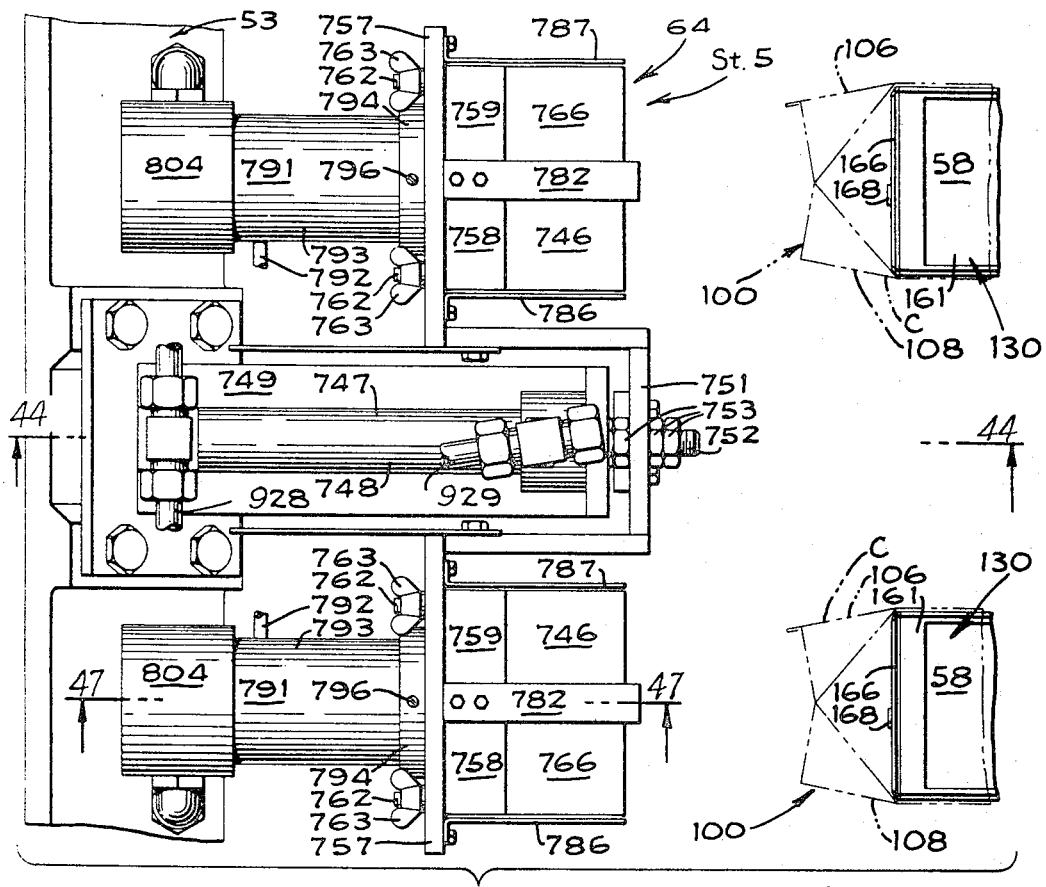
FIG_43
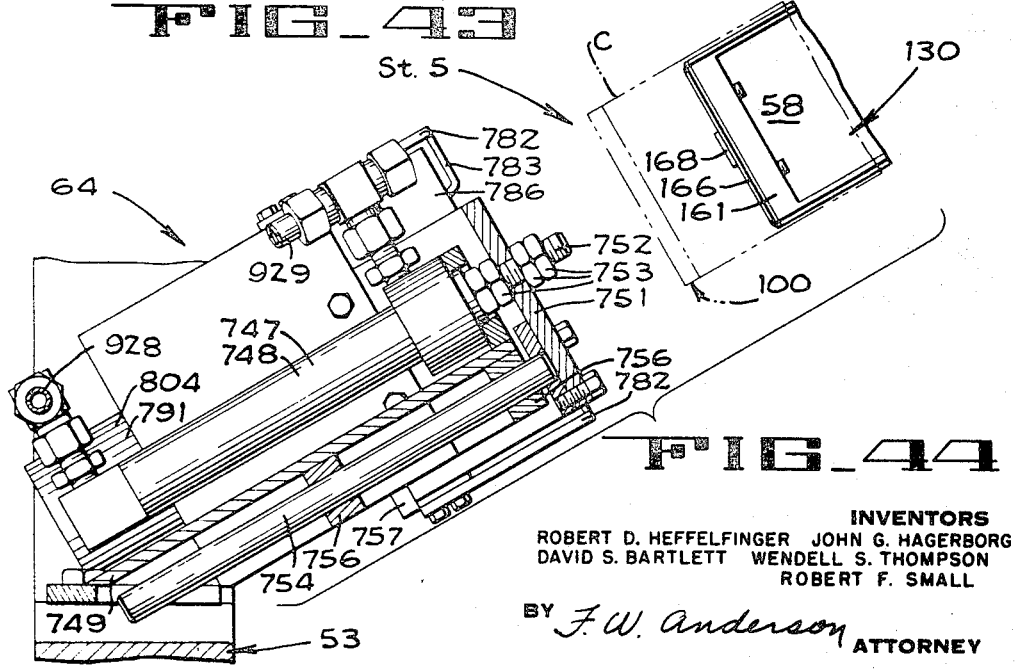
FIG_44
INVENTORS
ROBERT D. HEFFELFINGER   JOHN G. HAGERBORG
DAVID S. BARTLETT   WENDELL S. THOMPSON
ROBERT F. SMALL
BY F. W. Anderson
ATTORNEY Nov. 5, 1968  R. D. HEFFELFINGER ET AL  3,408,906
METHOD OF AND MACHINE FOR FORMING CONTAINERS
Original Filed Aug. 10, 1962  30 Sheets-Sheet 24
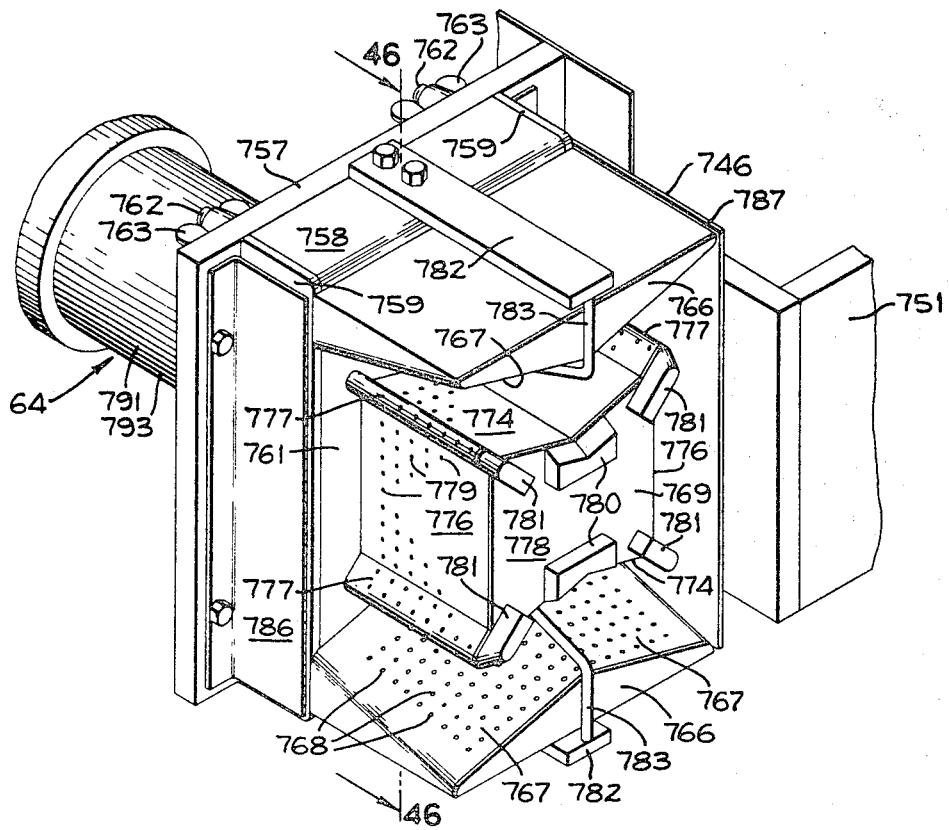
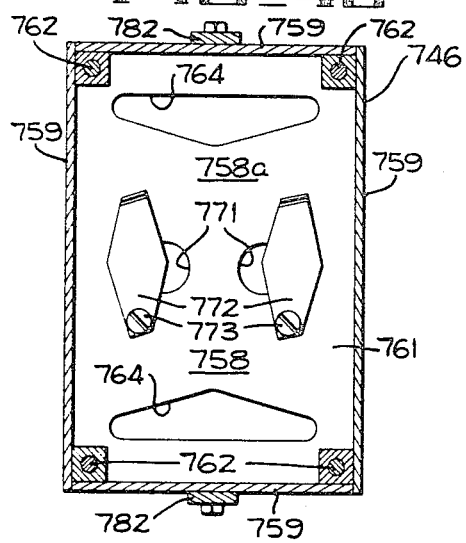
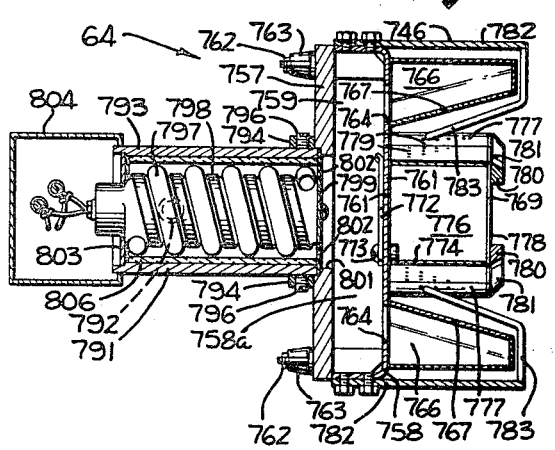
INVENTORS
ROBERT D. HEFFELFINGER  JOHN G. HAGERBORG
DAVID S. BARTLETT  WENDELL S. THOMPSON
ROBERT F. SMALL
BY F.W. Anderson
ATTORNEY

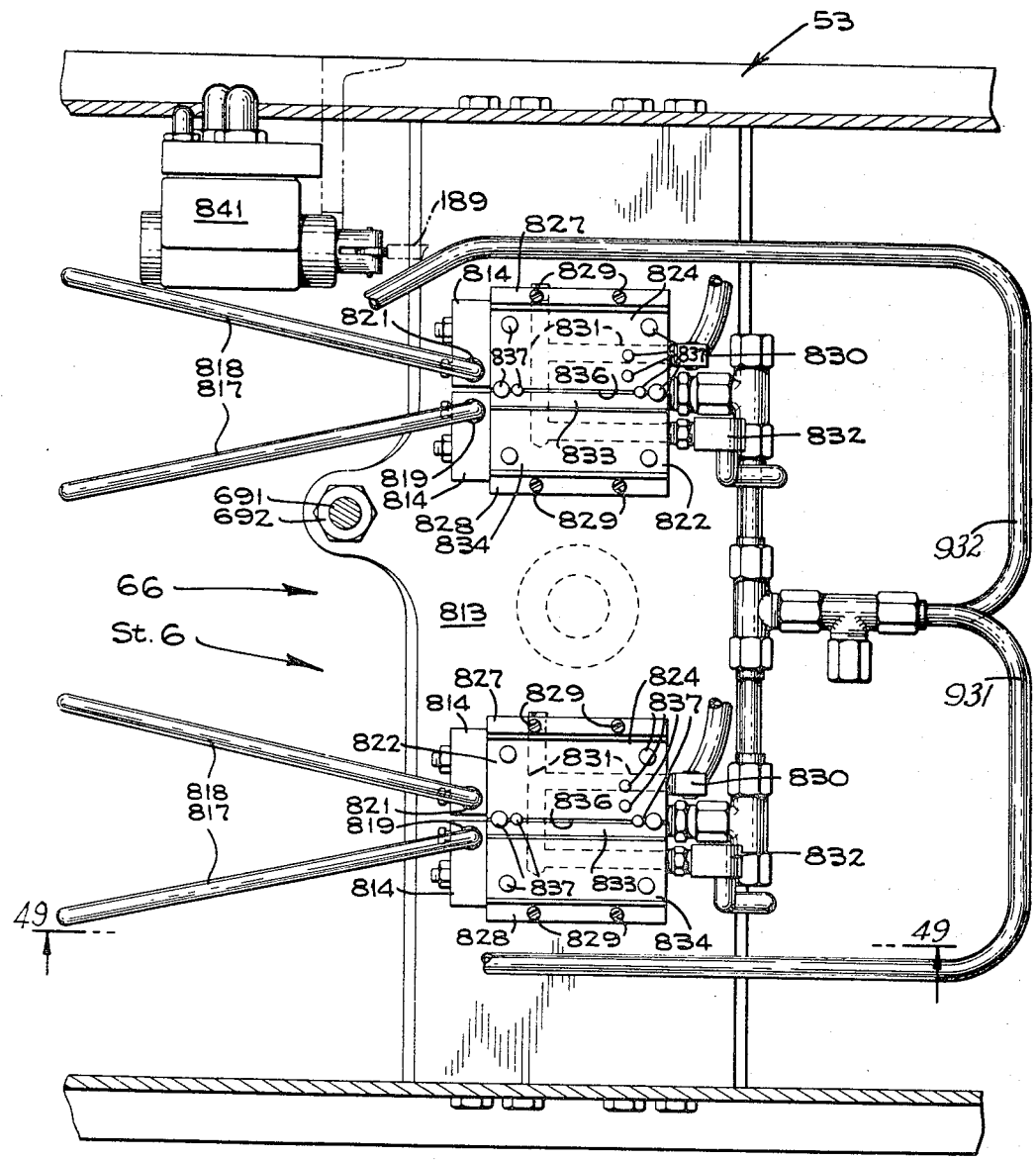

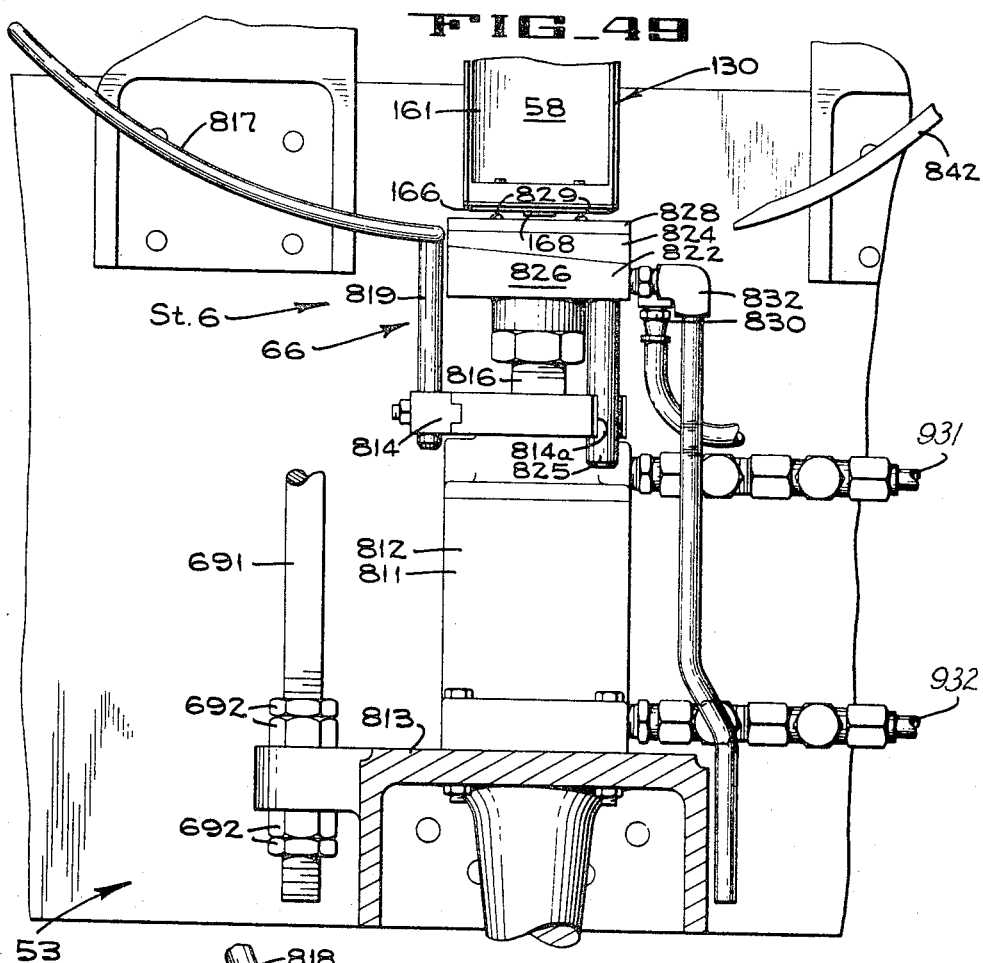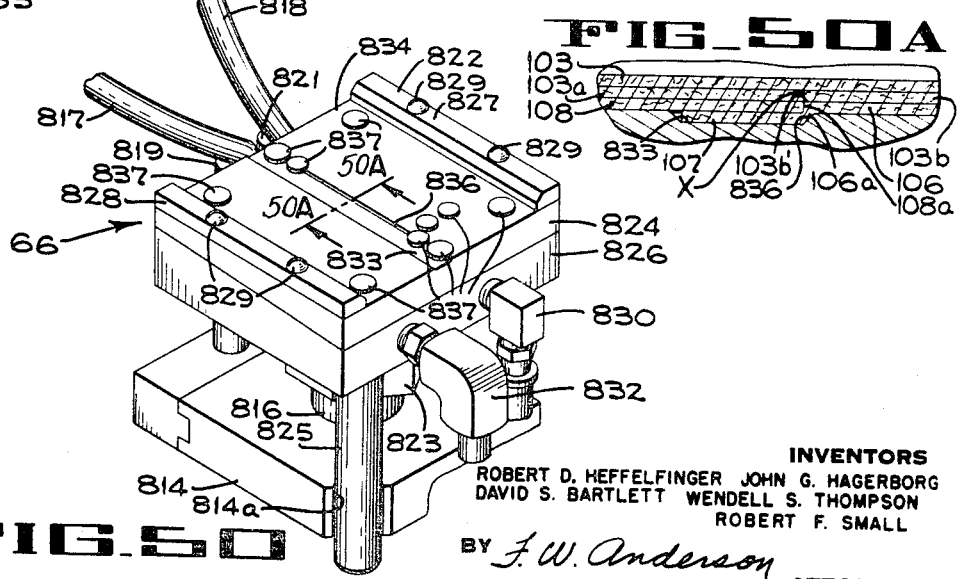

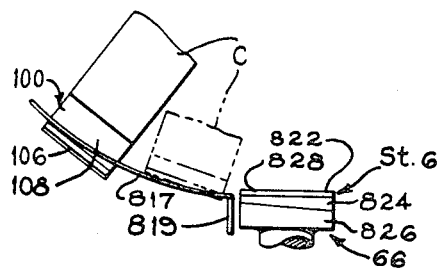
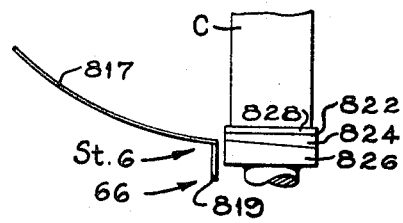
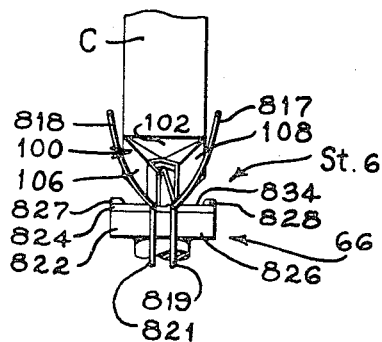
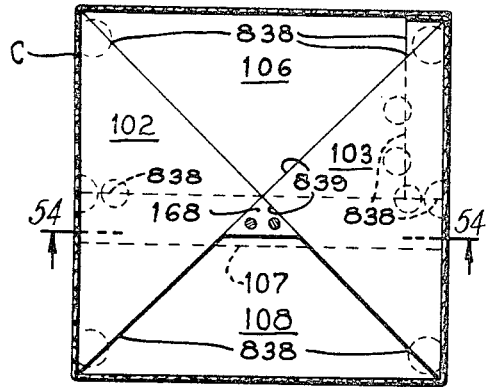
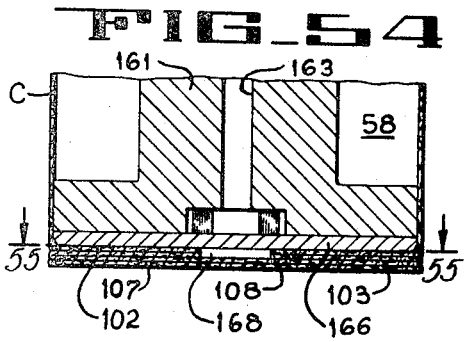

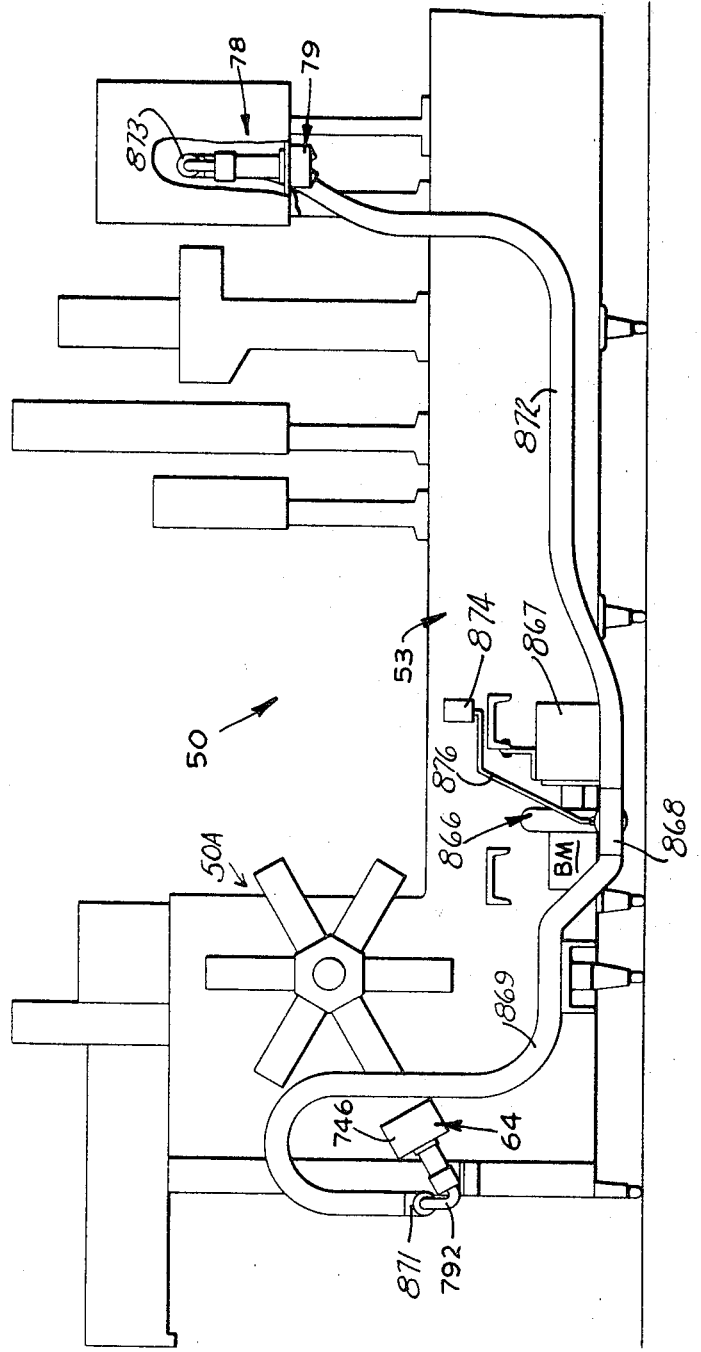

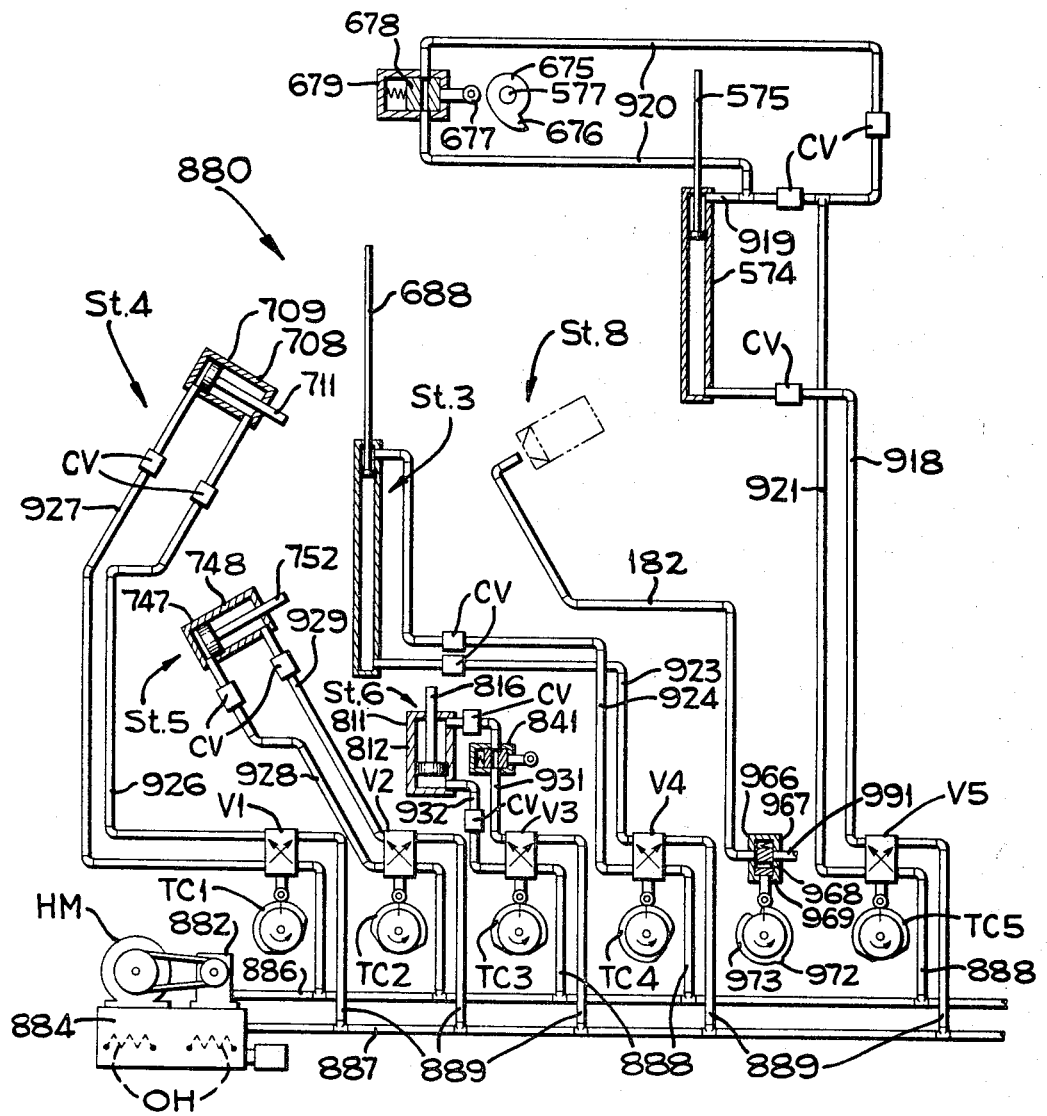

Nov. 5, 1968  R. D. HEFFELFINGER ET AL  3,408,906
METHOD OF AND MACHINE FOR FORMING CONTAINERS
Original Filed Aug. 10, 1962  30 Sheets-Sheet 30
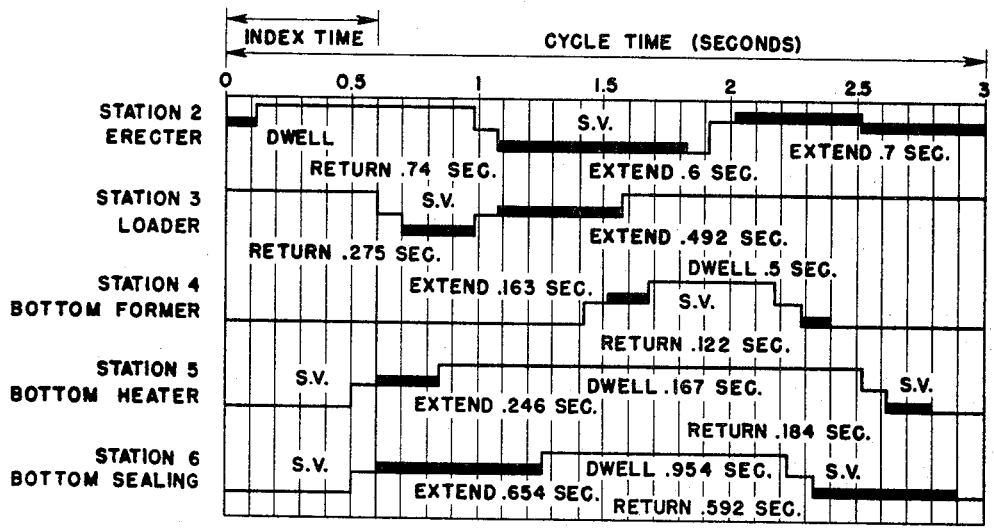
FIG_60
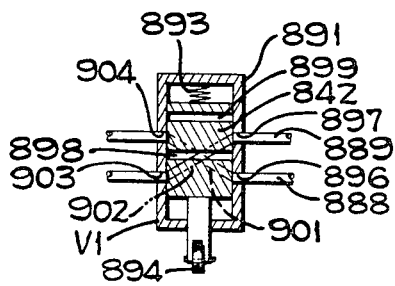
FIG 58
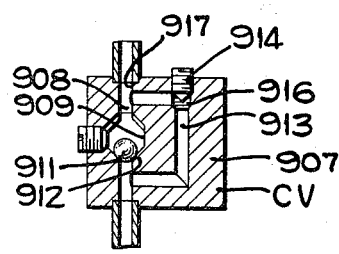
FIG 59
INVENTORS
ROBERT D. HEFFELFINGER   JOHN G. HAGERBORG
DAVID S. BARTLETT   WENDELL S. THOMPSON
ROBERT F. SMALL
BY F. W. Anderson
ATTORNEY

United States Patent Office 3,408,906
Patented Nov. 5, 1968

3,408,906
METHOD OF AND MACHINE FOR FORMING CONTAINERS
Robert D. Heffelfinger, Saratoga, Calif., John G. Hagerborg, St.-Niklaas, Pays de Waas, Belgium, and David S. Bartlett, Wendell S. Thompson, and Robert F. Small, San Jose, Calif., assignors to FMC Corporation, San Jose, Calif., a corporation of Delaware
Original application Aug. 10, 1962, Ser. No. 216,248, now Patent No. 3,248,841, dated May 3, 1966. Divided and this application Feb. 11, 1966, Ser. No. 526,874
21 Claims. (Cl. 93—44.1)

ABSTRACT OF THE DISCLOSURE

A carton forming machine and method wherein cartons are erected from collapsed carton blanks and are placed on intermittently driven mandrels. The mandrels are mounted on a turret and are past three stations spaced equal distances apart. The mandrels are intermittently indexed at a first station where flaps of each carton are bent inwardly, are indexed at a second station where selected surfaces of the flaps are heated, are moved between the second and a third station during which time the flaps are folded together, and are then sealed together at the third station by applying pressure to the heated flaps to seal the same.

---

This application is a division of our copending application Serial No. 216,248, which was filed on August 10, 1962, and issued on May 3, 1966 as Patent No. 3,248,841.

The present invention pertains to packaging equipment and more particularly relates to a method of and machine for forming containers.

Heretofore containers, hereinafter referred to as cartons, have been preformed by the carton manufacturer and shipped to the dairy in the assembled form for filling and closing. The carton forming and filling machine, of which the carton forming machine of the present invention is a part, is arranged to be installed at the dairy and is designed to handle collapsed cartons, hereinafter referred to as blanks, rather than preformed cartons, in order to save storage space, facilitate handling and reduce the cost of the cartons. The forming machine automatically erects the collapsed cartons, and seals the bottoms of the cartons. The filling portion of the machine, which portion is fully disclosed in the parent application, sterilizes the cartons, fills the cartons with sterile milk, closes the upper end of each carton, stamps suitable codes or names on the cartons, and then discharges the filled and sealed cartons from the machine.

Since the output of dairies vary considerably, the carton forming and filling machine has been designed so that its capacity can easily be changed by changing the number of production lines in the machine.

The construction of the carton handled by this machine is not a part of the present invention. In its preferred form the carton to be handled by the machine described herein is of the two quart capacity, and is made of a thermoplastic laminate, including a laminated cardboard inner base layer with a polyethylene coating on both the outside and the inside of the base layer.

It is therefore, one object of the present invention to provide a carton forming machine capable of forming sturdy cartons which do not leak.

Another object is to provide an improved method of forming cartons.

Another object is to provide an improved carton forming machine for handling heat sealed cartons.

Another object is to provide a carton forming machine adapted to intermittently move a line of cartons along an arcuate path past a first plurality of processing stations.

Another object is to provide a carton forming machine having a plurality of bottom forming stations disposed in an arcuate array around a turret.

Another object is to provide an improved easily loaded magazine.

Another object is to provide a carton erecting apparatus having a carton singulating gate.

Another object is to provide a carton erecting apparatus arranged to bend carton blanks to compensate for the inherent resilience at the carton seam lines.

Another object is to provide an improved carton erecting apparatus.

Another object is to provide an improved method of erecting a tubular carton from a folded carton blank.

Another object is to provide an improved method of sealing the bottom of a carton.

Another object is to provide an apparatus for providing a leakproof bottom closure of a carton.

Another object is to provide an improved die for preforming the bottom closure of a carton.

Another object is to provide an improved apparatus for forming a carton from a folded carton blank and sealing its bottom closure.

Another object is to provide an improved method of forming a carton from a folded carton blank and sealing its bottom closure.

Another object is to provide a bottom sealing head having means therein for breaking the natural seam lines to prevent flow of fluid therepast.

Another object is to provide an improved bottom heating head for directing hot air only at those surfaces of the bottom closure which are to be sealed together.

These and other objects and advantages of the present invention will become apparent from the following description and the accompanying drawings, in which:

FIGURE 1 is a perspective of a carton forming and filling machine of which the carton forming machine of the present invention is a part, the view being taken looking at the elongate left side and the relatively narrow rear end of the machine.

FIGURE 2 is a diagrammatic elevation of the right side of the carton forming and filling machine, certain protective housings being removed.

FIGURE 3 is a diagrammatic plan of the machine of FIGURE 2.

FIGURE 4 is a diagrammatic front elevation of the machine of FIGURE 2, taken looking in the direction of arrows 4—4 of FIGURE 2.

FIGURE 5 is a perspective showing the upper end of a stack of folded carton blanks of the type supplied to the machine for processing.

FIGURE 6 is a perspective of a single folded carton blank.

FIGURE 7 is a perspective of a filled and sealed carton.

FIGURE 8A is a perspective showing the bottom flaps of the carton after certain breaking and forming operations have been performed thereon.

FIGURE 8B is a perspective of the completely formed and sealed bottom of the carton with the channel breaking depressions shown therein.

FIGURES 9A, 9B, and 9C are perspectives of the top of the carton showing progressive positions of the upper carton flaps after certain forming operations have been performed thereon.

FIGURE 9D is a side elevation showing the top of the carton when completely closed.

FIGURE 10 is an enlarged transverse vertical section of the turret taken along lines 10—10 of FIGURE 3, certain parts being cut away and other parts being shown in section.

FIGURE 11 is a vertical section taken along lines 11—11 of FIGURE 10.

FIGURE 12 is a transverse section of one of the mandrels taken along lines 12—12 of FIGURE 10.

FIGURE 13 is an end elevation of one of the mandrels looking in the direction of arrows 13—13 of FIGURE 10.

FIGURE 14 is a vertical section taken along lines 14—14 of FIGURE 10 showing an air inlet manifold.

FIGURES 15A and 15B when placed side-by-side form a plan of the magazine, and the carton erecting and turret loading apparatus, certain parts being cut away and others being shown in section.

FIGURE 15C is a diagrammatic view showing the vacuum supply conduit system for the suction cups.

FIGURE 16 is a transverse section of the magazine taken along lines 16—16 of FIGURE 15A, a pair of cartons being shown in phantom lines.

FIGURE 17 is a transverse section of the magazine taken along lines 17—17 of FIGURE 15B.

FIGURE 18 is a perspective of the magazine showing the structure for advancing the cartons in full lines and showing certain frame parts in phantom.

FIGURE 19 is an enlarged horizontal section taken along lines 19—19 of FIGURE 16 and showing one of the carton advancing fingers of the magazine.

FIGURE 20 is a transverse section of a portion of the magazine and of the carton erecting mechanism taken along lines 20—20 of FIGURE 15B.

FIGURE 21 is a fragmentary transverse central section taken along lines 21—21 of FIGURES 15A and 15B and showing certain operative structure of the carton erecting mechanism, certain associated parts being shown in phantom.

FIGURE 22 is a perspective of a portion of the carton erecting apparatus illustrating carton controlling gates which aid in the timed removal of cartons from the magazine, certain parts being removed and others being shown in section.

FIGURE 23 is an enlarged fragmentary elevation of a carton showing the points of engagement of carton erecting fingers with the carton.

FIGURE 24 is an enlarged section taken along lines 24—24 of FIGURE 20 showing the gates of FIGURE 22.

FIGURE 25 is a section taken along lines 25—25 of FIGURE 22 showing the gates in two operative positions.

FIGURE 26 is a perspective similar to FIGURE 22 but showing the suction cup assembly and asociated parts, certain parts being removed and other parts being shown in section.

FIGURE 26A is a diagrammatic plan showing various operating positions of the suction cup support mechanism.

FIGURE 27 is a horizontal section taken substantially along the lines 27—27 of FIGURE 26 schematically illustrating an air control valve in central section.

FIGURE 28 is a perspective taken in the same direction as FIGURES 22 and 26 but showing mechanism for maintaining each carton in squared position as the carton is moved onto a mandrel, certain parts being removed and other parts being shown in section.

FIGURE 29 is a horizontal section taken substantially along the lines 29—29 of FIGURE 28 and showing a rack housing in central section.

FIGURE 30 is an enlarged horizontal section taken along lines 30—30 of FIGURE 21 and showing a sonic sensing unit for detecting improperly erected cartons.

FIGURE 31 is a section taken along lines 31—31 of FIGURE 30.

FIGURE 32 is a horizontal section taken along lines 32—32 of FIGURE 28 and showing a speed control valve.

FIGURES 33 through 36 are operational views showing the progressive stages in the operation of the carton erecting mechanism.

FIGURE 37 is a schematic operational view showing the turret loading mechanism in two operative positions.

FIGURE 38 is an enlarged plan taken looking in the direction of arrows 38—38 of FIGURE 2, showing the bottom forming apparatus in a retracted position.

FIGURE 39 is a vertical section taken along lines 39—39 of FIGURE 38.

FIGURE 40 is a perspective showing one of the bottom forming dies of the bottom forming apparatus.

FIGURE 41 is a schematic section taken along lines 41—41 of FIGURE 40 and showing two operative positions of the die that is bending the flaps of a carton on one of the mandrels.

FIGURE 42 is a schematic section taken along lines 42—42 of FIGURE 40 and showing two operative positions of the die.

FIGURE 43 is a top view of the bottom heating apparatus, the view having been taken looking in the direction of the arrows 43—43 in FIGURE 2.

FIGURE 44 is a section taken along lines 44—44 of FIGURE 43.

FIGURE 45 is an enlarged perspective of one of the bottom heating heads of the bottom heating apparatus, certain parts being broken away and other parts being shown in section.

FIGURE 46 is a section taken along lines 46—46 of FIGURE 45.

FIGURE 47 is a section taken along lines 47—47 of FIGURE 43 showing the heating element of the bottom heating heads.

FIGURE 48 is an enlarged horizontal section taken along lines 48—48 of FIGURE 2 showing the bottom sealing apparatus.

FIGURE 49 is a vertical section taken along lines 49—49 of FIGURE 48.

FIGURE 50 is a perspective of a bottom sealing die used in the bottom sealing apparatus.

FIGURE 50A is an enlarged section taken on line 50A—50A of FIGURE 50.

FIGURES 51, 52, and 53 are operational views showing the carton in different operative positions.

FIGURE 54 is a vertical section through a mandrel and through the carton, taken along lines 54—54 of FIGURE 55 and showing the manner in which the carton flaps of the bottom closure are compressed.

FIGURE 55 is a section taken along lines 55—55 of FIGURE 54 showing the interior construction of the bottom closure.

FIGURE 56 is a diagrammatic elevation showing a low pressure air distribution system for the bottom and top heating apparatus.

FIGURE 57 is a diagrammatic illustration of that portion of the hydraulic system associated with the carton forming machine.

FIGURE 58 is a central section through one of several four-way hydraulic valves used in the hydraulic system.

FIGURE 59 is a central section through one of several speed control valves in the hydraulic system.

FIGURE 60 is a chart illustrating the timing of the several hydraulic rams used in the portion of the hydraulic system associated with the forming machine.

*General description*

Although the carton forming and filling machine 50 (FIGS. 1 to 4), which includes the carton forming machine 50A of the present invention, will be shown and described as a machine for packaging milk in half gallon cartons C, it will be understood that it is within the scope of the present inventon to fill other liquids into eiher half gallon or other size cartons. Because of the numerous operations performed on the cartons as they pass through the machine, the different sections of the machine at which successive operations on the carton are carried out will be identified as consecutively numbered Stations St. 1 through St. 18.

As best shown in FIG. 3, the illustrated embodiment of the machine has two processing lines L1 and L2, each of which processes cartons at the rate of twenty cartons per minute. In the description to follow, when parts associated with the lines L1 and L2 are identical, only those parts associated with one of the lines will be described in detail. It is to be understood that it is within the scope of the invention to provide as many lines as needed to achieve the desired rate of discharge.

The carton forming and filling machine 50 has two main sections: a carton erecting section which comprises the carton forming machine 50A of the present invention and which is disposed at the front or left hand end of the machine (FIGS. 2 and 3) and includes stations St. 1–St. 8; and a carton filling and closing section which includes stations St. 9–St. 18. In general, between stations St. 1 and St. 8 a carton is erected and placed on a turret 51 and its bottom is closed and sealed. In the carton filling and closing section, a conveyor assembly 52 is mounted on a frame 53 and includes two endless carton supporting conveyors 52a and 52b (FIG. 3) which advance the cartons along the lines L1 and L2, respectively.

A magazine 54 of the carton forming machine 50A at Station 1 is mounted on the frame 53 and is arranged to receive a stack of tubular carton blanks 56 (FIG. 5) in flat folded form. In the magazine, the blanks are held in upright position extending transversely of the magazine with the end of the blank, which forms the top of the carton when it is erected, disposed lowermost in the magazine. The magazine 54 includes means for urging the carton blanks 56 rearwardly in the machine toward a carton erecting and turret loading apparatus 57 (FIG. 2) at Station 2. This erecting and loading apparatus 57 removes one carton blank at a time from the magazine, for each line, squares each carton blank into an open ended rectangular tube, and moves each of the squared tubular carton blanks downwardly at Station 3 over one of six carton forming mandrels 58 in the associated processing line which are carried by and are evenly spaced around the turret 51.

The turret 51 and conveyors 52a and 52b are intermittently driven by a drive mechanism 59 which is timed so as to require approximately six-tenths of a second for each increment of movement and to allow each carton to remain at each Station for approximately two and four-tenths seconds. As shown in FIG. 2, intermittent indexing of the turret 51 advances the cartons along an arcuate counterclockwise path from Station 3 to Station 8 during which time operations are performed on the bottom of the cartons, and intermittent movement of the conveyors 52a and 52b advances the cartons along a linear path from Station 9 to Station 18 during which time operations are performed on or are associated with the tops of the cartons. It will be understood that the drive mechanism 59 drives the turret 51 so that each indexing motion of drive 59 advances each mandrel 58 from one station to the next, however, each indexing motion only advances the conveyors 52a and 52b in half-station increments and therefore cartons on conveyors 52a and 52b will come to rest between stations.

When a carton is positioned at Station 4, a bottom forming apparatus 62 is actuated to force a bottom forming die 63 against the lower end flaps of the carton thereby causing the end flaps to bend at their score lines as shown in FIG. 8A. At Station 5, a bottom heating apparatus 64 (FIG. 2) is placed into operation and directs hot air at only those surfaces of the bottom flaps which will subsequently be sealed together by a bottom sealing apparatus 66 (FIG. 4) at Station 6. The carton with its bottom flaps sealed together at Station 6 is then moved past Station 7 (FIG. 2) which is a vacant Station, and into Station 8 at which time high pressure air is directed against the interior face of the bottom wall of the carton through the associated mandrel 58 to reject the carton from the mandrel.

The ejected carton C is guided by a carton transfer and turning mechanism 68 which moves the carton from the inverted to an upright position while at the same time turning the carton 90° about its longitudinal axis. The so-turned carton is received at Station 9 between two adjacent drive lugs 69 of the associated conveyors 52a and 52b.

While at Station 10, a top forming apparatus 71 moves a top forming head 72 downwardly against the upper flaps of the carton to bend these flaps along the score lines so that the upper end of the carton assumes the position shown in FIG. 9A. The carton is then indexed to Station 11 where a sterilizing apparatus 73 moves an ultraviolet light 74 into the carton to thoroughly sterilize the interior of the carton. After the carton has been sterilized, it is moved to Station 12.5 where a carton filling apparatus 76 fills the carton with milk. The filled carton is then moved to Station 14 under a top sizing apparatus 77 which operates to bend additional portions of the top closure into the proper position for heating.

The carton is then moved by the associated conveyor 52a or 52b into Station 14.5 where a top heating apparatus 78 lowers a heating head 79 over the top flaps of the carton, which head 79 is formed so as to direct hot air only at those surfaces of the top flaps which are to be pressed together to seal the top of the carton. After the top flap surfaces have been properly heated, the associated conveyor indexes the carton to Station 15 where a top sealing apparatus 82 forces the heated surfaces of the flaps together to seal the top of the carton.

The conveyor then advances the filled carton to Station 16, which is a vacant station where sample cartons may be removed from the conveyor for testing if desired. When the carton is moved to Station 17, a top stamping apparatus 83 impresses suitable identifying indicia thereon. The filled, sealed, and marked carton is finally advanced to Station 18 where it is moved laterally off the conveyor by a discharge apparatus 84 onto one of two high speed discharge conveyors 86 which are parallel to conveyors 52a and 52b and discharges the carton from the carton forming and filling machine 50 of the present invention.

*The carton*

Although the carton C, itself, does not form a part of the present invention, it will be described in detail in order to facilitate the understanding of the carton forming machine 50A of the present invention.

The material from which carton C is formed is cardboard having a polyethylene coating on both surfaces to provide a finished carton of five barrier construction with a polyethylene coating on its outside and inside surfaces. Each carton blank 56 (FIGS. 5 and 6) is supplied in folded tubular form by the carton manufacturer. The carton blank 56 has four walls 91, 92, 93 and 94 (FIG. 6), with the walls 92 and 93 being connected together by a flange 95 (FIG. 9A) which is connected to wall 93 along fold line 95a and is heat sealed to the wall 92. The front wall 91 (FIG. 6) is provided with a longitudinally extending score line 96 and an inverted V-shaped score line 97 to facilitate slight bending of the carton when milk is to be poured therefrom by the consumer. Transverse score lines 98 and 99 are formed across the lower end and upper end, respectively, of each wall 91, 92, 93 and 94 to facilitate the bending of the bottom closure 100 and top closure 101 relative to the side walls. The bottom closure 100 includes a front flap 102 (FIG. 8A) projecting from wall 91 and a rear flap 103 projecting from wall 93 each flap being provided with V-shaped score lines 104 to facilitate the inward bending of these flaps. The bottom closure also includes a flap 106 of one side that is slightly longer than the opposed bottom flap 108 so as to provide a lip 107 (FIG. 8B) which is adapted to overlap and be subsequently sealed to the bottom flap 108.

The bottom flaps 102 and 103 include a triangular portion 102, 102b and 103a, 103b, respectively. The lip 107 is connected to the flap 106 by a connecting portion 106a, which as will be made apparent hereinafter, is deformed when it is sealed against the edge 108a of the flap 108.

The top closure 101 (FIGS. 7 and 9A) includes a front flap 109 projecting from wall 91, a rear flap 111 projecting from wall 93, a side flap 112 and an opposed side flap 113. Each upper flap includes an upper transverse score line 114 which is disposed above and is parallel to an adjacent score line 99. The cardboard base, but not the polyethylene coating, at the score line 114 on the front flap 109 and portions of the score line 114 on the flaps 112 and 113 adjacent flap 109 are partially perforated to weaken this area so that the top closure can easily be opened by the consumer by tearing along this perforated line. As shown in FIG. 9A, tabs 116 and 117 on the front and rear flaps, 109 and 111, respectively, are bent outwardly, while oblique score lines 118 on the front and rear flaps permit the upper flaps to be bent inwardly. Shallow ears 119 projecting from the front and rear flaps on the side adjacent the flap 112, longer ears 121 on the other side of the front and rear flaps, a narrow lip 122 on the flap 113, and a wide lip 123 on the flap 112 cooperate when the top of the carton is closed to provide a rigid interlaced joint for the top closure 101.

*The turret*

The turret 51 (FIGS. 10 and 11) carries two identical mandrel units 130, each unit including six equally spaced, radially projecting mandrels 58 that move in a vertical plane and are adapted to serve one of the processing lines L1 or L2. At each Station 3, each mandrel receives a carton which has been opened and dropped onto the mandrel at Station 3 with its bottom end uppermost. The turret 51 is intermittently driven so that each mandrel 58 is indexed step by step from Station 3 to Station 8 (FIG. 11) during which time the bottoms of the cartons carried on the mandrels 58 are sealed so that the cartons may be discharged by high pressure air from the turret 51 at Station 8.

The turret 51 comprises a shaft 142 (FIG. 10) which is journalled in bearings 143 and 144 bolted to the frame 53 of the machine. Intermediate the ends of shaft 142, a hub 146 is connected thereto by a key 147 fitted in a keyway 148 in the shaft 142. A pair of hexagonal mandrel hubs 149 are positioned on opposite sides of the gear hub 146, and each mandrel hub 149 is keyed to the shaft 142 by a key 151. A cam hub 152 is also keyed to the shaft 142 by an extension of one of the keys 151. The above mentioned hubs are held from axial movement along the shaft 142 by a snap ring 153 which is fitted in a groove near one end of the shaft 142 and a nut 154 which is screwed on the shaft 142 near its other end and locked in position by a lock ring 156.

Six of the mandrels 58 are bolted to each hexagonal mandrel hub 149 and project radially outwardly therefrom at evenly spaced intervals as indicated in FIGURE 11. Each mandrel 58 includes a body 161 (FIG. 10) having rectangular end portions and an X-shaped intermediate portion as indicated in FIGURES 12 and 13. An air passage 163 extends longitudinally through the center of the body 161 and communicates with four passages 164 (FIG. 13) which are formed in the upper rectangular end of the body 161 and project radially outward relative to the passage 163. A rectangular mandrel head 166 is bolted to the outer end of the body 161 and has four inwardly angled holes 167 therein each of which communicates with one of the passages 164. A V-shaped die 168 (FIG. 13) is mounted on the outer surface of the head 166 and projects outwardly of this surface so as to engage the carton during the bottom sealing operation to compensate for the absence of two thickness of carton material in this area due to the manner of folding the bottom flaps of the carton. The V-shaped die thus effects an increased pressure at its area of contact with the carton thereby preventing leakage through this area.

A carton stop plate 169 is bolted to the inner rectangular end of the mandrel body 161 and engages the edge of the narrow lip 122 (FIG. 9A) of the carton to terminate the downward movement of the carton when the carton is placed on the mandrel. Tab engaging cams 170 (FIGS. 11 and 13) are bolted to the inner end of the body 161 and serve to bend the carton tabs 116 and 117 (FIG. 9A) outwardly when the carton is seated on the mandrel 58.

An air distributor ring 171 (FIG. 10) is mounted on the shaft 142 and is keyed to the shaft by one of the keys 151 which is slotted to receive the snap ring 153. An air sealing ring 172 is secured, as by bolting, to the distributor ring 171 and slidably engages an air inlet manifold 173 which is slidably supported on a flange 174 of the bearing 144. A pin 176, which holds the manifold from rotation, is fitted in the manifold and is slidably received in a hole 177 is the housing 178 of the bearing 144. A plurality of springs 179 (FIG. 14) are fitted in holes 180 in the manifold 173 and in mating holes 181 (FIG. 10) in the housing 178 of the bearing 144.

As mentioned previously, each carton is blown off its associated mandrel 58 when the mandrel is positioned at Station 8. Accordingly, a port 183 is formed in the manifold 173 at Station 8, and high pressure air, under control of a valve to be described presently, is directed from port 183 into the particular one of six equally spaced passages 184 of the mandrel 58 (FIGS. 10 and 11) which is stopped at Station 8. Each passage 184 extends parallel to the shaft 142 through the rings 171 and 172 and through the hubs 146 and 149. The cam hub 152 closes the free end of the passages 184 as indicated in FIGURE 10 and each passage 184 is connected to the passages 163 in the associated mandrels 58 of lines L1 and L2 by ports 186. O-ring 187 are fitted between the mating surfaces of the several parts through which the passages 163 and 184 extend and serve to provide an air tight seal at these surfaces.

A large diameter conveyor drive gear 188 is bolted and pinned to the hub 146, and six equally spaced cam fingers 189 (only two being shown in FIGURE 10) are bolted to the cam hub 152 and project radially outward from the shaft 142 in directions parallel with the axes of the associated mandrels 58. The function of the cam fingers 189 will be made apparent hereinafter in connection with the hydraulic system.

*Turret drive mechanism*

As mentioned previously, the turret 51 and conveyors 52a and 52b are driven intermittently, each movement of the turret moving a carton from one station to the next, while each indexing movement of the conveyors advances cartons thereon only one-half the normal distance between the stations along the conveyors. The length of each indexing movement of the conveyors will be referred to hereinafter as a half-station increment. The drive mechanism 59 (FIGS. 2, 3, 4) is so timed that approximately six tenths of a second is required for each intermittent movement, and the cartons remain in each station or between stations along conveyors 52a and 52b, for approximately two and one half seconds.

The drive mechanism 59 (FIGS. 2, 3 and 4) comprises a drive motor DM which is connected to a gear reducer 192 by a belt drive 193. The motor DM is mounted on a plate 194 (FIG. 4) which is pivoted at its rearward end on a pair of stubshafts 195 projecting from a fixed bracket 200, and has its forward end supported for vertical adjustment by a bolt 196 which is pivoted to the motor plate 194 and extends through a horizontal plate portion of the bracket and is locked in adjustable position by nuts 198. One output shaft (not shown) of the gear reducer 192 is coupled to a Ferguson drive 199 which drives its output shaft 201 intermittently.

The output shaft 201 is coupled to the turret shaft 142 by a coupling 202. The coupling 202 comprises identical axially aligned sprockets 203 and 204 which are keyed to the shafts 142 and 201, respectively, and have a double chain 206 trained therearound. A connector 207 is used to clamp the ends of the chain 206 together, with the chain fitted firmly around the sprockets 203 and 204.

In order to accurately time the operation of the turret 51 and conveyors 52a and 52b with the operating components at the different stations, a second output shaft 268 (FIG. 4) of the gear reducer 192 has a sprocket 269 keyed thereon which is connected to a driven sprocket 270 (FIG. 2) by a chain 271. The driven sprocket 270 is keyed on an idler shaft 272 which is journalled in a bracket 273 bolted to the frame 53. A large diameter cam shaft drive sprocket 274 and a small diameter cycle timer drive sprocket 275 are keyed on the idler shaft 272. A chain 276 (FIG. 4) is trained around the large diameter sprocket 274, around a sprocket 277 keyed to a cam shaft 278, and around an idler sprocket 279 that is journalled on a shaft 280 secured to a cam shaft 284 of an electrical cycle timer full length of the machine 50 (FIG. 2) and is journalled in spaced bracket 281 secured to the frame 53. A plurality of timing cams TC are secured at spaced intervals along the cam shaft 278 and control the actuation of the hydraulic components, to be described hereinafter, of the machine.

The small diameter sprocket 275 (FIGS. 2 and 4) is connected by a chain 287 to a sprocket 283, which is secured to a cam shaft 284 of an electrical cycle timer 286 (FIG. 2) and controls the actuation of electrical impulses to certain portions of the machine.

Thus, it will be seen that the drive mechanism 59 intermittently drives the turret 51 and the conveyors 52a and 52b simultaneously, and also continuously rotates the cam shafts 278 and 284 to control the actuation of certain hydraulic and electrical components in timed relation with the movement of the turret 51 and conveyors 52a and 52b.

*Carton supply magazine*

The magazine 54 (FIGS. 1 and 2) at Station 1 is arranged to hold a supply of collapsed cartons and to move them into position to be removed individually by the carton erecting apparatus. Two rows of collapsed cartons are extending transversely of the row and resting on the end flaps which will eventually form the top wall of the closed carton. The collapsed cartons are urged toward the carton erecting and turret loading apparatus 57 which picks off the foremost folded cartons from each row, opens the cartons to define a tube having a square cross-section, and forces each squared carton down over one of the mandrels 58 which is at that time projecting vertically upwardly at Station 3.

More particularly, the magazine 54 (FIG. 18) comprises a W-shaped end plate 471 at the inlet end of the magazine and a W-shaped end plate 472 at the discharge end of the machine, said end plates being connected by bolts to a floor plate 473 having flanged end portions 476. Upstanding side walls 477 (FIG. 16) and a central wall 478 of I-shaped cross section are bolted to the floor plate 473 and to the upstanding legs 479 (FIG. 18) of the end plates 471 and 472 to provide a rigid magazine frame structure. As best shown in FIGURE 18 the W-shaped end plate 472 and the floor plate 473 are secured to and supported by the frame 53 of the machine 50.

The rows of folded cartons in lines L1 and L2 are each guided by four rods, two rods 481 and 482 (FIGS. 15A, 15B and 16) being arranged to support the cartons and two rods 483 and 484 being arranged to contact and guide the sides of the upright collapsed cartons. The rods 483 and 484 are welded to brackets 486 (FIG. 16) which are bolted to the tops of the associated legs 479 of the W-shaped end plates 471 and 472. The rods 481 and 482 are held in place by threaded studs 487 (FIGS. 16 and 20) which are welded to the rods near each end thereof and project through the floor plate 473 to receive nuts 488.

In order to facilitate movement of cartons along the rails 481, 482, 483 and 484, the carton supporting rails 481 and 482 are vibrated by a vibrator 489 (FIG. 17). The vibrator 489 may be of any suitable electrically operated type and is bolted to one end of a laterally-projecting lever 491 which is pivotally mounted on a pin 492 secured in spaced blocks 493 and 494 (FIG. 21) bolted to the lower surface of the floor plate 473. Supports 496 and 497, which are T-shaped in cross-section (FIG. 17), are welded to the associated rods 481 and 482 in lines L1 and L2, respectively, and are bolted to the lever 491 on opposite sides of the pivot pin 492. A threaded stem 498 is secured to the lever 491 above the vibrator 489 and projects upwardly through a hole in a channel member 499 of the frame 53. A resilient bushing 501 fitted over the stem 498 and a nut screwed on the stem secures the vibrator 489 to the frame 53 in a manner which substantially isolates the vibrations from the frame and transmits them to the lever 491 and support rods 481 and 482.

As best shown in FIGURES 18 and 21, the cartons in each line L1 and L2 are urged toward the carton erecting and turret loading apparatus 57 by counterweights 506 connected to pusher units 507 by cables 508. Except for right hand and left hand differences, the pusher units 507 are substantially identical, therefore, the description of one will disclose the construction of both.

Each pusher unit 507 (FIGS. 16 and 18) comprises a body 509 having a bushing 511 press-fitted into an opening therein, each of said bushings being slidably mounted on one of four rods 512 secured to and extending between associated legs 479 of the W-shaped end plates 471 and 472. A cable attachment bracket 513 is secured by bolts, not shown, to the lower end of each body 509 and has one of the cables 508 secured thereto. A handle bracket 514, which is bolted to the upper end of each body 509, has a handle 516 welded thereto. The free ends of the handles associated with each line L1 or L2 are disposed closely adjacent each other so that both handles associated with one line can easily be gripped by one hand of an operator as he places a supply of collapsed cartons into the magazine 54.

A cam follower roller 518 is journalled on a shouldered bolt 519 secured to each cable attachment bracket 513 and rides in a linear slot 521 formed in the associated wall 477 or 478 of the magazine and serves to hold the body 509 in a vertical position. Each body 509 has two identical carton advancing fingers 522 (FIGS. 18 and 19) pivotally connected thereto by pins 523. Each finger 522 is resiliently urged outwardly by a leaf spring 524 which is connected to the body 509 by a screw 526. An abutment edge 527 of each finger 522 engages the associated body 509 to limit the amount of outward pivotal movement permitted thereby.

As shown in FIGURE 19, each finger 522 has a carton engaging surface 528 which is normally positioned to engage the rearmost collapsed carton in the magazine 54. When the supply of cartons in the magazine needs replenishing, the operator places a group of cartons into the open forward end of the magazine rearwardly of the pushers and then grips, with one hand, both handles 516 of the pusher units 507 associated with the line L1 or L2 being filled, and pulls the two units rearwardly toward the inlet end of the magazine past the newly inserted group of cartons, while preventing motion of the newly added carton blanks with the other hand. During this time, the fingers 522 retract against the urging of the springs 524 permitting the new group of cartons to attain a position forwardly of the fingers 522. The cartons are prevented from free movement out of the discharge end of the magazine by an upper carton arresting finger 531

(FIG. 22) and a lower carton arresting finger 532, which fingers and other parts of the carton erecting apparatus 57, soon to be described, engages certain surfaces of the forwardmost carton in each line L1 and L2 and resists its movement out of the magazine.

The pusher units 507 and the cartons in the magazine are moved toward the carton erecting and turret loading apparatus 57 by the counterweights 506 (FIG. 18) which are connected to the cable attachment bracket 513 by the cables 508. The cables are trained around suitable direction-changing grooved pulleys 539 and 541 and around vertical pulleys 536 journalled on brackets 537 (FIG. 20) that are connected to the floor plate 473. After passing over a vertical pulleys 536, each cable passes through a slot 538 (FIG. 15B) in the floor plate 473. As illustrated in FIGURE 18 all the counterweights 506 are disposed in a common longitudinally extending plane on the left side of the machine 50.

In order to warn the operator in the event the supply of empty cartons in the magazine 54 nears depletion, a pair of limit switches 542 and 543 (FIG. 15B) are mounted on the side walls 477. The actuating element of each switch is in position to be engaged by one of the pusher units 507 associated with one of the lines L1 and L2 when the units 507 move to a position closely adjacent the discharge end of the magazine 54. The switches 542 and 543 are electrically connected to a buzzer in a manner to be described hereinafter.

From the above description it will be apparent that the magazine 54 includes pusher units 507 which are effective in simplifying the reloading operation and that these units, aided by the vibrator 489, constantly urge the collapsed cartons toward the carton erecting apparatus 57 with a predetermined force.

*Carton erecting and turret loading apparatus*

The carton erecting and turret loading apparatus 57 (FIG. 15B) is positioned forwardly of the magazine 54 and includes carton erecting mechanism 546 and a turret loading mechanism 547. The carton erecting mechanism 546 removes one collapsed carton at a time from each lane and unfolds the carton to form a rectangular tube. Thereafter, the turret loading mechanism 547 forces each inverted tubular carton down into a mandrel 58 of the turret 51 which is temporarily positioned therebelow.

The carton erecting and turret loading apparatus 57 includes a generally box-like sub-frame 550 (FIG. 22) which is secured to the frame 53 of the machine 50 and acts as a support for the various operating members of the apparatus 57. The frame 550 includes a side walls 552 (FIG. 22), a rear wall 553 which has an inturned lower end, a second side walls 551 (FIG. 15B), a forward wall 554, and a top wall 555 all connected together to provide a rigid support structure. The forward wall 554 is a frame member and includes an upper horizontal member 556 (FIG. 22), a lower horizontal member 557, a central vertically disposed member 561, and vertical side members 558 and 559 (FIG. 15B). The central member 561 extends below the other parts of the sub-frame 550 as shown in FIGURE 20. The members of the forward wall 554 are spaced so as to define large openings 562 and 563 (FIG. 22) through which the inverted, folded cartons in lines L1 and L2, respectively, pass.

Since the operative structure of the carton erecting mechanism 546 associated with lines L1 and L2 are in most cases identical, the description of the structure associated with line L2 will serve to disclose the construction and operation of the mechanism associated with both lines.

The previously mentioned carton arresting fingers 531 532 (FIG. 22) are mounted on the upper member 556 and lower member 557, respectively, of the frame wall 554. As indicated in FIG. 23, each carton C is pushed out of the magazine with panels 91 and 94 facing forwardly and with bottom closure flaps 102, 103, 106 and 108 uppermost. The upper finger 531 engages the lip 107 (FIG. 6) of the bottom flap 106 of the foremost carton, and the lower finger 532 engages an exposed portion of the narrow lip 122 of the flap 113 (FIG. 23) of the top closure 101. It will be noted that these flaps are positioned rearwardly against the other cartons in the magazine, allowing the foremost walls 91 and 94 of the carton to be subsequently swung out to square the foremost carton by structure soon to be described.

The foremost carton in line L2 is guided through the opening 562 in the rear wall 554 by a lower right guide 564 and a lower left guide 566 (FIG. 24), guide 564 being secured to a bracket 565 that is bolted to the vertical central member 561, or wall 554 and guide 566 being secured to the vertical side member 558.

A pair of upper guides, which are identical to the lower guides 564 and 566, are secured in spaced relation above the guides 564 and 566. The upper left guide corresponding to lower guide 566 is shown in FIG. 22 and identified by numeral 566a. An inclined vertical abutment surface 568 (FIG. 24) extends upwardly along one side of the opening 562 immediately adjacent the carton guide 564 and the corresponding guide disposed in spaced relation above guide 564. This inclined abutment surface is formed on a member 567 which is secured between the brackets 565, which holds the upper and lower right side guides in place. The slanted abutment surfaces prevents free advancement of the cartons through the opening 562 and provides a pivot about which the carton is subsequently squared.

The left guides 566 guide the left edge of the foremost folded carton first against a camming surface 569 and thereafter against an abutment lip 570 of a pivotal gate 571. The camming surface 569 of the gate moves the cartons toward the right with the right edge of the foremost carton firmly seated behind the inclined vertical abutment surface 568. The gate 571 (FIG. 22) is pivotally supported in an upper and lower bracket 572 which are bolted to the upper horizontal member 556 and the lower horizontal member 557 (respectively). A link 573 pivotally connects the gate 571 associated with line L1 to the gate 571 of line L2.

The gate 571, and other operative parts of the carton erecting mechanism 546, are operated by a hydraulic power cylinder 574 which is pivotally connected at one end to the L-shaped back wall 553 of the sub-frame 550. The free end of the piston rod 575 of the hydraulic cylinder 574 is pivotally connected to a crank arm 576 that is keyed to a vertical cam shaft 577. The cam shaft 577 is journalled in ears 578 and 579 secured to the left side wall 552 of the subframe 550. An eccentric cam disc 581 (FIGS. 22 and 25) is locked on the cam shaft 577 and has an eccentric strap 582 journalled therearound. The eccentric strap 582 is pivotally connected by a link 583 to an arm 584 rigid with and projecting outwardly from the gate 571.

When the piston rod 575 is projected out of its cylinder to its full extent, the gate 571 is held in its carton arresting position shown in solid lines in FIGURE 25. As the piston rod 575 moves to the retracted position, the abutment lip 570 is gradually moved by the cam disc 581 from the solid line position to the dotted line position, and the camming surface 569 moves the foremost carton in the stack laterally to cause the right side edge of the foremost carton to be firmly seated behind the abutment 568 (FIG. 24). At the same time the forward walls 91 and 94 of the foremost carton are sprung outwardly a short distance away from the rearmost walls. At this time, the following cartons which are in contact with the camming surface 569 are frictionally held thereby and are moved firmly against the right side guide 564.

Shortly after the gate 571 has moved to the dotted line position to spring the forward wall of the foremost carton outwardly, a suction cup assembly 588 (FIG. 26) is moved into position to grip the left hand wall 91 of the foremost carton. It will be noted that, in the carton-discharging position of FIG. 25, the lip 570 of the gate 571 is angled so that the suction cup assembly can easily pull the left edge of the bowed carton free from the lip.

The suction cup assembly 588 comprises a manifold 589 having six suction cups 590 (FIGS. 4 and 26) connected thereto and communicating with a flow passage therein. The suction cup assembly 588 is connected to an overhead parallelogram linkage 591 (FIG. 26) by a pair of rods 593 and 594 that are journalled in and project upwardly from the manifold 589. Snap rings 595 (FIG. 20) on the rods 593 and 594 prevent axial displacement of the suction cup assembly 588 from the rods. The rods are rigidly secured in the outer ends of arms 596 and 597 (FIG. 26) of the parallelogram linkage 591. At its inner end each of the arms 596 and 597 has spaced inwardly projecting flanges 600, the flanges 600 of arm 597 having aligned apertures in which a shaft 599 is rigidly secured, and the flanges of arm 596 having aligned apertures in which a shaft 598 is secured. Pinions 601 and 602 are keyed to the upper portions of shafts 598 and 599, respectively. The shafts 598 and 599 are journalled for rotation in an L-shaped block 603 that is bolted to the upper horizontal member 556 of the sub-frame 550, and extends to a position between the flanges 600 of arms 596 and 597. A slide block 604 is bolted on the L-shaped block 603 and is slotted to slidably receive a bar 606 that is bolted to one end of an elongated, transversely extending rack 607. The other end of the rack 607 is similarly mounted for sliding movement, and the teeth of the pinions 601 and 602 mesh with the teeth of the rack. The shaft 598, which extends upwardly beyond the pinion 601 and has an arm 608 rigidly secured thereto, is journalled in a bracket 609 bolted to the slide block 604. The arm 608 is pivotally connected by a link 610 to an actuating arm 611 which is clamped to the previously mentioned cam shaft 577. It will be seen that pivotal movement of the cam shaft 577 through a complete cycle, from the fully extended position of the piston rod 575 shown in FIGURE 26 through the fully retracted position and returned to the fully extended position will oscillate the lever 611, causing it to move clockwise about 90° and then counterclockwise. During the first part of the clockwise movement the links 610 and 611 move to a straight line position causing the parallelogram arms to swing clockwise and carry the suction cup from the neutral position P (FIG. 26A) to an "overbend" position P1. Continued clockwise movement of lever 611 swings the cups back through neutral position to the carton pick-up position P2. When the lever 611 is swung counter-clockwise, the cups are moved to neutral position P, then to overbend position P1 and then returned to neutral position.

Each of the manifolds 589 (FIG. 15B) of the suction cup assemblies 588 of lines L1 and L2 is connected by a flexible conduit 614 (FIG. 15C) to a conduit 615 which communicates through a valve 613 with a conduit 616 leading to a source of vacuum. The air valve 613 is mechanically actuated to alternately connect each manifold 589 to the source of vacuum and then to open the cups to atmosphere. A solenoid valve 612 is disposed in each conduit 614. Each valve 612 is normally open and may be closed separately or in unison with the other valve 612 so as to prevent removal of carton blanks from one or both lines L1 and L2, thereby permitting all the other components of the machine to be operated without cartons being present.

The air valve 613 is operated by a cam 620 (FIGS. 26 and 27) that is keyed to the cam shaft 577. An actuating arm 617 is pivotally mounted by a cap screw 618 and a tubular spacer 619 to the upper ear 578 of the housing 550. One end of the actuating arm 617 is pivotally connected to an extension of the core 621 of the valve 613, and the other end of the arm 617 is forked and extends around the cam 620. Abutment screws 622 and 623 screwed into the legs 624 and 626 of the forked end of the arm 617 are positioned to engage a lobe 627 on the cam 620 immediately prior to termination of movement of the cam shaft 577 in opposite directions.

When the piston rod 575 of the hydraulic cylinder 574 is fully extended as shown in FIGURE 26, the abutment screw 622 (FIG. 27) engages the lobe 627 of the cam 620 and actuates the arm 617 to move the core 621 of the valve 613 to the position shown in FIGURE 27. When the core 621 is in this position, the conduit 615 that communicates with the suction cup assembly 588 is aligned with a passage 631 in the core 621 which communicates with a vent passage 632 that is open to the atmosphere. A ball detent 633 holds the core 621 in adjusted position until the cam shaft 577 is rotated to a position wherein the abutment screw 623 engages the cam lobe 627 and shifts the core to a position where the manifolds 589 are connected to a source of vacuum by means of the conduits 614 and 615, a passage 634 in the core 621, and the conduit 616 that is connected to the source of vacuum.

Thus, it will be seen that the suction cups 590 will be vented to the atmosphere while the cups 590 are moved from the neutral position P shown in FIGURE 26 to the overbend position P1 and then, as the cups approach the folded carton the lobe 627 engages lever 617 and shifts core 621 so that the suction cups will be connected to a source of vacuum when the cups engage the carton. Then during counter-clockwise rotation of cam shaft 577, the gripped carton is moved through neutral position P, to the overbend position P1 and back to neutral position. Just as the carton reaches neutral position, the lobe 627 engages lever 617 and shifts the valve core 621 to vent the suction cups, causing them to release the carton.

In order to maintain the carton in squared condition and to aid in guiding the carton onto the mandrel 58 (FIG. 21) positioned therebelow, a pair of pivotal guide wings 636 and 637 (FIG. 28) are moved against opposite sides of the carton immediately before the carton is released by the suction cups.

The wings 636 and 637 are pivotally mounted by pins 638 on a bracket 639 that is bolted to the top wall 555 of the sub-frame 550. The wings 636 and 637 are moved between the solid line and dotted line positions shown in FIGURE 29 by the lobe 641 (FIG. 28) of a cam 642, that is rigidly secured to the cam shaft 577. The cam 642 engages a cam follower 643 journalled on one end of an actuating arm 644 that is pivotally connected to the top wall 555 of the subframe 550 by a cap screw 646. A torsion spring 647, connected between the cap screw 646 and the arm 644, normally urges the arm 644 in a clockwise direction (FIG. 29). The other end of the arm 644 is pivotally connected to a rack 648 and to a pair of links 649 and 651 by a bolt 652, which extends through a slot 653 in the arm and through holes in the rack 648 and in the links 649 and 651. The link 649 is pivotally connected to the wing 636, and the link 651 is pivotally connected to the wing 637.

The rack 648 is slidably mounted in a housing 654 and serves as drive means for the wings 636 and 637 associated with the line L1. As best shown in FIGURE 15B, a two-piece shaft 656 is connected together by a coupling 657 and has pinions 658 and 659 keyed near opposite ends thereof. The two-piece shaft 656 is journalled in ears 661 projecting upwardly from the housing 654 associated with the line L1 and an identical housing associated with the line L2. The pinion 658 is driven by the rack 648 and transmits power to the pinion 659 which drives a rack in the housing associated with the line L1. Thus, the wings associated with line L1 operate at the same time and in the same manner as the wings associated with line L2.

As will be apparent from the shape of the cam 642 which is best shown in FIGURE 29, the wings 636 and 637 are disposed in parallel carton guiding relationship only when the piston rod 575 is in or near the fully extended position. At all other times, the wings are angled outwardly as indicated in FIGURE 23. It will also be noted that the wing 637 cooperates with a tongue 662 (FIG. 28) which projects rearwardly from and is integral with the vertical member 567 and aids in guiding the squared carton onto the mandrel 58 positioned therebelow.

In the event a carton should be opened in the intended manner to form a tubular square as indicated in solid lines in FIGURE 30 but should be bent in an L-shape as indicated by dotted line in FIGURE 30, an ultrasonic sensing unit 666 (FIGS. 30 and 31) detects the presence of such an improperly bent carton and stops the machine.

Two ultrasonic sensing units 666 are provided with one unit being associated with the line L1 and the other being associated with the line L2. Since the units are identical, the description of the unit associated with line L2 will suffice for both.

The ultrasonic sensing unit 666 comprises an electrically operated sound transmitter 667 and a sound receiver 668 of standard design such as the type manufactured by Delavan Manufacturing Company. The transmitter is connected by flexible tubing 669 to one end of an angled passage 670 (FIG. 31) in an adaptor 671 which is welded to the pivotal carton guide wing 636. The other end of the angled passage 670 communicates with an opening 672 in the wing 636 and with a second angled passage 673 which is connected by a flexible tube 674 to the sound receiver 668.

When a carton is properly squared with one wall thereof covering the opening 672, sound transmitted from the transmitter 667 bounces off the carton and is transmitted to the receiver 668 in the desired manner. If, however, a carton is bent in an L-shaped rather than in a square configuration, the opening 672 will not be closed and accordingly, the major portion of the sound will be transmitted through the opening 672 and will not be directed into the receiver 668. The receiver then actuates certain electrical components, to be described later, which causes the drive motor DM of the machine to stop until the defective carton is removed and the motor is restarted.

It has been determined that the carton erecting mechanisms 546 operate more satisfactorily if there is a slight dwell at the moment the suction cup assembly 588 grips the carton, and if the operative speed of the hydraulic cylinder 574 is restricted immediately after the dwell for approximately the first 45° of movement of the suction cup assembly 588 away from the magazine 54 after the suction cup assembly 588 has gripped the foremost carton in the magazine. Accordingly, a cam 675 (FIG. 32) is secured on the shaft 577 and has an arcuate lobe 676 which engages a cam follower 677 journalled on the core 678 of a two-way valve 679. The valve 679 is bolted to the side wall 552 (FIG. 15B) of the subframe 550. Actuation of the valve core 678 by the lobe 676 causes hydraulic fluid being discharged from the power cylinder 574 to be directed through a highly restricted passage thereby reducing the speed of the cylinder. After the cam follower has been moved away from the core thereby repositioning the valve core 678, the restrictions in the flow passages are reduced causing hydraulic fluid to flow out of the cylinder at a higher rate of speed thereby causing the cylinder to move at the normal speed. The hydraulic circuit for the cylinder 574 will be described in more detail hereinafter with the other hydraulic components of the machine 50. After the cartons in line L1 and L2 of Station 2 have been squared or erected, they are each forced downwardly at Station 3 onto a mandrel 58 of the turret 51 by the turret loading mechanism 547 (FIGS. 20, 21 and 28). The turret loading mechanism 547 comprises a vertically reciprocable pusher head 680 which includes a tubular body 681 that is slidably mounted on a vertically extending shaft 682 (FIG. 21) that is rigidly secured to the upper horizontal member 556 and to the lower end of the vertical central member 561 of the wall 554 of the sub-frame 550. A stub shaft 683 welded to the body 681 has a cam follower 684 journalled on one end and received in a vertically extending slot 686 in the central member 561, thereby preventing rotation of the tubular body 681. The body 681 is vertically reciprocated by a hydraulic cylinder 687 having its piston rod 688 connected to the stub shaft 683 and having its cylinder 689 connected to a support rod 691 which is connected to the frame 53 of the machine 50 by nuts 692.

A transversely extending bar 693 (FIG. 28) is secured to the tubular body 681 by a bracket 694. A flap engaging head 696 is bolted to each end of the bar 693 and includes slots 697 and 698 arranged to engage the bottom flaps 106 and 108, respectively, of the associated cartons. It is to be noted that the slots 697 and 698 in each flap engaging head 696 are disposed at different elevations to compensate for the difference in length of the flaps 106 and 108.

The flap engaging heads 696 are normally positioned above the cartons and are moved down against the carton after the cartons have been released by the suction cups 590 and are held in square tubular positions by the associated wings 636 and 637 and the tongue 662. Upon continued downward movement of the heads 696, the carton in each line L1 and L2 is guided downwardly between a pair of spaced U-shaped guides 699 and 701 (FIG. 20) and onto the mandrel 58 positioned therebelow. The U-shaped guides are bolted to the box-frame as shown in FIGURE 20, and the forward wall 702 of the guide 699 is relieved to permit the upper end of a carton positioned on a mandrel 58 to subsequently be swung out through said relieved portion. It will be noted that the wings 636 and 637 are spaced from the tongue 662, and that the U-shaped guides 699 and 701 are sufficiently spaced from each other to permit the heads 696 to pass therebetween.

Although the operation of the carton erecting and loading apparatus 57 has been covered in the above description of the apparatus, a summary of the operation on one carton will now be described having reference to FIGURES 15B and 33 to 37, inclusive.

Upon retraction of the piston rod 575 of the hydraulic power cylinder 574, the suction cup assembly associated with line L2 swings clockwise from the neutral position P over the carton guides 699 and 701 as shown in FIGURE 33, through the dotted line "overbend" position P1, and thereafter swings counter-clockwise through the neutral position to the position P2 shown in FIGURE 34 wherein the gate 571 is pivoted counter-clockwise toward the foremost carton to bow or spring the forward walls thereof slightly away from the rear walls thereof. The rear walls of the carton are held in position by the fingers 531 and 532 while the suction cups engage and grip the left hand forward wall (FIG. 34) of the carton to move the left edge of the carton away from the lip 570 and to move the left wall forwardly and toward the right. As the suction cup assembly 588 begins to open the cartons, the carton pivots about the vertical abutment 568, and the rear wall is pulled out of engagement with the carton arresting fingers 531 and 532. Because of the inherent resilience in the carton, the carton is then moved past its normal open position and is "overbent" as illustrated in FIGURE 35 so as to reduce the stresses present in the carton. As the carton is moving back to the neutral position shown in FIGURE 36 directly above the carton guides 699 and 701, the wings 636 and 637 close in upon the carton to hold it in its squared position slightly before the suction cups 590 release the carton.

With the carton erected and positioned above the guides 699 and 701, the associated flap engaging head 696 of the turret loading mechanism 547 (FIG. 37) forces the erected carton down through the guides 699 and 701 and onto the turret mandrel 58 positioned therebelow as shown in dotted lines in FIGURE 37. The head 696 then returns to its uppermost position and the turret then swings the squared carton from Station 3 to Station 4.

The carton erecting and turret loading apparatus 57 is then ready to repeat the above described cycle of operation on another carton.

Bottom forming apparatus

After the turret loading operation has been completed at Station 3, the turret 51 (FIG. 11) is indexed so that the two cartons on the mandrels 58 in lines L1 and L2 are moved along an arcuate guide rail 706 secured to the frame 53 and each carton is positioned at Station 4 in alignment with one of the bottom forming dies 63 of the bottom forming apparatus 62. The bottom forming dies 63 bend the bottom flaps of the bottom closures 100 of the associated cartons about the score lines prior to the heating and sealing of the bottom closure at Stations 5 and 6, respectively.

The bottom forming apparatus 62 (FIGS. 38 to 42) comprises a bracket 707 which is bolted to the frame 53 and is inclined downwardly toward the mandrels 58 at Station 4. The cylinder 708 of a hydraulic power unit 709 is bolted to the bracket 707 and its piston rod 711 projects outwardly and downwardly therefrom in a direction parallel to the longitudinal axes of the two mandrels 58 at Station 4. The piston rod 711 carries a U-shaped support 712 which has one of the bottom forming dies 63 bolted on each side thereof in axial alignment with the associated mandrel 58. The U-shaped support 712 is held from rotation about the axis of the piston rod 711 by a guide rod 713 which is secured to the U-shaped support 712 and is slidably received in blocks 714 welded to the bracket 707.

The two bottom forming dies 63 are identical therefore, the description of one will suffice for both. Each bottom forming die 63 comprises an end plate 716 (FIGS. 40 and 41) to which a pair of flap bending, generally triangular walls 717 and 718 are bolted. A pair of arms 719 and 721 (FIG. 42) are pivoted at 722 and 723 to forked angle brackets 724 and 726 that are secured to the end plate 716. A flap engaging finger 727 and a cam 728 are connected to one end of each arm 719 and 721 by screws 729 which extend through slots 731 in the cams 728 to permit adjustment of the same. A spring 732 is connected to the outer ends of the arms 719 and 721 and urges the fingers 727 outwardly away from the carton. The amount of outward movement of each finger 727 is limited by an abutment screw 733 which is screwed in the associated arm and abuts the associated bracket 724 and 726. Nuts 734 lock the screws in adjusted position.

The arm 719 is actuated by a cam follower roller 736 (FIG. 42) which is positioned in the path of movement of the associated cam 728 as it moves toward the end of the carton, said follower roller 736 being journalled in a bracket 737 bolted to the arcuate rail 706. Similarly, the arm 721 is actuated by a cam follower 738 which is positioned to engage the other cam 728 and is journalled on a bracket 739 that is bolted on an arcuate rail 741 which extends between Station 4 and Station 5 and is secured to the frame 53 as shown in phantom lines in FIGURE 21.

In the operation of the bottom forming apparatus 62, the hydraulic cylinder 709 is actuated after the cartons in line L1 and L2 are positioned at Station 4 to move the dies 63 along paths parallel to the longitudinal axes of the associated mandrels 58. As each die 63 moves downwardly, the fingers 727 contact the bottom flaps 102 and 103 (FIGS. 41 and 42) and move them inwardly in response to actuation of the cams 728 by the cam followers 736 and 738. Shortly after the fingers 727 have started to bend the bottom flaps 102 and 103 inwardly, the bottom flaps 106 and 108 are contacted by the triangular walls 717 and 718. As downward movement of the bottom forming die 63 continues from the intermediate position shown in solid lines in FIGURES 41 and 42 to the fully extended position shown in phantom lines, the fingers 727 and triangular walls cooperates with the chamfered edges of the mandrel head 166 to sharply bend the carton flaps of the bottom closure 100 about the score lines 98 and 104.

The piston rod 711 is then retracted and the turret 51 is indexed to move the two mandrels 58 in lines L1 and L2 with the cartons having the partially closed bottom closures 100 thereon into Station 5.

Bottom heating apparatus

The bottom heating apparatus 64 (FIGS. 43–47) at Station 5 includes a heating head 746 for each line L1 and L2. The heads 746 are moved into position to direct hot air against only those surfaces of the polyethylene coated cartons which are to be sealed together at Station 6.

The heads 746 are moved toward and away from the preformed cartons on the mandrels 58 at Station 5 by a hydraulic power cylinder 747 (FIGS. 43 and 44) which includes a cylinder 748 that is rigidly secured to an upwardly inclined bracket 749 bolted to the frame 53 of the machine. A head supporting bracket 751 is connected to the piston rod 752 of the power cylinder 747 by nuts 753. The bracket 751 is held from rotation about the axis of the piston rod 752 by a guide rod 754 (FIG. 44) which is rigidly secured to the bracket 751 and is slidably received in blocks 756 welded to the inclined bracket 749.

Since the two bottom heating heads 746 are identical, the description of one head and its operation will suffice for both. In general, the head includes a central heating unit 769, which extends into the open end of the partially closed carton to direct heated air against internal surfaces of the flaps, and two outer units 766 which are disposed outside the carton and direct heated air against the outer surfaces of two flaps. Each head 746 (FIGS. 45, 46 and 47) also includes a transversely extending rear plate 757 which may be formed as part of the bracket 751. A generally rectangular housing 758 (FIG. 46) defines a plenum chamber 758a and is formed by four walls 759 connected together and to an end plate 761 in air tight relation. Threaded studs 762 project from the housing 758 through the plate 757 and have wing nuts 763 screwed thereon which hold the plenum chamber in air tight engagement against plate 757.

Hot air flows from the plenum chamber through generally triangular openings 764 in the plate 761 into the upper and lower outwardly projecting exterior air distribution heating units 766. The housings of the units 766 are welded to the plate 761 and have generally V-shaped inner surfaces formed by two inclined walls 767 which diverge outwardly from the plate 761 to conform to the shape of the bottom flaps 102 and 103 (FIGS. 43 and 44) when positioned over these flaps. A plurality of perforations 768 are formed in the inner walls 767 so as to direct hot air at all of the outer surfaces of the flaps 102 and 103 since these flaps are subsequently folded so that the entire outer surface of each flap is utilized as a sealing surface.

The air distribution unit or housing 769 (FIGS. 45, 46 and 47) for heating the interior walls of the bottom closure 100 is welded to the end plate 761 of the housing 758 and communicates with the plenum chamber through two openings 771 (FIG. 46). The effective size of the openings is controlled by adjustable gates 772 which are locked in adjusted position by screws 773. The gates 772 provide means for controlling the proportions of hot air distributed into the interior air distribution housing 769 as compared to the air entering the exterior housings 766.

The interior housing 769 (FIG. 45) is defined by opposed V-shaped walls 774, opposed planar walls 776, U-shaped corner members 777 and an end closure plate 778. These walls are all secured together in air tight relation. Perforations 779 are provided in the walls 774 and 776 and in the U-shaped corner members 777 in a pattern which concentrates the flow of hot air to those inside surfaces of the bottom closure 100 which contact and seal against other surfaces of the bottom closure. It should be particularly noted that the U-shaped corner members 777 will assure that sufficient hot air is directed into the carton corners to heat the polyethylene to the desired temperature.

As best shown in FIGS. 45 and 47, V-shaped flap guides 780 and beveled corner guides 781 are welded to the end closure plate 778 and function to guide the inner heating unit 769 into the partially closed bottom closure 100. Arms 782 are bolted to opposed walls of the plenum chamber 758a and have wire fingers 783 welded to the free ends thereof and positioned closely adjacent the apex of the associated V-shaped walls 767. The fingers 783 serve to guide the walls of the bottom closure 100 into the head 746 and to space the carton walls 102 and 103 from the V-shaped walls 767 to assure proper distribution of hot air. Flat walls 786 and 787 are bolted to the plate 757 and extend outwardly to a position wherein its outer end is even with the ends of the heating units 766 to and in confining the hot air within the bottom heating head 746.

Sterile air is supplied to each bottom heating head 746 (FIG. 47) at the rate of 20–40 cubic feet per minute at a pressure of approximately two inches of water and is heated to a temperature of 650° F. to 750° F., preferably to approximately 675° F., which temperature is effective to heat to approximately 215° F. those surfaces of the bottom closure which are subsequently sealed together. The air is supplied by an electrically powered blower (to be described hereinafter) and directs the air to a heater 791 through a conduit 792. The heater 791 comprises a tubular body 793 (FIG. 47) that is rigidly connected to the plate 757 by a collar 794. The collar 794 is welded to the plate 757 and is connected to the tubular body 793 by set screws 796. An electrical heating coil 797 is fitted on an insulator 798 that is bolted to a disc 799. The disc 799 is clamped in the counterbore of a hole 801 in the plate 757 by the tubular body and has arcuate slots 802 therein through which the heated air passes as it enters the plenum chamber 758a. The upper end of the insulator 798 projects through a centrally apertured disc 803 which is secured to the other end of the tubular body 793 and provides an end seal for the body. A water proof electrical conduit box 804 is rigidly secured to the tubular body 793 to protect leads projecting from the coil 797. A tubular insulator 806 is disposed between the coil 797 and the inner wall of the tubular body 793.

In the operation of the bottom heating apparatus 64, the hydraulic power unit 747 (FIGS. 43 and 44) is actuated to move the two heads 746 toward the carton carrying mandrels 58 that have been positioned at Station 5. The flaps 102 and 103 are guided between the associated walls 767 and 774 of each head 746 by the rods 783. Hot air at approximately 675° F. is then discharged from the perforations 768 and 779 against the surfaces of the lower flaps which will eventually be sealed together. The heads are then withdrawn by the hydraulic cylinder 747 to the retracted position shown in FIGURES 43 and 44 and the heated cartons are then advanced to Station 6 where the bottom closure is sealed.

*Bottom sealing apparatus*

The bottom sealing apparatus 66 (FIGS. 48–55) at Station 6 is provided to perform the final folding of the bottom flaps of the cartons and to apply pressure to these bottom flaps to cause the same to seal together in a liquid tight closure. Since the bottom sealing apparatus 66 for each line L1 and L2 is identical, the description of the bottom sealing apparatus 66 associated with line L1 will suffice for both.

The bottom sealing apparatus 66 (FIGS. 48, 49 and 50) comprises a hydraulic power unit 811 having its cylinder 812 bolted to the transversely extending member 813 of the frame 53. A guide support block 814 is bolted to the upper end of the cylinder 812 and is apertured to permit the piston rod 816 of the power cylinder to pass therethrough. A pair of curved bottom flap guides 817 and 818 are welded to vertical shanks 819 and 821 which are rigidly clamped to the block 814 and serve to plow the bottom flaps of the carton to a substantially closed position as the carton is being moved by the turret 51 to an indexed position directly above the cylinder 811 as shown in FIGURES 51, 52 and 53.

The bottom sealing die 822 is screwed on the upper end of the piston rod 816 and is locked in place by a lock nut 823 (FIG. 49). The die 822 is prevented from rotation about the axis of the piston 816 by a pin 825 screwed in the die and slidably received in a slot 814a in the block 814. The die 822 is made up of an upper and a lower section 824 and 826 and additionally includes side guides 827 and 828. The guides 827 and 828 and the upper and lower sections are connected together by light screws 829 which are adapted to shear in the rare event that the timing between the turret 51 and the hydraulic power unit 811 should become disturbed and the die 822 should become positioned in the path of movement of a moving mandrel 58. If this should occur, the mandrel 58 would strike the upper sections 824 of the die and shear the screws 829 thereby preventing the possibility of more serious damage occuring to the machine. It is noted that the mating surfaces of the upper and lower sections 824 and 826 are inclined to prevent the arcuate path of travel of the mandrel 58 from causing the upper section 824 to wedge against the lower section 826 in the event such interference should occur.

The side guides 827 and 828 are chamfered and accurately spaced so as to assure that the bottom flaps are square and that the V-shaped edges of the folded flaps 102 and 103 (FIG. 55) abut one another when the die 822 is forced up against the heated flaps of the carton to seal the heated surfaces together. In order to prevent an undue rise in temperature of the die 822, the die is cooled by a stream of water which enters the die through a conduit 830, flows through a passage 831 (FIG. 48) in the lower section 826, and is discharged from the die through a conduit 832 connected to the passage 831.

A shallow longitudinal groove 833 (FIG. 46) is formed in the upper face 834 of the die. As seen in FIG. 50A the groove receives the lip 107 of the bottom flap 106 when the bottom flaps have subsequently been closed and pressed into sealed engagement. It is to be noted in FIGURE 50A that, even though the side edges of the triangular portions 103a and 103b of flap 103 abut, a potential flow passage is formed at X between these edges and between the edges of flap 108 and flap 106. It is important therefore that the edge 836 of the groove 833 is so located that it forces the portion 106a adjacent the connection of lip 107 to flap 106 into sealing engagement with the edge 108a of flap 108 and with the section 103b' of flap portion 103b. In FIGURE 50A the groove edge 836 is illustrated in a position slightly to the right and below the edge 108a of flap 108 for effectively forcing material into the corner thereabove. It is to be understood that the location of this groove edge 836 may be moved to the left (FIG. 50A) to a position wherein the groove edge 836 is in alignment with the edge 108a of flap 108. When in this position, both the connecting portion 106a and the edge 108a are deformed for forcing material into the corner thereabove.

It will also be apparent that the potential flow passage X extends past the abutting edges of the triangular portions 102a and 102b (FIG. 8A) and that the portion of the passage X is sealed in the above described manner.

In order to provide a leak proof bottom closure, raised buttons 837 are positioned on the face 834 of the die 822 in position to engage the several seam lines 838 (FIG. 55) and crush the carton material to block the potential flow passages which occur at these seam lines. The aforementioned V-shaped die 168 (FIGS. 54 and 55) on each mandrel 58 is so positioned on the mandrel that it fits within the apex of one of the V-shaped recesses 839 formed in the bottom of the carton by the folded walls 102 and 103. The die 168 compensates for the added thickness of these walls so that, it forms a back-up member for wall 108 just as the bottom of the mandrel forms a back-up member for the wall portions 102 and 103. Accordingly, with these back-up members in place, sufficient pressure can be applied to the carton to seal it.

As further protection against accidental interference between the mandrels 58 and the die 822, a two-way normally closed hydraulic valve 841 (FIG. 48) is included in the hydraulic system to be described hereinafter, and is opened only when one of the mandrels 58 is in, or is immediately, adjacent the indexed position at Station 6. The valve 841 is actuated by the previously mentioned cam fingers 189 (FIGS. 10 and 48), one finger being provided for each mandrel in line L1.

In the operation of the bottom sealing apparatus 66, the flap guides 817 and 818 (FIGS. 51, 52 and 53) guide the carton from Station 5 to Station 6 and plow the carton flaps 106 and 108 into a relatively flat folded condition before releasing the flaps onto the die 822. As the mandrel 58 (FIG. 49) and the carton becomes aligned at Station 6, the hydraulic valve 841 (FIG. 48) is opened by the cam finger 189 permitting hydraulic fluid to enter the cylinder 812 and force the die 822 upwardly, thereby applying a pressure of approximately 450 p.s.i. against the carton flaps of the bottom closure which is firmly clamped between the mandrel 58 and the die. The side guides 827 and 828 serve to square the bottom end closure 100 and to hold different flaps thereof into abutting relation. The bottom closure is held in clamped position for approximately 2.3 seconds to assure the proper adhesion and cooling of the several heated walls of the bottom closure. The bottom closure of the carton is then released upon downward movement of the piston 816 and die 822 to their retracted position.

The mandrel 58 having the carton with the sealed bottom closure thereon is then advanced to Station 7 (FIG. 11) which is an open station that may be used for other functions performed on the bottom of the carton. For example, if it is desired to mark the bottom of the carton with a code number or the like, a marking apparatus may be positioned at Station 7. The carton is then moved to Station 8 which is a carton ejecting station. During its motion between Station 6 and Station 8, the cartons in lines L1 and L2 are guided by arcuate rails 842 (FIGS. 1 and 11) which are secured to brackets 843 bolted to the frame 53 of the machine.

Carton transfer and turning mechanism

The carton transfer and turning mechanism 68 (FIGS. 1, 2 and 3) is effective to guide each carton with its sealed bottom closure onto the associated conveyor 52a or 52b at Station 9 after it has been blown off the associated mandrel at Station 8. During transit from Station 8 to Station 9, the mechanism 68 twists the carton 90° about its longitudinal axis so that the short flap 113 (FIG. 9A) is foremost on the conveyors, and deposits the carton on the conveyor with its bottom closure contacting the conveyor.

As has already been mentioned in the description of the turret 51 (FIGS. 10-14), when the turret positions a pair of mandrels 58 at Station 8, high pressure sterile air at approximately 60-80 p.s.i. is directed into the passages 163 in those mandrels at Station 8 through the conduits 182 (FIG. 14), the port 183, the associated passage 184 (FIG. 10) and the ports 186. The timing of the discharge of the air through the above passages is controlled by an air valve to be described hereinafter, that is controlled by a cam on the cam shaft 278 (FIG. 2). The air in the passages 163 of the mandrels 58 at Station 8 flows into the passages 164 (FIG. 13) in the upper rectangular end of the body 161, through the angled holes 167 in the mandrel heads 166 and is discharged against the closed bottom closure of the cartons to discharge the cartons from their associated mandrels 58 and rapidly propel the cartons to Station 9.

The cartons in lines L1 and L2 are guided between Station 8 and Station 9 by carton turning mechanisms 848 (FIGS. 1, 2 and 3). The mechanisms 848 associated with lines L1 and L2 are identical, therefore, the description of one will suffice for both.

Each mechanism 848 comprises a U-shaped support 849 which is connected by a bracket 851 to the frame 53 near Station 8. The inlet ends of a plurality of carton guide rails 852 are welded to the support 849 and the guide rails are curved and twisted so as to direct the carton bottom end toward the associated conveyor 52a or 52b. The other end of the rails 852 are welded to a tubular chute 853 of rectangular cross section which has its front and rear end walls 854 and 856 cut away to permit movement of the conveyor drive lugs 69 through the lower portion of the chute 853. The intermediate portions of certain ones of the guide rails 852 are welded to a generally U-shaped strap 857 which adds rigidity to the carton turning mechanism 848. The chute 853 is supported by a bracket 858 that is bolted to the support structure 859 of the top forming apparatus 71 at Station 10.

In the operation of the carton transfer and turning mechanism 848, the cartons with their bottom closures sealed are blown off the associated mandrel 58 at Station 8 into the turning mechanism 848 which turns the cartons ninety degrees clockwise, as viewed from the rear of a carton moving through the turning mechanism, and deposits the cartons on the associated conveyor 52a or 52b at Station 9 between adjacent drive lugs 69 of the associated conveyor.

Air supply

As previously mentioned, hot air is supplied continuously to the heating apparatus 64 (FIG. 65) for heating the bottom closure members of the carton and to the top closure heating apparatus 78. This air is circulated by a blower 866 which directs the air into each head 746 of the bottom heating apparatus 64 and into each head 79 of the top heating apparatus 78 at the rate of 20–40 cubic feet per minute and at a pressure of approximately two inches of water.

The blower 866 is mounted on the frame 53 of the machine and is coupled to and driven by a motor BM. Air is drawn into the blower through a filter 867 and is discharged into a conduit T 868. One end of the T 868 is connected by a flexible conduit 869 to a T 871 that is connected to the previously mentioned conduits 792 (FIGS. 43 and 56) of the bottom heating apparatus 64. It will be appreciated that the T 871 and a portion of the flexible conduit 869 are free to move with the bottom heating heads 746 during operation of the heads.

The other end of the T 868 (FIG. 56) is connected by a flexible conduit 872 to a T 873 that is connected to the two top heating heads 79.

In order to protect the heaters in the heads 746 and 79 from burning out due to an interruption of air directed thereto by the blower 866, a pressure switch 874 is connected to the T 868 by a conduit 876. If the blower inadvertently stops and the air pressure in the T 868 is, accordingly, reduced to atmospheric pressure, the pressure switch 874 will sense the reduction in pressure and will activate certain controls in the electrical circuit, soon to be described, to deactivate the heaters.

As previously mentioned, the high pressure air that is directed into the mandrels at Station 8 to blow the cartons off the mandrels 58 is supplied from any suitable external source. The air is supplied at a pressure of approximately 80 p.s.i. and passes through suitable separators, filters and regulators of standard design (not shown).

Vacuum for the suction cup assembly 588 (FIG. 26) of the carton erecting apparatus 57 is supplied by a vacuum pump VP (FIGS. 2 and 3) that is driven by a direct drive vacuum pump motor VPM. The vacuum pump VP is of standard design and is connected to the valve 613 (FIG. 26) by a well known distribution system which includes the conduit 636.

Hydraulic system

The several hydraulic power units which operate the mechanical components of the carton forming machine 50A are incorporated in a hydraulic system 880 (FIG. 57). The actuation of each of the several hydraulic power cylinders is timed relative to the intermittent movement of the conveyors 52a and 52b (FIGS. 2 and 3) by one of the plurality of timing cams TC1 to TC5 (FIG. 57) which operate four way hydraulic valves V1 to V5, respectively. The rate of movement of the piston rod of each power cylinder is controlled during extension and retraction by at least two speed control valves CV, one valve being placed in each conduit connected to the associated power cylinder to permit free entry of hydraulic fluid into the cylinder to restrict to a predetermined rate the discharge of fluid therefrom.

As diagrammatically illustrated in FIGURE 57, the hydraulic system 880 comprises a hydraulic pump 882 which is continuously driven by a motor HM. The pump 882 receives fluid from a sump 884 and discharges high pressure fluid through a manifold 886. The low pressure fluid is returned to the sump 884 from the several power cylinders through a manifold 887. Both the high pressure manifold 886 and the low pressure manifold 887 extend the full length of the machine as shown in FIGURE 57 so that each valve V1 to V5 can easily be connected thereto by high pressure conduits 888 and return conduits 889, respectively. A plurality of oil heaters OH are provided in the sump 884 and are controlled so as to maintain the temperature of the hydraulic fluid between 105° F. to 140° F.

As diagrammatically illustrated in FIGURE 58, each valve V1 to V5 includes a housing 891 having a shiftable core 892 therein. A spring 893 disposed between the core and housing normally urges a cam follower 894 journalled on one end of the core against the associated timing cam TC1 to TC5. The associated high pressure conduit 888 and return conduits 889, are connected to ports 896 and 897, respectively, in the housing 891. The port 896 communicates either with a straight line passage 898 extending centrally through the core 892, or with a slanted or cross passage 901 which extends along the periphery of the cylindrical core. Similarly, the port 897 communicates either with a straight passage 899 or with a slanted passage 902 that is formed in the periphery of core 892 on the opposite side of the core from the peripheral passage 901. With this arrangement, the hydraulic fluid can be selectively directed through discharge ports 903 or 904 in the housing 891. It will be understood that each passage 898, 899, 901 and 902 are independent passages and do not communicate with each other.

The several speed control valves CV (FIG. 57) are identical in construction and accordingly the description of one will suffice for all. Each speed control valve CV (FIG. 59) comprises a housing 907 having a straight line passage 908 therethrough. An enlarged portion 909 of the passage 908 has a ball check valve 911 therein which rests against a seat 912 to prevent flow of fluid downwardly (FIG. 59) through the passage 908 but permits unrestricted flow upwardly (FIG. 59) through the passage 908. A U-shaped control passage 913 in the housing 907 bypasses the ball valve 911 and communicates with opposite ends of the straight line passage 908. An adjustable needle valve 914 cooperates with a frusto-conical seat 916 in the control passage to restrict the downward (FIG. 59) flow of fluid therethrough to thereby control the rate of travel of the piston of the associated hydraulic power cylinder. It will be understood that the needle valve 914 of each speed control valve CV will be adjusted so as to achieve the desired rate of travel of the piston of the associated power cylinder. It will also be understood that the speed control valves CV are all positioned so that the upper port 917, rather than the lower port, is connected to the associated power cylinder.

The control of the hydraulic power cylinders at each station will now be described having reference to FIGURES 57 and 60.

In regard to the chart shown in FIGURE 60, it will be understood that the darkened areas indicate the time required for the piston rods of the associated pistons to move from the extended to the retracted positions or from the retracted to the extended positions and that pressure will be applied to the same side of the pistons in a dwell period after movement is completed until the associated cam TC shifts the associated valve V to its other position. The lines marked S.V. correspond to the sloping portions of the associated cams which shift the valves V1 to V15 between the cross-passage position and the straight passage position. The time required for the valves to shift from one position to the other will not be included in the description to follow but, as shown in FIGURE 60, each shifting of the valve requires approximately 0.1 second. In the description to follow, it will be understood that the term "cross-passage position" indicates the position at which the passages 901 and 902 register with the conduits 888 and 889, and the term "straight passage position" indicates the position at which the passages 898 and 899 register with the conduits 888 and 889.

As indicated at the top of FIGURE 60, the conveyor and turret indexing operation takes place in the first 0.6 seconds of the three second operating cycle, and the remaining time is utilized for performing the different operations on the cartons.

At Station 2, the piston rod 575 (FIG. 57) of the hydraulic power cylinder 574 which operates the carton erecting apparatus is returning from the retracted to the extended position at the start of the indexing operation as indicated by the darkened area extending from 0 to 0.1+ on the chart shown in FIGURE 60. It will be recalled that a complete cycle of operation of the carton erecting apparatus consists of the retraction of the piston rod to move the suction cups from a neutral position to a carton pick up position and then the extension of the piston rod to move the suction cups from pick up position to an overbend position and return to neutral. After the piston has returned to the extended position, the timing cam TC5 (FIG. 57) maintains the valve V5 in the cross-passage position for approximately 0.86 second so that high pressure fluid is directed from the manifold 886 through the conduit 888, through the valve V5, through a conduit 918, speed control valve CV therein and into the hydraulic cylinder 574 on one side of the piston. Since pressurized fluid has already been discharged from the other side of the piston, the piston rod is held in extended position. At about 0.98 second in the cycle, the cam TC5 then shifts the valve V5 to the straight-passage position at which time the fluid flows through line 921 into parallel conduits 919 and 920, each having a speed control valve CV therein, into the cylinder 574, causing the piston rod to be retracted. The rate of flow of the fluid leaving the unit 574 is controlled by the speed control valve CV in the conduit 918 to complete the return of the piston in approximately 0.74 second. A short dwell of approximately 0.1 second before cam TC5 shifts valve V5 then permits the suction cup assembly 588 to grip the foremost carton in the magazine 54 (FIG. 26), and during this interval the normally open valve 679 is held closed by the cam 676.

The cam TC5 then returns the valve to the cross-passage position directing high pressure fluid into the cylinder 574 through the conduit 918. The fluid in the cylinder on the other side of the piston is then discharged through the single speed control valve CV in conduits 919 and 921 to retard the speed of the piston rod 575 for approximately 0.6 second, after which time the cam 676 opens the valve 679 to permit fluid to flow through the speed control valve CV in conduit 920 in parallel with the fluid in conduit 919 to thereby increase the rate of travel of the piston rod 575. The piston rod 575 travels at this increased rate until the three second cycle of operation is completed. It is to be noted that at the end of this cycle, the piston rod has not been fully extended and, accordingly, the suction cups have not quite reached neutral position.

At Station 3, the piston rod 688 of the turret loading power cylinder 687 is moved, during the three second cycle, from an extended position to a retracted position to push the erected carton down on the mandrel and then is returned to its extended position. The piston rod is maintained in its extended position at the start of a cycle for approximately 0.7 second by the timing cam TC4 which holds the valve V4 in the cross-passage position. During this time, high pressure fluid communicates between one side of the piston in cylinder 687 and the high pressure manifold 886, through the conduit 888, through the valve V4, through a conduit 923, and through a speed control valve CV to the conduit 923. The fluid on the other side of the piston had previously been discharged through a conduit 924 having a speed control valve CV therein, through the valve V4 and through the conduit 889 to the return manifold 887. After the indexing operation of the turret has been completed, the cam TC4 repositions the valve V4 to the straight passage position at which time fluid enters the opposite end of the hydraulic cylinder 687 causing the piston 688 to move to its retracted position. The speed control valve CV in conduit 923 controls the rate of movement of the piston 688 so that the cylinder is completely retracted within approximately 0.273 second.

Shortly thereafter, the cam TC4 shifts the valve V4 to the cross-passage position at which time the piston rod 688 is returned to the extended position. The speed control valve CV in the conduit 924 is adjusted to control the rate of flow of hydraulic fluid so that the piston rod is moved to the extended position in approximately 0.492 second. The valve V4 is maintained in the cross passage position thereby holding the piston 688 in extended position until the three second cycle is completed.

At Station 4, the piston rod 711 is moved out of the cylinder 709 at a predetermined interval during the cycle to cause the dies 63 to preform the bottom closure flaps and is then retracted into the cylinder. The piston rod 711 of the bottom forming power unit 709 at Station 4 is held in the retracted position by valve V1 which is held in the cross-passage position by the cam TC1 for approximately 1.5 seconds after the start of a cycle. High pressure fluid is directed into the cylinder 709 on one side of the piston through a conduit 926 having a speed control valve CV therein, and is discharged from the cylinder 709 on the other side of the piston through a conduit 927 having a speed control valve CV therein. The cam TC1 then shifts the valve V1 to the straight-passage position thereby reversing the flow of hydraulic fluid and causing the piston rod, under control of the speed control valve CV in conduit 926, to move to its extended position in approximately 0.164 second and to remain in this position for an additional 0.5 second. The cam TC1 then shifts the valve to its original cross-passage position, and the speed control valve in the conduit 927 causes the piston rod 711 to return to its retracted position in approximately 0.122 second and remain in this position until the three second cycle is repeated.

As previously mentioned, at Station 5 the piston rod 752 is moved out of cylinder 747 to move the bottom heating heads 746 into position enclosing the bottom closure flaps for heating them and is then retracted into the cylinder. The cylinder 747 of the bottom heating apparatus at Station 5 is connected to the valve V2 by conduits 928 and 929 having speed control valves CV therein. At the beginning of the cycle of operation the cam TC2 holds the valve V2 in the cross-passage position thereby holding the piston rod 752 in the retracted position until the indexing operation is completed which requires 0.6 second. The cam TC2 then shifts the valve V2 to the straight passage position and the speed control valve CV in the conduit 929 throttles the fluid so that the piston rod 752 is moved to its extended position in approximately 0.246 second. The piston rod is held in this position for an additional 0.167 second after which time the cam TC2 shifts the valve V2 to the cross-passage position. The flow of hydraulic fluid to power cylinder 747 is then reversed and is controlled by the speed control valve CV in the conduit 928 to return the piston rod 752 to the retracted position in approximately 0.184 second. The piston rod 752 is maintained in this position until the three second cycle is completed.

At Station 6, the piston rods 816 are moved upwardly out of cylinders 811 to raise the bottom forming dies 822 into sealing engagement with the flaps of the bottom closures, and are then lowered. Each cylinder 811 is connected to the valve V3 by conduits 931 and 932 having speed control valves CV therein. The piston rod 816 of the bottom sealing cylinder 811 is held in the retracted position until the indexing operation has been completed by the cam TC3 which holds the valve V3 in the cross-passage position for the first 0.6 second of each cycle during which time the indexing is completed. As an additional safety feature, the normally closed mechanical-hydraulic interlock valve 841 (FIG 48) is inserted in the conduit 931 and is opened only after the turret 51 (FIG. 10) has completed its indexing movement by the associated cam finger 189. The cam TC3 then shifts the valve V3 to the parallel-passage position and the speed control valve CV in the conduit 931 controls the rate of fluid flow so that the piston rod reaches its extended position in 0.654 second after which time the piston is held in this position for an additional 0.954 second. The cam TC3 then shifts the valve V3 to the straight passage position to reverse the flow of hydraulic fluid and return the piston 816 to the retracted position under the control of the speed control valve CV in conduit 932 in 0.592 second. The piston rod 816 is maintained in this position until the cycle is completed.

As shown in FIGURE 57, a two way air valve 966 is provided to control the release of high pressure air at Station 8 to blow the cartons off of the mandrels 58 (FIG. 2) and onto the associated conveyors 52a and 52b (FIG. 3). The previously mentioned conduit 182 (FIG. 14) which communicates with the interior of the mandrels 58 positioned at Station 8, is connected to the housing 967 (FIG. 57) of the air valve 966. A shiftable core 968 of the valve 966 has a passage 969 therein which is movable between a closed position and an open position wherein the conduit 182 communicates with a conduit 971 that is connected to a high pressure air supply. The valve core 968 is normally maintained in the closed position and is opened momentarily by engagement with a lobe 972 on a cam 973 after a pair of mandrels 58 have been indexed at Station 8.

From the foregoing description it is apparent that the carton forming machine of the present invention is capable of forming cartons which are very sturdy and do not leak. The machine features bottom forming, bottom heating, and bottom sealing apparatus which cooperate to provide a bottom closure which is free from leaks and which is attractive in appearance.

While one embodiment of the present invention has been shown and described, it wil be understood that various changes and modifications may be made without departing from the spirit of the invention or the scope of the appended claims.

The present invention and the manner in which the same is to be used having thus been described, what is claimed as new and desired to be protected by Letters Patent is:

1. In a method of forming a carton from a collapsed tubular carton blank having flaps forming an end closure, said flaps having surfaces to be sealed together when heat and pressure is applied thereto, the steps of erecting the carton blank into an open-ended rectangular tubular form, supporting the erected carton blank for movement along an arcuate path with its end closure on the outer periphery of said path, bending the flaps of the end closure of the carton, heating the flaps of the end closure, folding the flaps of the end closure together while along said arcuate path, and applying pressure to the flaps to seal the same together, the end closure flaps being heated by directing hot air at only those surfaces of the flaps which will subsequently be sealed together, only the unheated surfaces of the flaps being engaged during folding and during application of sealing pressure.

2. In a method of forming a carton from a collapsed tubular carton blank having flaps forming an end closure, said flaps having surfaces to be sealed together when heat and pressure is applied thereto, the steps of erecting the carton blank into an open-ended rectangular tubular form, supporting the erected carton blank for movement along an arcuate path with its end closure on the outer periphery of said path, bending the flaps of the end closure of the carton, heating the flaps of the end closure, folding the flaps of the end closure together while moving along said arcuate path, and applying pressure to the flaps to seal the same together, the erected carton blank being supported for intermittent indexing movement along said path between processing stations which include a heating station and a sealing station, one of said intermittent indexing movements being effective to index the carton blank at said heating station and the next indexing movement being effective to index the carton blank at said sealing station, said flaps being folded into sealing position during movement between said heating station and said sealing station.

3. In a method of forming a carton from a collapsed tubular carton blank having flaps forming an end closure, said flap having surfaces to be sealed together when heat and pressure is applied thereto, the steps of erecting the carton blank into an open-ended rectangular tubular form, supporting the erected carton blank for movement along an arcuate path with its end closure on the outer periphery of said path, bending the flaps of the end closure of the carton, heating the flaps of the end closure, folding the flaps of the end closure together while moving along said arcuate path, and applying pressure to the flaps to seal the same together, said sealing pressure being localized at areas of the bottom closure which form natural flow pasages to partially crush the flaps and positively block said flow passages.

4. In a machine for forming cartons, an apparatus for erecting a collapsed carton blank having a pair of forward walls and a pair of rear walls hingedly connected by scored pivot joints, comprising means for supporting the carton in collapsed upright position with the scored joints between each forward wall and the trailing rear wall disposed in upright position to define the opposite side edges of the collapsed carton, abutment means adjacent one of said carton joints, a pivotal gate adjacent the other carton joint and movable against said other joint to shift the joint laterally, means for pivoting said gate in a direction to shift said carton laterally and move said one carton joint into firm engagement with said abutment means causing said forward walls to pivot forwardly on said pivot joints and move away from said rear walls, and means for gripping one of said forward walls and moving it forwardly to pivot the carton into a squared condition about said abutment means.

5. An apparatus according to claim 4 wherein said gripping means includes suction means for gripping one of said forward walls and for pulling said one wall forwardly causing the carton to pivot about said abutment and causing the carton walls to swing relative to each other about said pivot joints, means for effecting the release of the carton by said suction means after the collapsed cartons have been erected into a tubular condition, and a pair of gates mounted for pivotal movement between a position spaced from the walls of the carton and a position engaging opposite walls of the carton to hold the carton in the squared condition.

6. An apparatus according to claim 5 wherein said suction gripping means is effective for first bending the carton to a squared condition, for then overbending the carton walls past said squared condition, and thereafter for returning the walls to the squared condition prior to releasing the carton in said squared condition between said gates, said apparatus including a turret disposed below said gates, a mandrel projecting upwardly from said turret in position to receive a squared carton, and pusher means for engaging the squared cartons and for removing the carton past said guide means and past said pair of gates onto said mandrel.

7. An apparatus according to claim 6 wherein the plurality of evenly spaced mandrels project outwardly from said turret with one mandrel being indexed in position to receive the squared carton, said pusher means engaging the squared carton and moving the same past the said pair of gates onto said one mandrel, means for intermittently driving said turret in timed relation with the movement of said pusher means to present each mandrel in turn in position to receive a squared carton, and means operatively connected to one of said squaring gates and to said drive means for detecting the presence of an improperly squared carton in said squaring gates and for deactivating said drive means when an improperly squared carton is present between said squaring gates.

8. An apparatus according to claim 4 wherein said squared carton blanks have upper end flaps whose upper edges are disposed at different elevations when the carton is held by said guide means, said apparatus including means for frictionally supporting and guiding the squared carton blanks for vertical movement, a pusher head having slotted carton engaging portions disposed at different elevations, each portion being adapted to engage one of said upper end flaps, and a power unit connected to said pusher head for moving said head vertically and forcing the squared carton downwardly out of said frictional supporting means and through said U-shaped guide onto the mandrel indexed therebelow.

9. In a machine for forming cartons, the combination of a magazine for storing a plurality of collapsed cartons each having a pair of forward walls and a pair of rear walls connected by scored pivot joints, said magazine having means for holding a stack of collapsed cartons in upright position with the pivot joint between one forward wall and the adjacent rear wall of each carton defining one side edge of the collapsed carton and the pivot joint between the other forward wall and the adjacent rear wall defining the opposite edge of the carton, means for urging said stack toward one end of said magazine, fixed upper and lower carton arresting fingers positioned to engage one of the rear walls of the foremost carton in said stack, a fixed abutment positioned alongside one edge of the foremost carton in the stack, a pivotal gate having a camming surface disposed in position to engage the opposite edge of the collapsed carton, means for pivoting said gate in a direction causing said camming surface to firmly seat said one edge behind said fixed abutment and causing the forward walls of the foremost carton to bow away from the rear walls and away from said carton arresting fingers, and means for gripping one of the forward walls and swinging said carton in a direction and to a position which causes said carton blank to pivot about said abutment and to pull free of said fingers and to open to form a tubular open-ended carton of rectangular cross-section.

10. The combination of claim 9 including means for vibrating said magazine for aiding the movement of cartons therealong.

11. The combination of claim 9 wherein said gripping means includes a suction gripper, a parallelogram linkage supporting said suction gripper for movement, and means connected to said parallelogram linkage for moving said suction gripper into engagement with one of the foremost walls of the foremost carton and for withdrawing the carton from the magazine, withdrawal of the carton causing said carton to swing about said pivot means and causing the walls of the carton to pivot about their pivot joints to positions normal to each other.

12. In a machine for forming cartons, the combination of a turret having an axis of rotation, a mandrel on said turret adapted to support a squared thermoplastic carton thereon with the flaps which define an end closure of the carton projecting outwardly generally parallel to the axis of the mandrel, drive means connected to said turret for intermittently moving the mandrel to a plurality of stations positioned around said turret, means at a first station for bending said flaps inwardly relatively to the longitudinal axis of said mandrel, heating means at a second station for heating selected surfaces of said flaps which are to be subsequently sealed together, means for folding said flaps together as said mandrel is moving from said second station to a third station, and means at said third station for applying pressure against said flaps to seal said flaps together in a liquid-tight closure.

13. The combination defined in claim 12 wherein two of the end closure flaps are unscored flat flaps, are opposed to each other, and are disposed on opposite sides of a plane containing said axis of said mandrel and which plane is perpendicular to the axis of rotation of said turret, said combination including a magazine for supporting flat folded carton blanks, means for erecting each carton blank into a squared tubular carton, and means for engaging each erected carton blank and placing it on an associated one of said mandrels with said two unscored flaps disposed on opposite sides of said plane.

14. The combination of claim 13 wherein said heating means includes a heating head for directing heated air against those surfaces of the carton which are to be subsequently sealed together, heating means connected to said head to heat the air to a temperature which will cause the thermoplastic material to become tacky, means for directing air through said heating means and through said head, and means connected to said heating head for moving said head toward and away from said carton while said mandrel is positioned at said second station.

15. The combination of claim 13 wherein said heating means is disposed immediately adjacent said head so as to minimize heat loss as the hot air moves from said heating means to the carton surfaces to be sealed.

16. The combination defined in claim 14 wherein said means at said third station includes an end sealing die having a carton engaging face, menas for moving said die from a position spaced from said carton to a position firmly engaging the heated flaps and squeezing the flaps between said bottom sealing die and said mandrel to seal said flaps together, a pair of parallel side guides projecting upwardly from the face of said bottom sealing die and having sloping edges arranged to accurately square the end closure of the carton, and a plurality of raised buttons on said face positioned to engage the end closure at points where leaks tend to occur in the carton to localize pressure at these points and form a sealed joint to prevent leakage therepast.

17. The combination defined in claim 16 wherein said flaps include a first pair of opposed end flaps having V-shaped scored pivot joints and a second pair of opposed flaps connected to said first pair of flaps by scored joints and having a lip extending outwardly from one of said second flaps, said combination including a shallow groove in said carton engaging face for receiving a major portion of said lip, one edge of said groove being arranged to engage the inner end of said lip to deform the lip causing material to flow into the space between abutting portions of the end closure to assure a positive seal.

18. The combination of claim 14 wherein said flaps include a first pair of opposed end flaps having the V-shaped score lines therein and a second pair of opposed flaps connected to said first pair of flaps by scored pivot joints and having a lip extending outwardly from one of said second flaps, said means at said first station including an end forming die for engaging and bending said first and second flaps inwardly about the pivot joints separating the end closure from said body, said end forming die including pivotal fingers disposed in position to engage said second flaps, means for moving said die inwardly against said end closure, and means for pivotally actuating said fingers as said end forming die is moving inwardly to bend said second flaps inwardly about said score lines.

19. The combination of claim 14 wherein said flaps include a first and a second pair of opposed flaps, each of said first pair having a central section connected by scored hinge lines to two side sections, said means at said first station comprising a support plate, a pair of fingers pivotally carried by said plate and having flap contacting end portions adapted to contact the central section of each flap of the first pair of flaps to swing said central section inwardly, resilient means connected to said fingers for urging the flap contacting end portions to a position spaced from said first pair of flaps, a pair of slanted walls carried by said supporting plate and adapted to contact the second pair of flaps and bend said second pair of flaps inwardly, means for moving said supporting plate toward said flaps for causing said slanted walls to engage said second flaps and bend said flaps inwardly, and means responsive to the inward movement of said supporting plate for moving said flap contacting end portions of said fingers inwardly against the central section of each of said first pair of flaps to initiate the bending of said first pair of flaps inwardly about said score lines prior to the inward bending of said second flaps.

20. The combinations of claim 14 wherein the end closure is connected to the body of the carton by score lines and includes a first opposed pair of end flaps having V-shaped score lines therein and a second opposed pair of flaps connected to said first pair of flaps by score lines and having a lip extending outwardly from one of said second flaps, said mandrel including a flap engaging head, a triangular abutment projecting outwardly from said head, said means at said third station including a bottom sealing die in axial alignment with said mandrel and having a carton engaging face, means for moving said die from a position spaced from said carton to a position firmly engaging said flaps and squeezing said flaps between said bottom sealing die and said flap engaging head to seal said flaps together, a shallow groove in said face for receiving a major portion of said lip, one edge of said groove being arranged to engage the inner end of said lip to slightly crush the same and assure a positive seal, said triangular abutment being positioned to contact the inside surface of one of said flaps and being positioned over said groove and within a triangular depression defined by said first flaps to assure a positive seal at the center of the end closure.

21. In a carton forming and filling machine, the combination of a turret shaft mounted for rotation, a cam shaft mounted for rotation adjacent said turret shaft, drive means connected to said turret shaft and to said cam shaft for intermittently driving said turret shaft and for continuously driving said cam shaft, said cam shaft being driven one complete revolution for each intermittent cycle of movement of said turret shaft, a mandrel hub keyed on said turret shaft and having a plurality of axially extending air passages therein with a radially extending port communicating with each passage, a plurality of mandrels secured to said mandrel hub and each mandrel having a central air passage communicating with an associated one of said ports, each of said mandrels having a plurality of passages therein which extend radially of said central passage and having inwardly inclined discharge ports in the outer end thereof communicating with said radial passages, an air distribution ring keyed to said cam shaft and having a plurality of passages therein each of which communicates with one of said axially extending air passage, a sealing ring secured to one surface of said distribution ring and having a plurality of passages therein communicating with corresponding ones of said passages in said air distribution ring, a statonary manifold having a single port therein positioned to communicate with one of said passages in said sealing ring when said turret is at an indexed position, resilient means for urging said manifold into sealed engagement with said sealing ring, a conduit connecting said port in said manifold to a source of air under high pressure, a normally closed valve in said conduit, and a cam secured to said cam shaft for opening said valve for a predetermined time once for each revolution of said cam shaft, said opening of said valve occurring at a time when said turret shaft is stationary.

References Cited

UNITED STATES PATENTS

| | | | |
|---|---|---|---|
| 2,612,823 | 10/1952 | Woelfer | 93—53 |
| 2,957,289 | 10/1960 | Monroe et al. | 93—44.1 X |
| 2,966,100 | 12/1960 | Engleson et al. | 93—53 |
| 2,989,903 | 6/1961 | Wilcox | 93—53 |
| 3,143,937 | 8/1964 | Martin | 93—53 |
| 3,187,646 | 6/1965 | Monroe et al. | 93—44.1 |
| 3,207,049 | 9/1965 | Monroe et al. | 93—44.1 |
| 3,239,995 | 3/1966 | Monroe et al. | 93—44.1 |

WILLIAM S. LAWSON, *Primary Examiner.*

UNITED STATES PATENT OFFICE
CERTIFICATE OF CORRECTION

Patent No. 3,408,906                                                      November 5, 1968

Robert D. Heffelfinger et al.

It is certified that error appears in the above identified patent and that said Letters Patent are hereby corrected as shown below:

Column 1, line 44, "staroge" should read -- storage --. Column 5, line 9, "man" should read -- main --. Column 8, line 20, "is" should read -- in --; line 38, "O-ring" should read -- O-rings --. Column 9, line 49, after "are" insert -- manually loaded into the magazine, each carton --. Column 11, line 68, after "531" insert -- and --. Column 12, line 13, "or" should read -- of --. Column 22, line 36, "65" should read -- 56 --. Column 25, line 69, "wil" should read -- will --. Column 29, line 56, "menas" should read -- means --. Column 30, line 20, after "each" insert -- flap --. Column 31, line 13, "statonary" should read -- stationary --.

Signed and sealed this 14th day of April 1970.

(SEAL)
Attest:

EDWARD M. FLETCHER, JR.                              WILLIAM E. SCHUYLER, JR.
Attesting Officer                                          Commissioner of Patents